(12) United States Patent
Zhou et al.

(10) Patent No.: US 11,303,421 B2
(45) Date of Patent: *Apr. 12, 2022

(54) LAYER 1 REFERENCE SIGNAL RECEIVED POWER REPORTING FOR A SECONDARY CELL

(71) Applicant: Samsung Electronics Co., Ltd., Suwon-si (KR)

(72) Inventors: Hua Zhou, Herndon, VA (US); Esmael Dinan, McLean, VA (US); Alireza Babaei, Fairfax, VA (US); Hyoungsuk Jeon, Centreville, VA (US); Kyungmin Park, Vienna, VA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/150,540

(22) Filed: Jan. 15, 2021

(65) Prior Publication Data
US 2021/0135831 A1    May 6, 2021

Related U.S. Application Data

(63) Continuation of application No. 16/782,853, filed on Feb. 5, 2020, now Pat. No. 10,931,431, which is a
(Continued)

(51) Int. Cl.
*H04L 5/00* (2006.01)
*H04B 7/06* (2006.01)
(Continued)

(52) U.S. Cl.
CPC ......... *H04L 5/0098* (2013.01); *H04B 7/0695* (2013.01); *H04B 17/24* (2015.01);
(Continued)

(58) Field of Classification Search
CPC ... H04L 5/0098; H04L 27/2602; H04L 5/001; H04L 1/0057; H04L 1/1819;
(Continued)

(56) References Cited

U.S. PATENT DOCUMENTS 10,567,145 B2 *  2/2020  Zhou ................. H04L 5/0048
2014/0056243 A1   2/2014  Pelletier et al.
(Continued)

OTHER PUBLICATIONS

3GPP TS 36.212 V14.3.0 (Jun. 2017); Technical Specification; 3rd Generation Partnership Project; Technical Specification Group Radio Access Network; Evolved Universal Terrestrial Radio Access (E-UTRA); Multiplexing and channel coding; (Release 14).
(Continued)

*Primary Examiner* — Kenneth T Lam
(74) *Attorney, Agent, or Firm* — Jefferson IP Law, LLP

(57) ABSTRACT

A wireless device receives configuration parameters indicating resource configurations of reference signals for a layer 1 reference signal received power (RSRP) reporting of a secondary cell. A control element indicating activation of the secondary cell is received. In response to the control element, a layer 1 RSRP report is transmitted. The layer 1 RSRP report comprises: a first field indicating a reference signal of the reference signals of the secondary cell; and a second field indicating a layer 1 RSRP value of the reference signal.

13 Claims, 39 Drawing Sheets

Related U.S. Application Data continuation of application No. 16/240,069, filed on Jan. 4, 2019, now Pat. No. 10,567,145.

(60) Provisional application No. 62/614,045, filed on Jan. 5, 2018, provisional application No. 62/614,252, filed on Jan. 5, 2018.

(51) Int. Cl.

| | |
|---|---|
| *H04L 1/00* | (2006.01) |
| *H04L 1/18* | (2006.01) |
| *H04L 27/26* | (2006.01) |
| *H04B 17/327* | (2015.01) |
| *H04B 17/24* | (2015.01) |
| *H04B 17/318* | (2015.01) |

(52) U.S. Cl.
CPC ......... *H04B 17/318* (2015.01); *H04B 17/327* (2015.01); *H04L 1/0057* (2013.01); *H04L 1/1819* (2013.01); *H04L 5/001* (2013.01); *H04L 27/2602* (2013.01); *H04L 27/2692* (2013.01)

(58) Field of Classification Search
CPC . H04L 27/2692; H04L 5/0092; H04L 5/0048; H04L 1/0027; H04L 1/0026; H04B 17/24; H04B 17/318; H04B 7/0695; H04B 17/327; H04B 7/088; H04B 7/0456
See application file for complete search history.

(56) References Cited

U.S. PATENT DOCUMENTS

| | | | |
|---|---|---|---|
| 2014/0169322 | A1 | 6/2014 | Ouchi et al. |
| 2016/0119928 | A1 | 4/2016 | Wu |
| 2016/0309504 | A1 | 10/2016 | Dinan |
| 2017/0055242 | A1 | 2/2017 | Kusashima et al. |
| 2017/0347270 | A1* | 11/2017 | Iouchi ............... H04W 72/0406 |
| 2018/0219664 | A1 | 8/2018 | Guo et al. |
| 2019/0082399 | A1 | 3/2019 | Loehr et al. |
| 2019/0149365 | A1 | 5/2019 | Chatterjee et al. |
| 2019/0150013 | A1 | 5/2019 | Zhang et al. |
| 2019/0182635 | A1* | 6/2019 | Liu ....................... H04L 1/0025 |

OTHER PUBLICATIONS

3GPP TS 36.321 V14.4.0 (Sep. 2017); Technical Specification; 3rd Generation Partnership Project; Technical Specification Group Radio Access Network; Evolved Universal Terrestrial Radio Access (E-UTRA); Medium Access Control (MAC) protocol specification; (Release 14).
3GPP TS 36.331 V14.3.0 (Sep. 2017); Technical Specification; 3rd Generation Partnership Project; Technical Specification Group Radio Access Network; Evolved Universal Terrestrial Radio Access (E-UTRA); Radio Resource Control (RRC);; Protocol specification.
3GPP TS 38.321 V2.0.0 (Dec. 2017); Technical Specification; 3rd Generation Partnership Project; Technical Specification Group Radio Access Network; NR; Medium Access Control (MAC) protocol specification; (Release 15).
3GPP TSG RAN WG1 Meeting 90bis; Prague, CZ, Oct. 9-13, 2017; Title: RAN1 Chairman's Notes ; 1 Opening of the Meeting (Day 1: 9.00 AM) 3.
3GPP TS 38.213 V1.2.1 (Dec. 2017); Technical Specification; 3rd Generation Partnership Project; Technical Specification Group Radio Access Network; NR;Physical layer procedures for control (Release 15).
3GPP TS 38.214 V1.2.1 (Dec. 2017); Technical Specification; 3rd Generation Partnership Project; Technical Specification Group Radio Access Network; NR;Physical layer procedures for data (Release 15).
R1-1721510; 3GPP TSG RAN WG1 Meeting #91 Reno, USA, Nov. 27-Dec. 1, 2017 ;; Source:NTT Docomo, Inc.; Title:Offline summary for AI 7.3.3.4 UL data transmission procedure ; Agenda Item:7.3.3.4.
R1-1709907 Discussion on Beam Failure Recovery_v2; 3GPP TSG RAN WG1 NR Ad-Hoc#2R1-1709907 Qingdao, P.R. China, Jun. 27-30, 2017;; Source:Xinwei; Title:Discussion on Beam Failure Recovery; Agenda Item:5.1.2.2.2.
R1-1709929; 3GPP TSG RAN WG1 NR Ad Hoc MeetingR1-1709929 Qingdao, China, Jun. 27-30, 2017;; Agenda Item:5.1.2.2.2; Source:Huawei, HiSilicon; Title:General views on beam failure recovery.
R1-1710058; 3GPP TSG RAN WG1 NR Ad-Hoc#2 R1-1710058 Qingdao, P.R. China, Jun. 27-30, 2017;; Source:CATT; Title:Considerations on DL beam failure and recovery Agenda Item:5.1.2.2.2.
R1-1710283 Discussion on beam failure recovery_final; 3GPP TSG RAN WG1 NR Ad-Hoc# R1-1710283 Qingdao, P.R. China Jun. 27-30, 2017;; Agenda Item:5.1.2.2.2; Source: LG Electronics; Title: Discussion on beam failure recovery.
R1-1710400_Beam failure recovery procedure; 3GPP TSG RAN WG1 Meeting NR Ad-Hoc#2R1-1710400 Qingdao, P. R. China, Jun. 27-30, 2017;; Source:vivo; Title:Beam failure recovery procedure; Agenda Item:5.1.2.2.2.
R1-1710596; 3GPP TSG RAN WG1 NR Ad-Hoc#2 ; Qingdao, P.R. China Jun. 27-30, 2017;; Agenda Item:5.1.2.2.2; Source:Lenovo, Motorola Mobility; Title: Discussion of beam recovery procedure.
R1-1710810_BeamRecovery_final; 3GPP TSG RAN WG1 AH_NR MeetingR1-1710810 Qingdao, China Jun. 27-30, 2017; Agenda Item: 5.1.2.2.2; Source: MediaTek Inc.; Title: Mechanism for flexible beam failure recovery; Document for: Discussion.
R1-1710926 On Remaining Details of Beam Failure Recovery; 3GPP TSG RAN WG1 NR Ad-Hoc# R1-1710926 Qingdao, P.R. China Jun. 27-30, 2017;; Agenda Item:5.1.2.2.2; Source:InterDigital, Inc.; Title:On Remaining Details of Beam Failure Recovery.
R1-1711017 Mechanism to recover from beam failure; 3GPP TSG-RAN WG1 #89ah-NRR1-1711017 Qingdao, China, Jun. 27-30, 2017;; Source:Ericsson; Title:Mechanism to recover from beam failure; Agenda Item:5.1.2.2.2.
R1-1711291; 3GPP TSG RAN WG1 NR Ad-Hoc#2 R1-1711291; Qingdao, P.R. China, Jun. 27-30, 2017 Agenda item:5.1.2.2.2.
R1-1715439 Remaining details on CSI reporting; 3GPP TSG RAN WG1 Meeting NR #3R1-1715439 Nagoya, Japan, Sep. 18-21, 2017; Source: ZTE, Sanechips; Title:Remaining details on CSI reporting Agenda Item:6.2.2.2; Document for: Discussion and Decision.
R1-1715858_CSI reporting_v2; 3GPP TSG RAN WG1 Meeting NR#3R1-1715858 Nagoya, Japan, Sep. 18-21, 2017; Agenda Item:6.2.2.2; Source: LG Electronics; Title: Discussions on CSI reporting; Document for:Discussion/Decision.
R1-1715939 CSI reporting and UCI multiplexing_r3; 3GPP TSG RAN WG1 Meeting NR#3R1-1715939 Nagoya, Japan, Sep. 18-21, 2017; Agenda item:6.2.2.2; Source: Samsung; Title: CSI reporting and UCI multiplexing; Document for:Discussion and Decision.
R1-1716349 On CSI reporting; 3GPP TSG-RAN WG1 NR Ad Hoc #3R1-1716349 Nagoya, Japan, Sep. 18-21, 2017;; Source:Ericsson; Title:On CSI reporting; Agenda Item:6.2.2 2.
R1-1717604 CSI reporting and UCI multiplexing_r1; 3GPP TSG RAN WG1 Meeting 90bisR1-1717604 Prague, CZ, Oct. 9-13, 2017; Agenda item:7.2.2.2; Source: Samsung; Title: CSI reporting and UCI multiplexing; Document for:Discussion and Decision.
R1-1717940_CSI reporting_v3; 3GPP TSG RAN WG1 Meeting #90bisR1-1717940 Prague, Czech Republic, Oct. 9-13, 2017; Agenda Item:7.2.2.2; Source: LG Electronics; Title: Discussions on CSI reporting; Document for:Discussion/Decision.
R1-1718432 On remaining detailsof CSI reporting; 3GPP TSG RAN WG1 Meeting 90bisR1-1718432 Prague, CZ, Oct. 9-13, 2017;; Source:Ericsson; Title:On remaining details of CSI reporting; Agenda Item:7.2.2.2.
R1-1718442 On semi-persistent CSI reporting on PUSCH; 3GPP TSG-RAN WG1 #90bisR1-1718442 Prague, Czech Republic, Oct. 9-13, 2017;; Source:Ericsson; Title:On semi-persistent CSI reporting on PUSCH; Agenda Item:7.2.2.6.

(56) References Cited

OTHER PUBLICATIONS

R1-1719932 Remaining issues on UL data transmission procedure; 3GPP TSG RAN WG1 Meeting 91 R1-1719932 Reno, USA, Nov. 27-Dec. 1, 2017; Agenda Item:7.3.3.4; Source: LG Electronics; Title: Remaining issues on UL data transmission procedure; Document for:Discussion and decision.

R1-1720289 CSI reporting and UCI multiplexing_r1; 3GPP TSG RAN WG1 Meeting #91R1-1720289 Reno, USA Nov. 27-Dec. 1, 2017; Agenda item:7.2.2.2; Source: Samsung; Title: CSI reporting and UCI multiplexing; Document for:Discussion and Decision.

R1-1720661; 3GPP TSG RAN WG1 Meeting #91 ; Nov. 27-Dec. 1, 2017; Reno, Nevada, USA;; Agenda item:7.2.2 2; Source: Qualcomm Incorporated.

R1-1720734 On remaining details of CSI reporting; 3GPP TSG-RAN WG1 #91R1-1720734 Reno, USA, Nov. 27-Dec. 1, 2017;; Source:Ericsson; Title:On remaining details of CSI reporting Agenda Item:7.2.2.2.

R1-1721342 cl; 3GPP TS 38.212 V1.2.1 (Dec. 2017) Technical Specification; 3rd Generation Partnership Project;; Technical Specification Group Radio Access Network;; NR;; Multiplexing and channel coding.

R1-1721371 Summary of remaining issues on CSI measurement; 3GPP TSG RAN WG1 Meeting #91 R1-1721371 Reno, USA, Nov. 27-Dec. 1, 2017; Source: ZTE, Sanechips; Title:Summary of remaining issues on CSI measurement; Agenda Item:7.2.2.1; Document for: Discussion and Decision.

3GPP TS 38.331 V0.4.0 (Dec. 2017); Technical Specification; 3rd Generation Partnership Project Technical Specification Group Radio Access Network NR Radio Resource Control (RRC); Protocol specification.

3GPP TSG-RAN WG1 RN-AH3; R1-1716901; Nagoya, Japan, Sep. 18-21, 2017; Agenda: 6.2.2.2; WF for Open Issues on CSI Reporting.

3GPP TSG-RAN WG1 #91; R1-1721451; Reno, USA, Nov. 27-Dec. 1, 2017; Source: Ericsson; Title Summary of views on CSI Reporting; Agenda Item: 7.2.2.2; Document for: Discussion and Decision.

3GPP TSG-RAN WG2 NR-Adhoc; R2-1706680; Qingdao, China, Jun. 27-29, 2017; Source: AT Title: Beam Failure Recovery Mechanism and RLF; Agenda Item: 10.2.9; Documents for: Discussion.

3GPP TSG-RAN WG2 NR Ad Hoc; Qinhdao, China, Jun. 27-29, 2017; Source: RAN2 Chairman (Intel); Object Chairman Notes.

3GPP TS 36.213 V14.3.0 (Jun. 2017) Random Access Procedure (Release 14).

\* cited by examiner

Example uplink physical channel

Example uplink modulation

Example downlink modulation

Example downlink physical channel

FIG. 7 Dual-Connectivity- two MAC entities at UE side

Example 1: 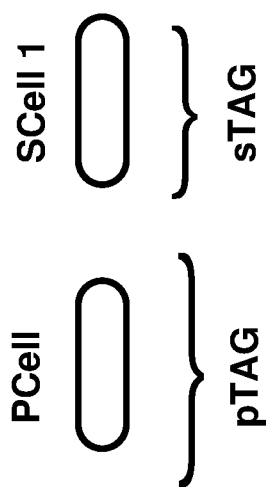
Example 2: 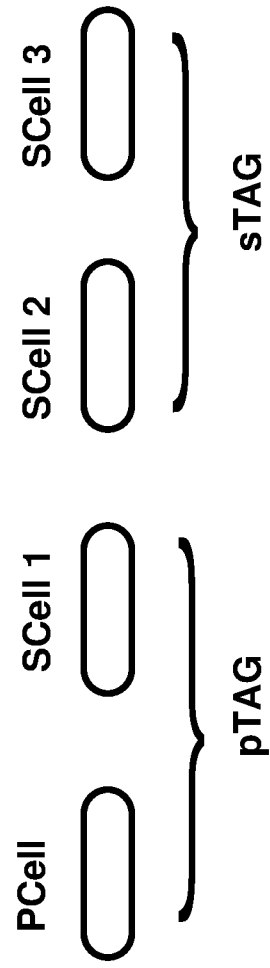
Example 3: 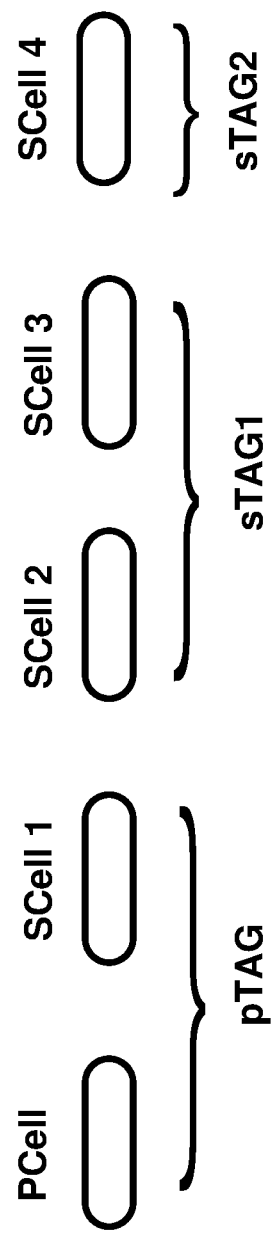
FIG. 8 gNB connected to NGC eLTE eNB connected to NGC

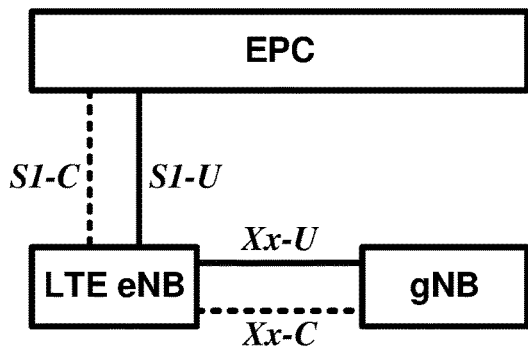

LTE eNB connected to EPC with non-standalone gNB. gNB user plane connected to EPC via LTE eNB.
FIG. 11A

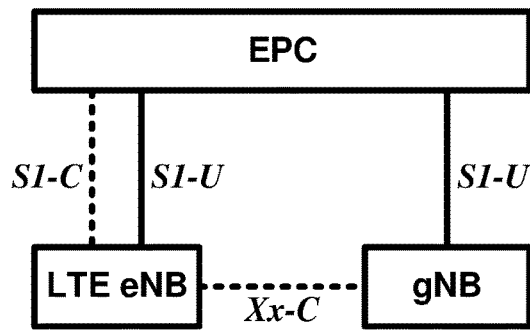

LTE eNB connected to EPC with non-standalone gNB. gNB user plane connected to EPC directly.
FIG. 11B

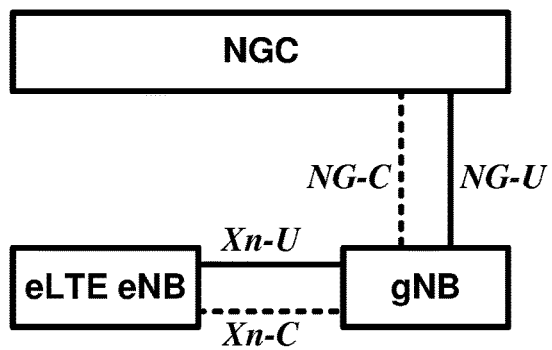

gNB connected to NGC with non-standalone eLTE eNB. eLTE eNB user plane connected to NGC via gNB.
FIG. 11C

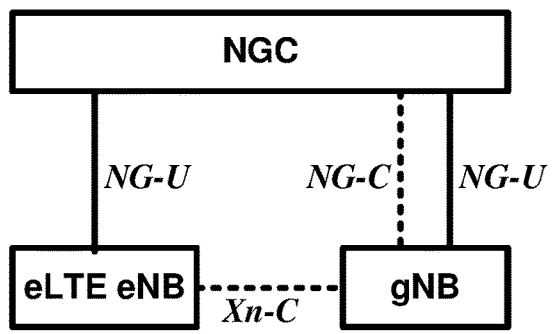

gNB connected to NGC with non-standalone eLTE eNB. eLTE eNB user plane connected to NGC directly.
FIG. 11D

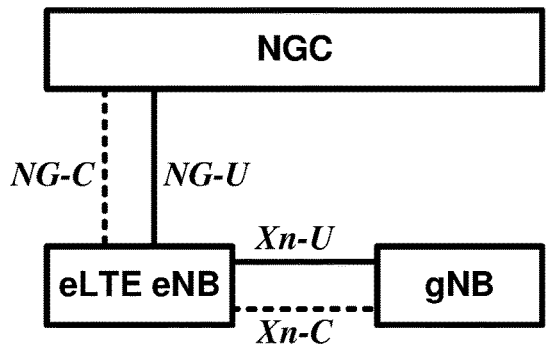

eLTE eNB connected to NGC with non-standalone gNB. gNB user plane connected to NGC via eLTE eNB.
FIG. 11E

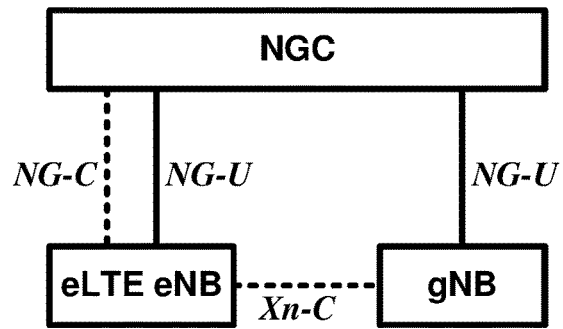

eLTE eNB connected to NGC with non-standalone gNB. gNB user plane connected to NGC directly.
FIG. 11F Radio protocol architecture for split bearer and SCG bearer. LTE eNB connected to EPC with non-standalone gNB.

Radio protocol architecture for split bearer and SCG bearer. gNB connected to NGC with non-standalone eLTE eNB.

Radio protocol architecture for split bearer and SCG bearer. eLTE eNB connected to NGC with non-standalone gNB.

Non-centralized deployment

Centralized deployment

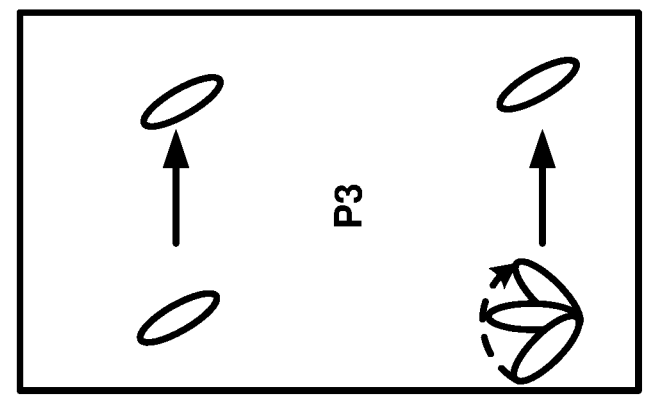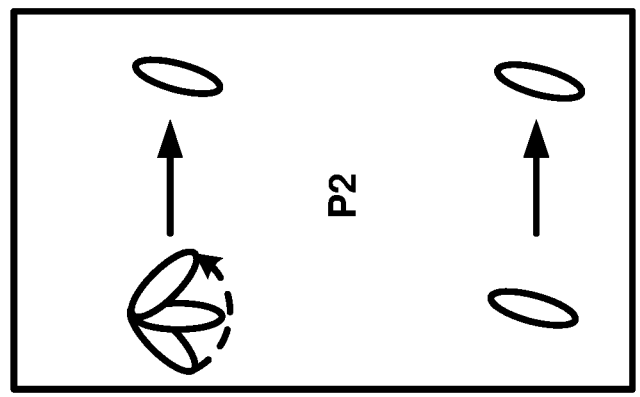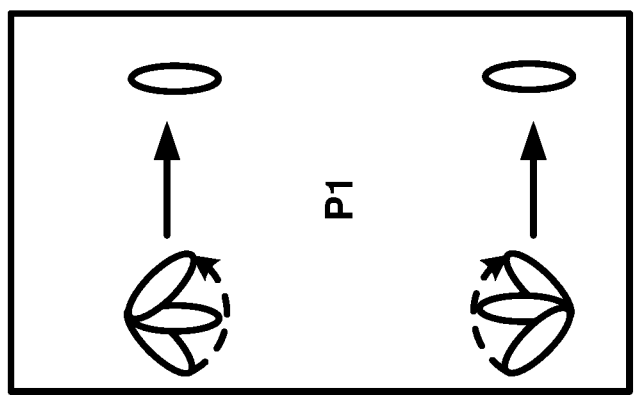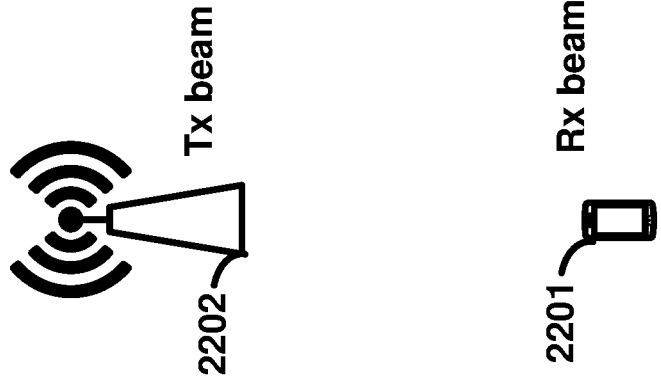
FIG. 22

Beam failure in one TRP

Beam failure in multiple TRPs

| | DCI format | Example size (Bits) | Usage |
|---|---|---|---|
| Uplink | 0 | 45 | Uplink scheduling grant |
| | 4 | 53 | Uplink scheduling grant with spatial multiplexing |
| | 6-0A, 6-0B | 46, 36 | Uplink scheduling grant for eMTC devices |
| Downlink | 1C | 31 | Special purpose compact assignment |
| | 1A | 45 | Contiguous allocation only |
| | 1B | 46 | Codebook-based beamforming using CRS |
| | 1D | 46 | MU-MIMO using CRS |
| | 1 | 55 | Flexible allocations |
| | 2A | 64 | Open-loop spatial multiplexing using CRS |
| | 2B | 64 | Dual-layer transmission using DM-RS (TM8) |
| | 2C | 66 | Multi-layer transmission using DM-RS (TM9) |
| | 2D | 68 | Multi-layer transmission using DM-RS (TM9) |
| | 2 | 67 | Closed-loop spatial multiplexing using CRS |
| | 6-1A, 6-1B | 46, 36 | Downlink scheduling grants for eMTC devices |
| Special | 3, 3A | 45 | Power control commands |
| | 5 | | Sidelink operation |
| | 6-2 | | Paging/direct indication for eMTC devices |

FIG. 26

| CSI-RS configuration | P-CSI reporting | SP-CSI reporting | Ap-CSI reporting |
|---|---|---|---|
| P CSI-RS | Higher layers (e.g., RRC) | MAC CE and/or DCI | DCI |
| SP CSI-RS | Not supported | MAC CE and/or DCI | DCI |
| Ap. CSI-RS | Not supported | Not supported | DCI |

FIG. 29

```
┌─────────────────────────────────────────────┐
│  Receive, by a wireless device from a base station, │
│  message(s) comprising configuration parameters of a layer │
│  1 reference signal received power reporting for a │
│  secondary cell, the configuration parameters indicating │
│  resource configurations of a reference signals on the │
│  secondary cell │
│  3810 │
└─────────────────────────────────────────────┘
                        │
                        ▼
┌─────────────────────────────────────────────┐
│  Receive a MAC CE indicating activation of the secondary │
│  cell │
│  3820 │
└─────────────────────────────────────────────┘
                        │
                        ▼
┌─────────────────────────────────────────────┐
│  Transmit, in response to the MAC CE, a layer 1 reference │
│  signal received power report for the layer 1 reference │
│  signal received power reporting for the secondary cell, │
│  where the layer 1 reference signal received power report │
│  comprises: 1st fields indicating reference signal(s) of the │
│  plurality of reference signals; and 2nd fields indicating │
│  layer 1 reference signal received power value(s) of the │
│  reference signal(s) │
│  3830 │
└─────────────────────────────────────────────┘
```

FIG. 38

```
┌─────────────────────────────────────────────────┐
│  Receive, by a wireless device from a base station, │
│  message(s) comprising: 1st configuration parameters of a │
│  layer 1 reference signal received power report for a │
│  secondary cell; and 2nd configuration parameters of a │
│  channel quality indicator report for the secondary cell │
│                      3910                        │
└─────────────────────────────────────────────────┘
                         │
                         ▼
┌─────────────────────────────────────────────────┐
│  Receive, at a 1st slot, a MAC CE indicating activation of the │
│                   secondary cell                 │
│                       3920                       │
└─────────────────────────────────────────────────┘
                         │
                         ▼
┌─────────────────────────────────────────────────┐
│  Transmit, at a 2nd slot occurring a number of slots after the │
│  1st slot, the layer 1 reference signal received power report in │
│              response to the MAC CE              │
│                       3930                       │
└─────────────────────────────────────────────────┘
                         │
                         ▼
┌─────────────────────────────────────────────────┐
│  Transmit, at a 3rd slot, a channel quality indictor report for │
│  the secondary cell in response to a reference signal received │
│  power value of the layer 1 reference signal received power │
│          report being greater than a threshold          │
│                       3940                       │
└─────────────────────────────────────────────────┘
```

FIG. 39

LAYER 1 REFERENCE SIGNAL RECEIVED POWER REPORTING FOR A SECONDARY CELL

CROSS-REFERENCE TO RELATED APPLICATIONS

This application is a continuation application of prior application Ser. No. 16/782,853, filed on Feb. 5, 2020, which is a continuation application of prior application Ser. No. 16/240,069, filed on Jan. 4, 2019, which has issued as U.S. Pat. No. 10,567,145 on Feb. 18, 2020 and is based on and claims priority under 35 U.S.C. § 119(e) of a U.S. Provisional application Ser. No. 62/614,045, filed on Jan. 5, 2018, in the U.S. Patent and Trademark Office, and of a U.S. Provisional application Ser. No. 62/614,252, filed on Jan. 5, 2018, in the U.S. Patent and Trademark Office, the disclosure of each of which is incorporated by reference herein in its entirety.

BRIEF DESCRIPTION OF THE SEVERAL VIEWS OF THE DRAWINGS

Examples of several of the various embodiments of the present invention are described herein with reference to the drawings.

FIG. 8 shows example TAG configurations as per an aspect of an embodiment of the present disclosure.

FIG. 11A, FIG. 11B, FIG. 11C, FIG. 11D, FIG. 11E, and FIG. 11F are example diagrams for architectures of tight interworking between 5G RAN (e.g. gNB) and LTE RAN (e.g. (e) LTE eNB) as per an aspect of an embodiment of the present disclosure.

FIG. 22 is an example of various beam management procedures as per an aspect of an embodiment of the present disclosure.

FIG. 26 is an example diagram for downlink control information (DCI) formats as per an aspect of an embodiment of the present disclosure.

FIG. 29 is an example diagram for various CSI reporting mechanisms as per an aspect of an embodiment of the present disclosure.

FIG. 38 is a flow diagram of an aspect of an embodiment of the present disclosure.

FIG. 39 is a flow diagram of an aspect of an embodiment of the present disclosure.

DETAILED DESCRIPTION OF EMBODIMENTS

Figure 1:
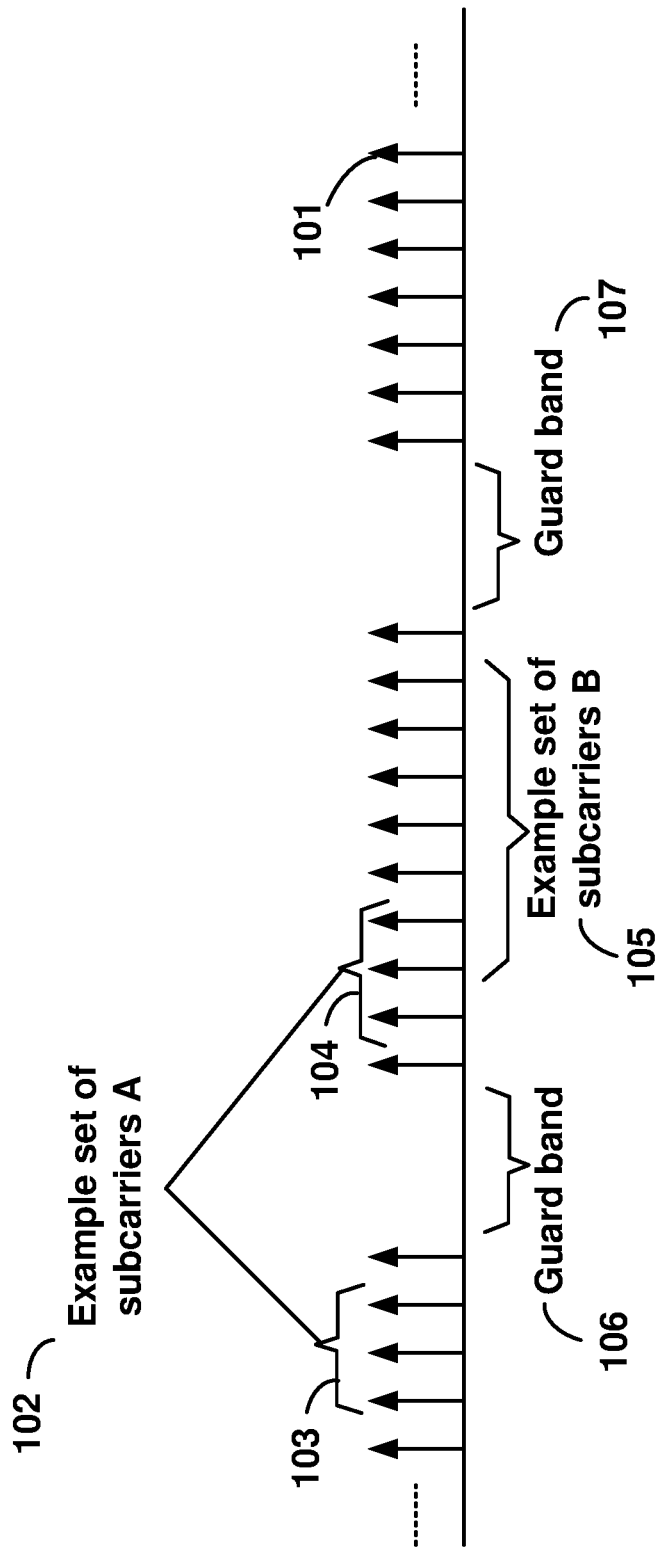
FIG. 1 is a diagram depicting example sets of OFDM subcarriers as per an aspect of an embodiment of the present disclosure.

Example embodiments of the present invention enable operation of carrier aggregation. Embodiments of the technology disclosed herein may be employed in the technical field of multicarrier communication systems. More particularly, the embodiments of the technology disclosed herein may relate to signal transmission in a multicarrier communication system.

The following Acronyms are used throughout the present disclosure:

ASIC application-specific integrated circuit
BPSK binary phase shift keying
CA carrier aggregation
CC component carrier
CDMA code division multiple access
CP cyclic prefix
CPLD complex programmable logic devices
CSI channel state information
CSS common search space
CU central unit
DC dual connectivity
DCI downlink control information
DL downlink
DU distributed unit
eMBB enhanced mobile broadband
EPC evolved packet core
E-UTRAN evolved-universal terrestrial radio access network
FDD frequency division multiplexing
FPGA field programmable gate arrays
Fs-C Fs-control plane
Fs-U Fs-user plane
gNB next generation node B
HDL hardware description languages
HARQ hybrid automatic repeat request
IE information element
LTE long term evolution
MAC media access control
MCG master cell group
MeNB master evolved node B
MIB master information block
MME mobility management entity
mMTC massive machine type communications
NAS non-access stratum
NGC next generation core
NG CP next generation control plane core
NG-C NG-control plane
NG-U NG-user plane
NR new radio
NR MAC new radio MAC
NR PHY new radio physical
NR PDCP new radio PDCP
NR RLC new radio RLC
NR RRC new radio RRC
NS SAI network slice selection assistance information
OFDM orthogonal frequency division multiplexing
PCC primary component carrier
PCell primary cell
PDCCH physical downlink control channel
PDCP packet data convergence protocol
PDU packet data unit
PHICH physical HARQ indicator channel
PHY physical
PLMN public land mobile network
PSCell primary secondary cell
pTAG primary timing advance group
PUCCH physical uplink control channel
PUSCH physical uplink shared channel
QAM quadrature amplitude modulation
QPSK quadrature phase shift keying
RA random access
RB resource blocks
RBG resource block groups
RLC radio link control
RRC radio resource control
SCC secondary component carrier
SCell secondary cell
SCG secondary cell group
SC-OFDM single carrier-OFDM
SDU service data unit
SeNB secondary evolved node B
SIB system information block
SFN system frame number
sTAGs secondary timing advance group
S-GW serving gateway
SRB signaling radio bearer
TA timing advance
TAG timing advance group
TAI tracking area identifier
TAT time alignment timer
TB transport block
TDD time division duplexing
TDMA time division multiple access
TTI transmission time interval
UE user equipment
UL uplink
UPGW user plane gateway
URLLC ultra-reliable low-latency communications
VHDL VHSIC hardware description language
Xn-C Xn-control plane
Xn-U Xn-user plane
Xx-C Xx-control plane
Xx-U Xx-user plane Example embodiments of the invention may be implemented using various physical layer modulation and transmission mechanisms. Example transmission mechanisms may include, but are not limited to: CDMA, OFDM, TDMA, Wavelet technologies, and/or the like. Hybrid transmission mechanisms such as TDMA/CDMA, and OFDM/CDMA may also be employed. Various modulation schemes may be applied for signal transmission in the physical layer. Examples of modulation schemes include, but are not limited to: phase, amplitude, code, a combination of these, and/or the like. An example radio transmission method may implement QAM using BPSK, QPSK, 16-QAM, 64-QAM, 256-QAM, 1024-QAM and/or the like. Physical radio transmission may be enhanced by dynamically or semi-dynamically changing the modulation and coding scheme depending on transmission requirements and radio conditions.

FIG. 1 is a diagram depicting example sets of OFDM subcarriers as per an aspect of an embodiment of the present disclosure. As illustrated in this example, arrow(s) in the diagram may depict a subcarrier in a multicarrier OFDM system. The OFDM system may use technology such as OFDM technology, DFTS-OFDM, SC-OFDM technology, or the like. For example, arrow 101 shows a subcarrier transmitting information symbols. FIG. 1 is for illustration purposes, and a typical multicarrier OFDM system may include more subcarriers in a carrier. For example, the number of subcarriers in a carrier may be in the range of 10 to 10,000 subcarriers. FIG. 1 shows two guard bands 106 and 107 in a transmission band. As illustrated in FIG. 1, guard band 106 is between subcarriers 103 and subcarriers 104. The example set of subcarriers A 102 includes subcarriers 103 and subcarriers 104. FIG. 1 also illustrates an example set of subcarriers B 105. As illustrated, there is no guard band between any two subcarriers in the example set of subcarriers B 105. Carriers in a multicarrier OFDM communication system may be contiguous carriers, non-contiguous carriers, or a combination of both contiguous and non-contiguous carriers.

Figure 2:
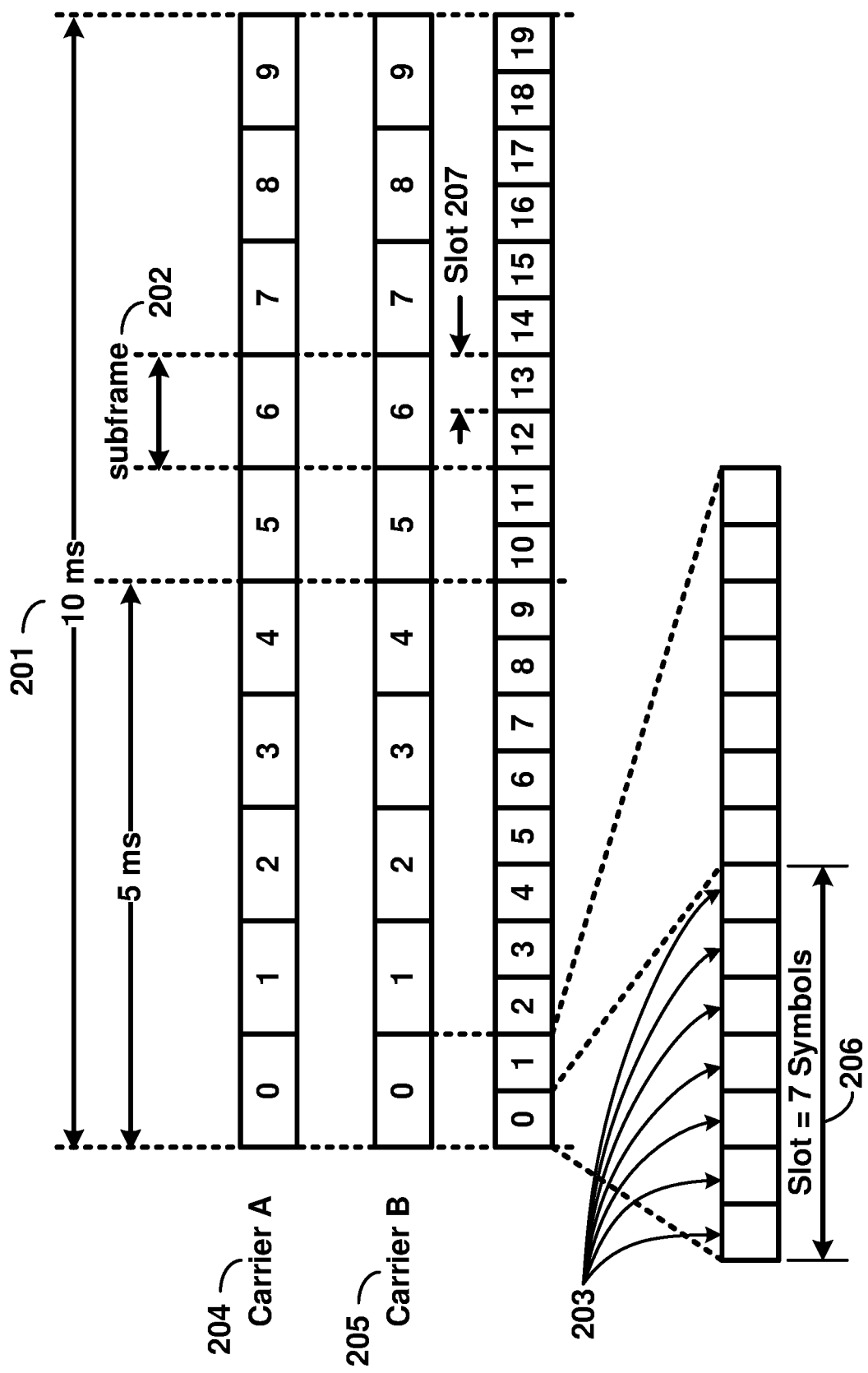
FIG. 2 is a diagram depicting an example transmission time and reception time for two carriers in a carrier group as per an aspect of an embodiment of the present disclosure.

FIG. 2 is a diagram depicting an example transmission time and reception time for two carriers as per an aspect of an embodiment of the present disclosure. A multicarrier OFDM communication system may include one or more carriers, for example, ranging from 1 to 10 carriers. Carrier A 204 and carrier B 205 may have the same or different timing structures. Although FIG. 2 shows two synchronized carriers, carrier A 204 and carrier B 205 may or may not be synchronized with each other. Different radio frame structures may be supported for FDD and TDD duplex mechanisms. FIG. 2 shows an example FDD frame timing. Downlink and uplink transmissions may be organized into radio frames 201. In this example, radio frame duration is 10 msec. Other frame durations, for example, in the range of 1 to 100 msec may also be supported. In this example, each 10 ms radio frame 201 may be divided into ten equally sized subframes 202. Other subframe durations such as including 0.5 msec, 1 msec, 2 msec, and 5 msec may also be supported. Subframe(s) may comprise of two or more slots (e.g. slots 206 and 207). For the example of FDD, 10 subframes may be available for downlink transmission and 10 subframes may be available for uplink transmissions in each 10 ms interval. Uplink and downlink transmissions may be separated in the frequency domain. A slot may be 7 or 14 OFDM symbols for the same subcarrier spacing of up to 60 kHz with normal CP. A slot may be 14 OFDM symbols for the same subcarrier spacing higher than 60 kHz with normal CP. A slot may contain all downlink, all uplink, or a downlink part and an uplink part and/or alike. Slot aggregation may be supported, e.g., data transmission may be scheduled to span one or multiple slots. In an example, a mini-slot may start at an OFDM symbol in a subframe. A mini-slot may have a duration of one or more OFDM symbols. Slot(s) may include a plurality of OFDM symbols 203. The number of OFDM symbols 203 in a slot 206 may depend on the cyclic prefix length and subcarrier spacing.

Figure 3:
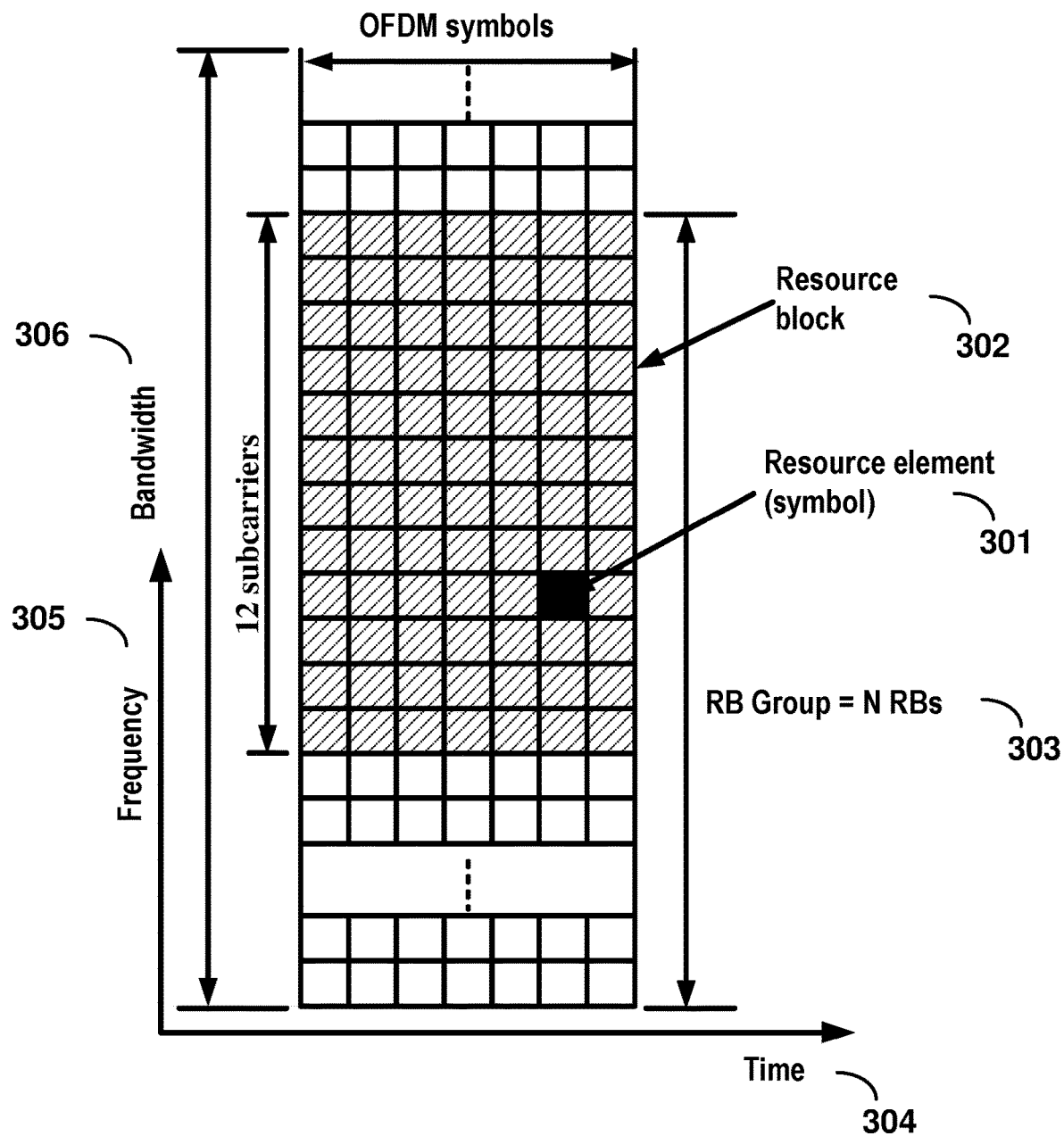
FIG. 3 is a diagram depicting OFDM radio resources as per an aspect of an embodiment of the present disclosure.

FIG. 3 is a diagram depicting OFDM radio resources as per an aspect of an embodiment of the present disclosure. The resource grid structure in time 304 and frequency 305 is illustrated in FIG. 3. The quantity of downlink subcarriers or RBs may depend, at least in part, on the downlink transmission bandwidth 306 configured in the cell. The smallest radio resource unit may be called a resource element (e.g. 301). Resource elements may be grouped into resource blocks (e.g. 302). Resource blocks may be grouped into larger radio resources called Resource Block Groups (RBG) (e.g. 303). The transmitted signal in slot 206 may be described by one or several resource grids of a plurality of subcarriers and a plurality of OFDM symbols. Resource blocks may be used to describe the mapping of certain physical channels to resource elements. Other pre-defined groupings of physical resource elements may be implemented in the system depending on the radio technology. For example, 24 subcarriers may be grouped as a radio block for a duration of 5 msec. In an illustrative example, a resource block may correspond to one slot in the time domain and 180 kHz in the frequency domain (for 15 KHz subcarrier bandwidth and 12 subcarriers).

In an example embodiment, multiple numerologies may be supported. In an example, a numerology may be derived by scaling a basic subcarrier spacing by an integer N. In an example, scalable numerology may allow at least from 15 kHz to 480 kHz subcarrier spacing. The numerology with 15 kHz and scaled numerology with different subcarrier spacing with the same CP overhead may align at a symbol boundary every 1 ms in a NR carrier.

Figure 5A:
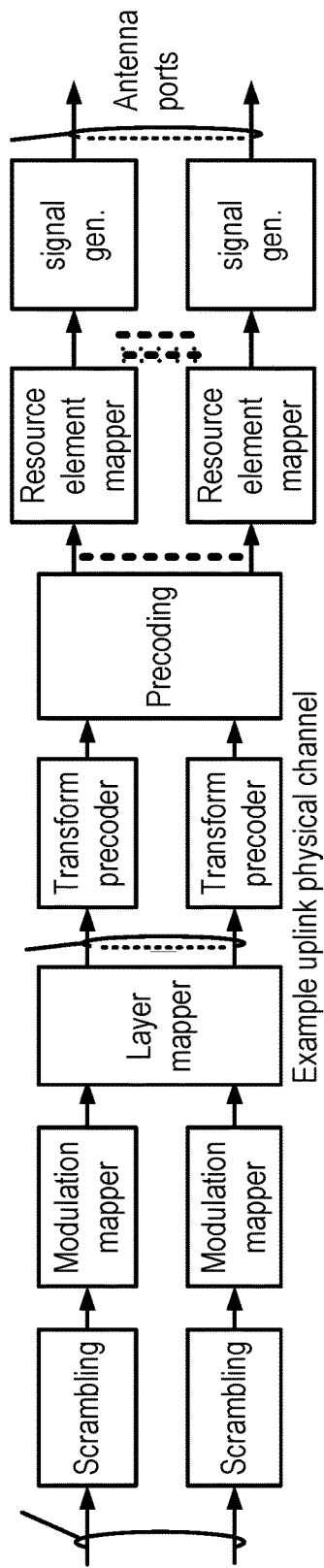
FIG. 5A, FIG. 5B, FIG. 5C and FIG. 5D are example diagrams for uplink and downlink signal transmission as per an aspect of an embodiment of the present disclosure.

FIG. 5A, FIG. 5B, FIG. 5C and FIG. 5D are example diagrams for uplink and downlink signal transmission as per an aspect of an embodiment of the present disclosure. FIG. 5A shows an example uplink physical channel. The baseband signal representing the physical uplink shared channel may perform the following processes. These functions are illustrated as examples and it is anticipated that other mechanisms may be implemented in various embodiments. The functions may comprise scrambling, modulation of scrambled bits to generate complex-valued symbols, mapping of the complex-valued modulation symbols onto one or several transmission layers, transform precoding to generate complex-valued symbols, precoding of the complex-valued symbols, mapping of precoded complex-valued symbols to resource elements, generation of complex-valued time-domain DFTS-OFDM/SC-FDMA signal for an antenna port, and/or the like.

Figure 5B:
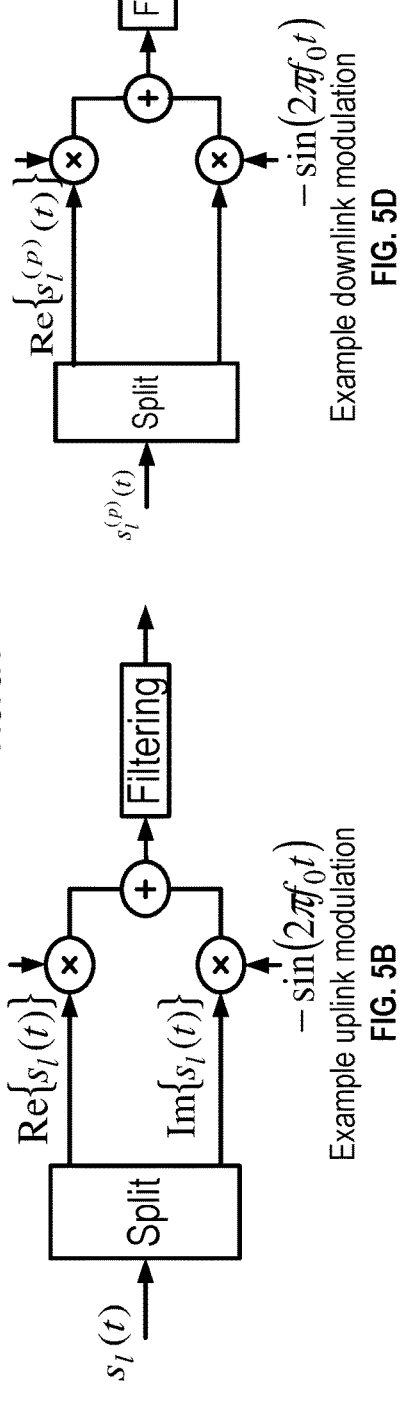

Example modulation and up-conversion to the carrier frequency of the complex-valued DFTS-OFDM/SC-FDMA baseband signal for an antenna port and/or the complex-valued PRACH baseband signal is shown in FIG. 5B. Filtering may be employed prior to transmission.

Figure 5D:
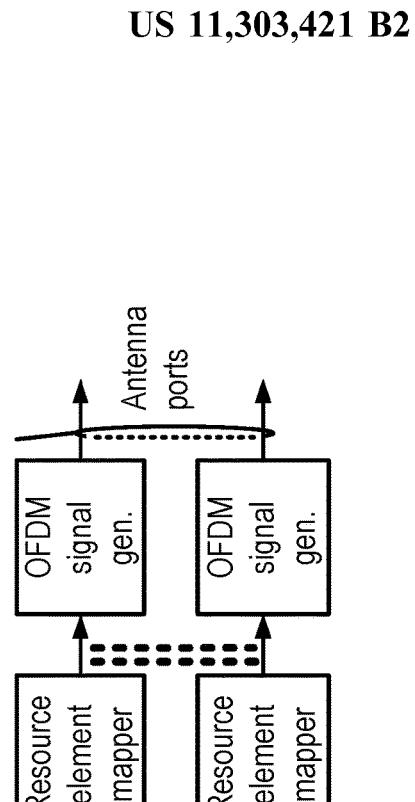
Figure 5C:
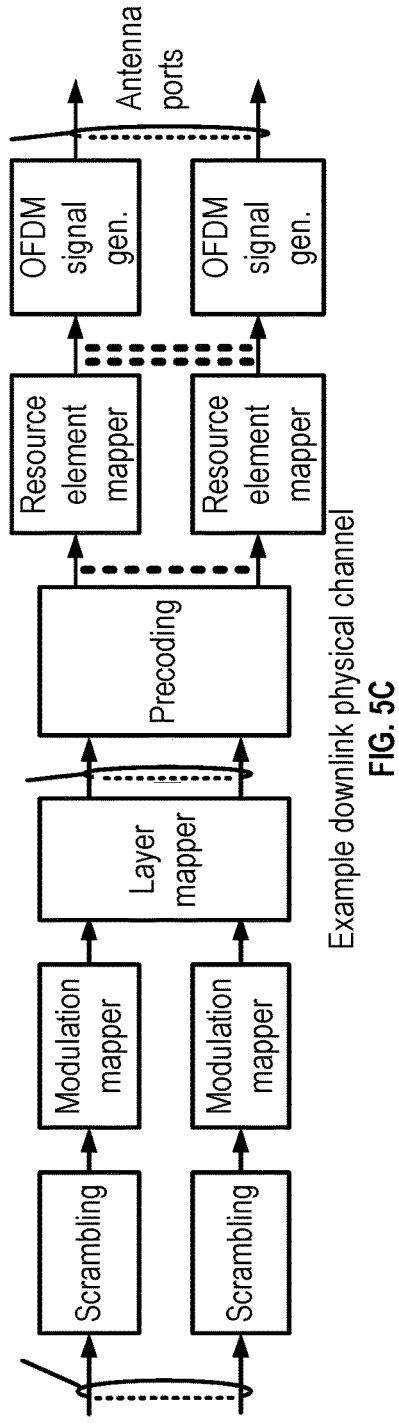

An example structure for Downlink Transmissions is shown in FIG. 5C. The baseband signal representing a downlink physical channel may perform the following processes. These functions are illustrated as examples and it is anticipated that other mechanisms may be implemented in various embodiments. The functions include scrambling of coded bits in codewords to be transmitted on a physical channel; modulation of scrambled bits to generate complex-valued modulation symbols; mapping of the complex-valued modulation symbols onto one or several transmission layers; precoding of the complex-valued modulation symbols on a layer for transmission on the antenna ports; mapping of complex-valued modulation symbols for an antenna port to resource elements; generation of complex-valued time-domain OFDM signal for an antenna port, and/or the like.

Example modulation and up-conversion to the carrier frequency of the complex-valued OFDM baseband signal for an antenna port is shown in FIG. 5D. Filtering may be employed prior to transmission.

Figure 4:
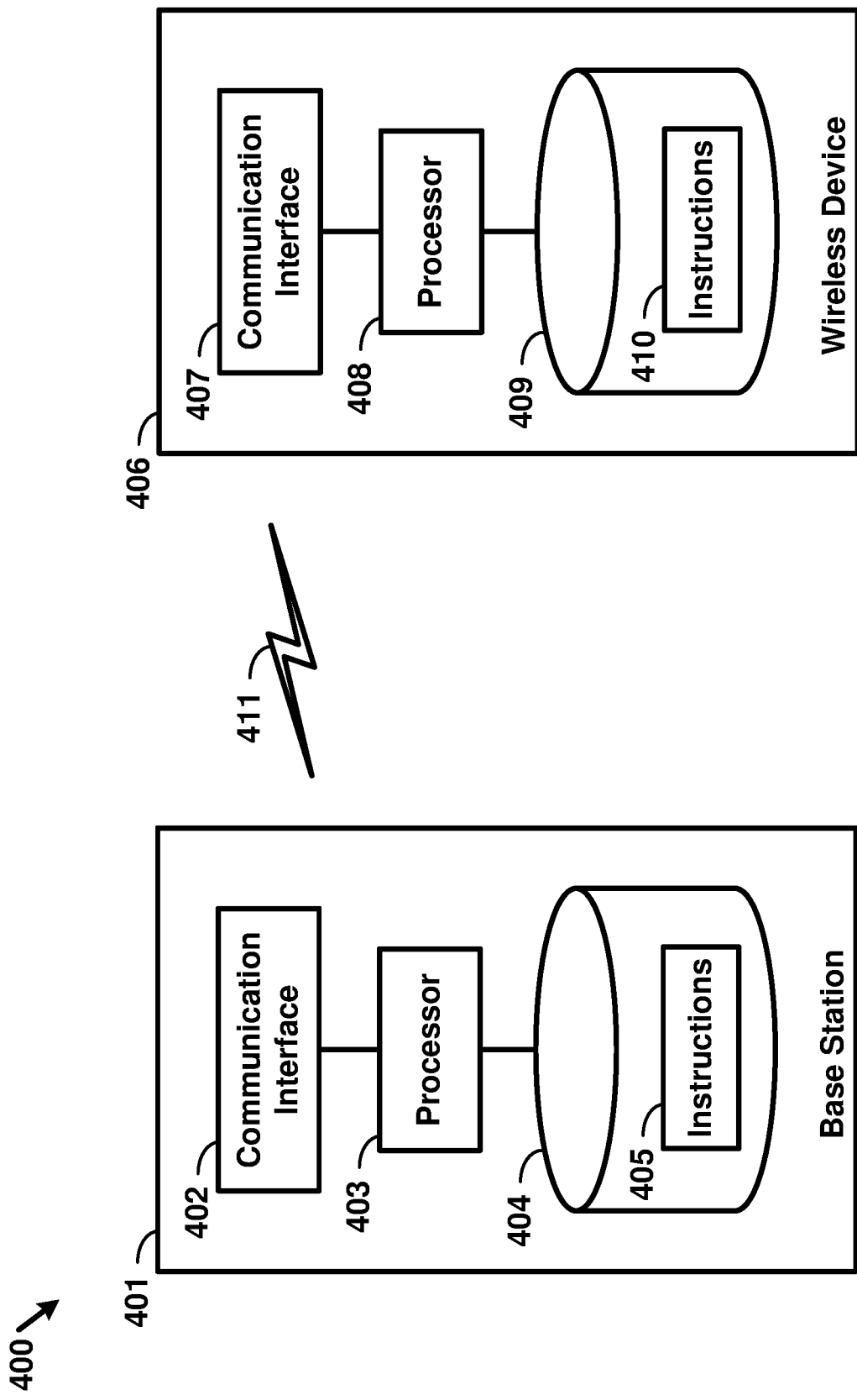
FIG. 4 is a block diagram of a base station and a wireless device as per an aspect of an embodiment of the present disclosure.

FIG. 4 is an example block diagram of a base station 401 and a wireless device 406, as per an aspect of an embodiment of the present disclosure. A communication network 400 may include at least one base station 401 and at least one wireless device 406. The base station 401 may include at least one communication interface 402, at least one processor 403, and at least one set of program code instructions 405 stored in non-transitory memory 404 and executable by the at least one processor 403. The wireless device 406 may include at least one communication interface 407, at least one processor 408, and at least one set of program code instructions 410 stored in non-transitory memory 409 and executable by the at least one processor 408. Communication interface 402 in base station 401 may be configured to engage in communication with communication interface 407 in wireless device 406 via a communication path that includes at least one wireless link 411. Wireless link 411 may be a bi-directional link. Communication interface 407 in wireless device 406 may also be configured to engage in a communication with communication interface 402 in base station 401. Base station 401 and wireless device 406 may be configured to send and receive data over wireless link 411 using multiple frequency carriers. According to some of the various aspects of embodiments, transceiver(s) may be employed. A transceiver is a device that includes both a transmitter and receiver. Transceivers may be employed in devices such as wireless devices, base stations, relay nodes, and/or the like. Example embodiments for radio technology implemented in communication interface 402, 407 and wireless link 411 are illustrated are FIG. 1, FIG. 2, FIG. 3, FIG. 5, and associated text.

An interface may be a hardware interface, a firmware interface, a software interface, and/or a combination thereof. The hardware interface may include connectors, wires, electronic devices such as drivers, amplifiers, and/or the like. A software interface may include code stored in a memory device to implement protocol(s), protocol layers, communication drivers, device drivers, combinations thereof, and/or the like. A firmware interface may include a combination of embedded hardware and code stored in and/or in communication with a memory device to implement connections, electronic device operations, protocol(s), protocol layers, communication drivers, device drivers, hardware operations, combinations thereof, and/or the like.

The term configured may relate to the capacity of a device whether the device is in an operational or non-operational state. Configured may also refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics in the device, whether the device is in an operational or non-operational state.

Figure 10A:
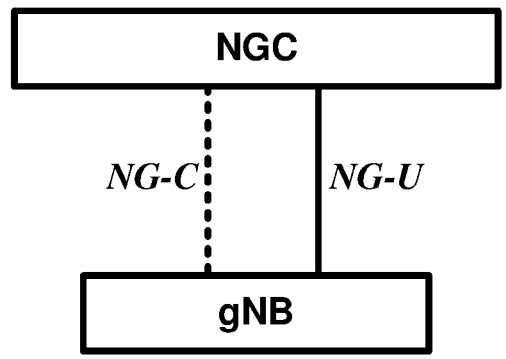
FIG. 10A and FIG. 10B are example diagrams for interfaces between a 5G core network (e.g. NGC) and base stations (e.g. gNB and eLTE eNB) as per an aspect of an embodiment of the present disclosure.
Figure 10B:
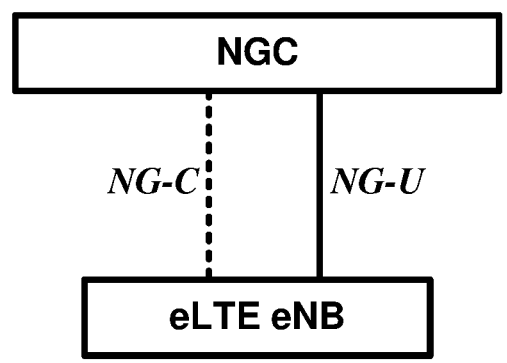

According to some of the various aspects of embodiments, a 5G network may include a multitude of base stations, providing a user plane NR PDCP/NR RLC/NR MAC/NR PHY and control plane (NR RRC) protocol terminations towards the wireless device. The base station(s) may be interconnected with other base station(s) (e.g. employing an Xn interface). The base stations may also be connected employing, for example, an NG interface to an NGC. FIG. 10A and FIG. 10B are example diagrams for interfaces between a 5G core network (e.g. NGC) and base stations (e.g. gNB and eLTE eNB) as per an aspect of an embodiment of the present disclosure. For example, the base stations may be interconnected to the NGC control plane (e.g. NG CP) employing the NG-C interface and to the NGC user plane (e.g. UPGW) employing the NG-U interface. The NG interface may support a many-to-many relation between 5G core networks and base stations.

A base station may include many sectors for example: 1, 2, 3, 4, or 6 sectors. A base station may include many cells, for example, ranging from 1 to 50 cells or more. A cell may be categorized, for example, as a primary cell or secondary cell. At RRC connection establishment/re-establishment/handover, one serving cell may provide the NAS (non-access stratum) mobility information (e.g. TAI), and at RRC connection re-establishment/handover, one serving cell may provide the security input. This cell may be referred to as the Primary Cell (PCell). In the downlink, the carrier corresponding to the PCell may be the Downlink Primary Component Carrier (DL PCC), while in the uplink, it may be the Uplink Primary Component Carrier (UL PCC). Depending on wireless device capabilities, Secondary Cells (SCells) may be configured to form together with the PCell a set of serving cells. In the downlink, the carrier corresponding to an SCell may be a Downlink Secondary Component Carrier (DL SCC), while in the uplink, it may be an Uplink Secondary Component Carrier (UL SCC). An SCell may or may not have an uplink carrier.

A cell, comprising a downlink carrier and optionally an uplink carrier, may be assigned a physical cell ID and a cell index. A carrier (downlink or uplink) may belong to only one cell. The cell ID or Cell index may also identify the downlink carrier or uplink carrier of the cell (depending on the context it is used). In the specification, cell ID may be equally referred to a carrier ID, and cell index may be referred to carrier index. In implementation, the physical cell ID or cell index may be assigned to a cell. A cell ID may be determined using a synchronization signal transmitted on a downlink carrier. A cell index may be determined using RRC messages. For example, when the specification refers to a first physical cell ID for a first downlink carrier, the specification may mean the first physical cell ID is for a cell comprising the first downlink carrier. The same concept may apply to, for example, carrier activation. When the specification indicates that a first carrier is activated, the specification may equally mean that the cell comprising the first carrier is activated.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices may support multiple technologies, and/or multiple releases of the same technology. Wireless devices may have some specific capability(ies) depending on its wireless device category and/or capability(ies). A base station may comprise multiple sectors. When this disclosure refers to a base station communicating with a plurality of wireless devices, this disclosure may refer to a subset of the total wireless devices in a coverage area. This disclosure may refer to, for example, a plurality of wireless devices of a given LTE or 5G release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of wireless devices in a coverage area that may not comply with the disclosed methods, for example, because those wireless devices perform based on older releases of LTE or 5G technology.

Figure 6:
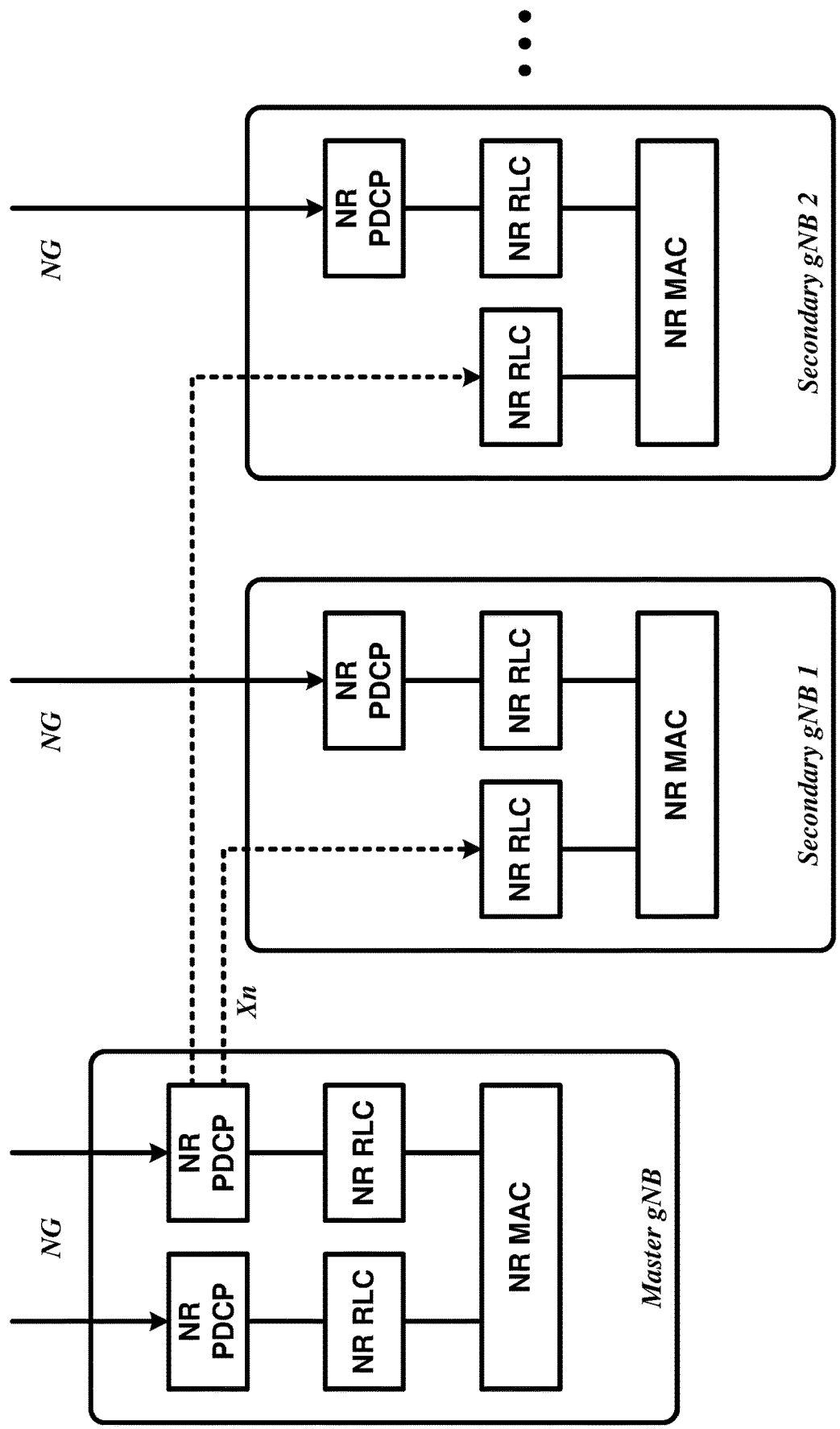
FIG. 6 is an example diagram for a protocol structure with multi-connectivity as per an aspect of an embodiment of the present disclosure.
Figure 7:
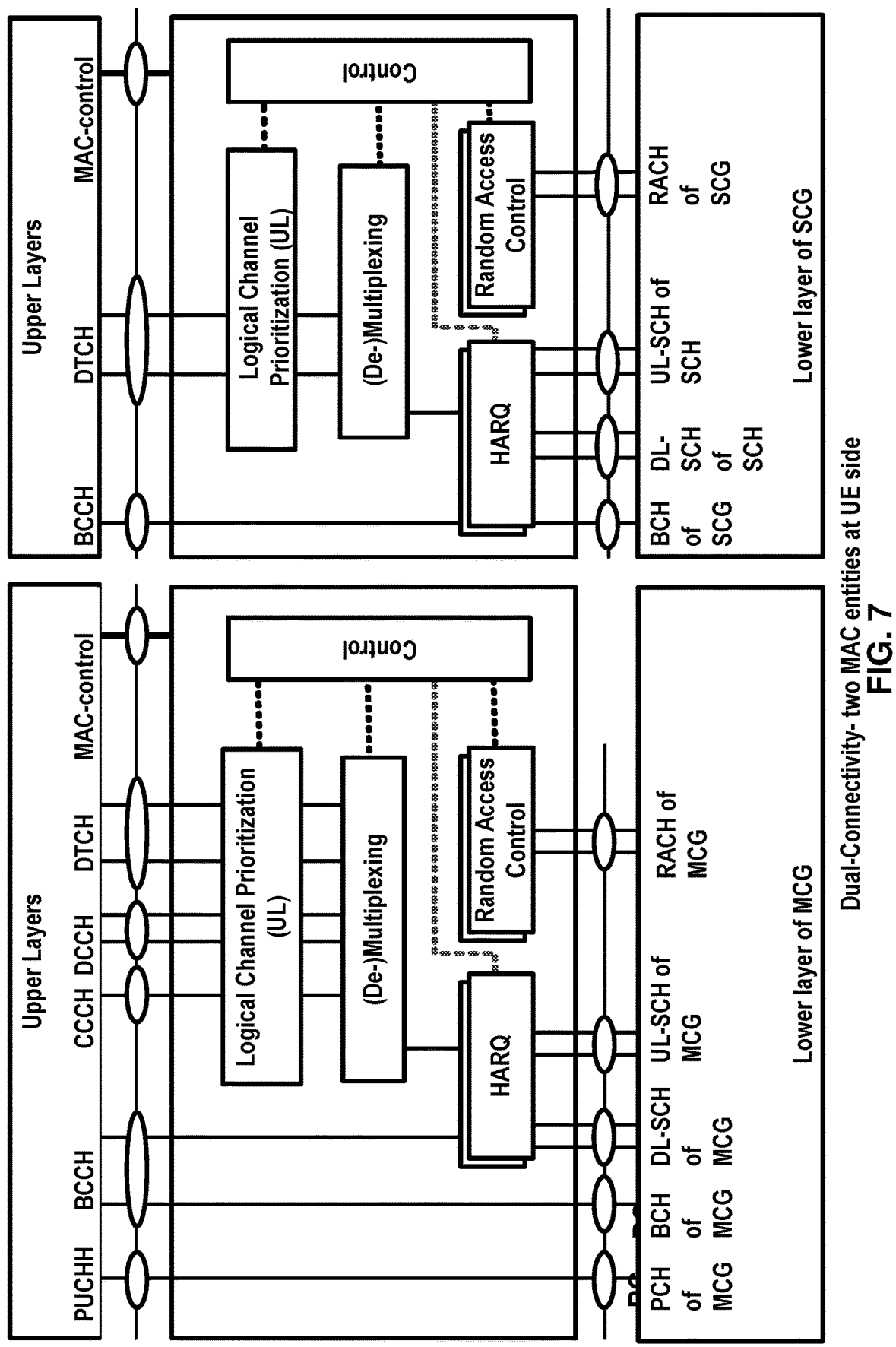
FIG. 7 is an example diagram for a protocol structure with CA and DC as per an aspect of an embodiment of the present disclosure.

FIG. 6 and FIG. 7 are example diagrams for protocol structure with CA and multi-connectivity as per an aspect of an embodiment of the present disclosure. NR may support multi-connectivity operation whereby a multiple RX/TX UE in RRC CONNECTED may be configured to utilize radio resources provided by multiple schedulers located in multiple gNBs connected via a non-ideal or ideal backhaul over the Xn interface. gNBs involved in multi-connectivity for a certain UE may assume two different roles: a gNB may either act as a master gNB or as a secondary gNB. In multi-connectivity, a UE may be connected to one master gNB and one or more secondary gNBs. FIG. 7 illustrates one example structure for the UE side MAC entities when a Master Cell Group (MCG) and a Secondary Cell Group (SCG) are configured, and it may not restrict implementation. Media Broadcast Multicast Service (MBMS) reception is not shown in this figure for simplicity.

In multi-connectivity, the radio protocol architecture that a particular bearer uses may depend on how the bearer is setup. Three examples of bearers, including, an MCG bearer, an SCG bearer and a split bearer as shown in FIG. 6. NR RRC may be located in master gNB and SRBs may be configured as an MCG bearer type and may use the radio resources of the master gNB. Multi-connectivity may also be described as having at least one bearer configured to use radio resources provided by the secondary gNB. Multi-connectivity may or may not be configured/implemented in example embodiments of the disclosure.

In the case of multi-connectivity, the UE may be configured with multiple NR MAC entities: one NR MAC entity for master gNB, and other NR MAC entities for secondary gNBs. In multi-connectivity, the configured set of serving cells for a UE may comprise of two subsets: the Master Cell Group (MCG) containing the serving cells of the master gNB, and the Secondary Cell Groups (SCGs) containing the serving cells of the secondary gNBs. For a SCG, one or more of the following may be applied: at least one cell in the SCG has a configured UL CC and one of them, named PSCell (or PCell of SCG, or sometimes called PCell), is configured with PUCCH resources; when the SCG is configured, there may be at least one SCG bearer or one Split bearer; upon detection of a physical layer problem or a random access problem on a PSCell, or the maximum number of NR RLC retransmissions has been reached associated with the SCG, or upon detection of an access problem on a PSCell during a SCG addition or a SCG change: a RRC connection re-establishment procedure may not be triggered, UL transmissions towards cells of the SCG are stopped, a master gNB may be informed by the UE of a SCG failure type, for split bearer, the DL data transfer over the master gNB is maintained; the NR RLC AM bearer may be configured for the split bearer; like PCell, PSCell may not be de-activated; PSCell may be changed with a SCG change (e.g. with security key change and a RACH procedure); and/or a direct bearer type change between a Split bearer and a SCG bearer or simultaneous configuration of a SCG and a Split bearer may or may not supported.

With respect to the interaction between a master gNB and secondary gNBs for multi-connectivity, one or more of the following principles may be applied: the master gNB may maintain the RRM measurement configuration of the UE and may, (e.g., based on received measurement reports or traffic conditions or bearer types), decide to ask a secondary gNB to provide additional resources (serving cells) for a UE; upon receiving a request from the master gNB, a secondary gNB may create a container that may result in the configuration of additional serving cells for the UE (or decide that it has no resource available to do so); for UE capability coordination, the master gNB may provide (part of) the AS configuration and the UE capabilities to the secondary gNB; the master gNB and the secondary gNB may exchange information about a UE configuration by employing of NR RRC containers (inter-node messages) carried in Xn messages; the secondary gNB may initiate a reconfiguration of its existing serving cells (e.g., PUCCH towards the secondary gNB); the secondary gNB may decide which cell is the PSCell within the SCG; the master gNB may or may not change the content of the NR RRC configuration provided by the secondary gNB; in the case of a SCG addition and a SCG S Cell addition, the master gNB may provide the latest measurement results for the SCG cell(s); both a master gNB and secondary gNBs may know the SFN and subframe offset of each other by OAM, (e.g., for the purpose of DRX alignment and identification of a measurement gap). In an example, when adding a new SCG SCell, dedicated NR RRC signaling may be used for sending required system information of the cell as for CA, except for the SFN acquired from a MIB of the PSCell of a SCG.

In an example, serving cells may be grouped in a TA group (TAG). Serving cells in one TAG may use the same timing reference. For a given TAG, user equipment (UE) may use at least one downlink carrier as a timing reference. For a given TAG, a UE may synchronize uplink subframe and frame transmission timing of uplink carriers belonging to the same TAG. In an example, serving cells having an uplink to which the same TA applies may correspond to serving cells hosted by the same receiver. A UE supporting multiple TAs may support two or more TA groups. One TA group may contain the PCell and may be called a primary TAG (pTAG). In a multiple TAG configuration, at least one TA group may not contain the PCell and may be called a secondary TAG (sTAG). In an example, carriers within the same TA group may use the same TA value and/or the same timing reference. When DC is configured, cells belonging to a cell group (MCG or SCG) may be grouped into multiple TAGs including a pTAG and one or more sTAGs.

FIG. 8 shows example TAG configurations as per an aspect of an embodiment of the present disclosure. In Example 1, pTAG comprises PCell, and an sTAG comprises SCell1. In Example 2, a pTAG comprises a PCell and SCell1, and an sTAG comprises SCell2 and SCell3. In Example 3, pTAG comprises PCell and SCell1, and an sTAG1 includes SCell2 and SCell3, and sTAG2 comprises SCell4. Up to four TAGs may be supported in a cell group (MCG or SCG) and other example TAG configurations may also be provided. In various examples in this disclosure, example mechanisms are described for a pTAG and an sTAG. Some of the example mechanisms may be applied to configurations with multiple sTAGs.

In an example, an eNB may initiate an RA procedure via a PDCCH order for an activated SCell. This PDCCH order may be sent on a scheduling cell of this SCell. When cross carrier scheduling is configured for a cell, the scheduling cell may be different than the cell that is employed for preamble transmission, and the PDCCH order may include an SCell index. At least a non-contention based RA procedure may be supported for SCell(s) assigned to sTAG(s).

Figure 9:
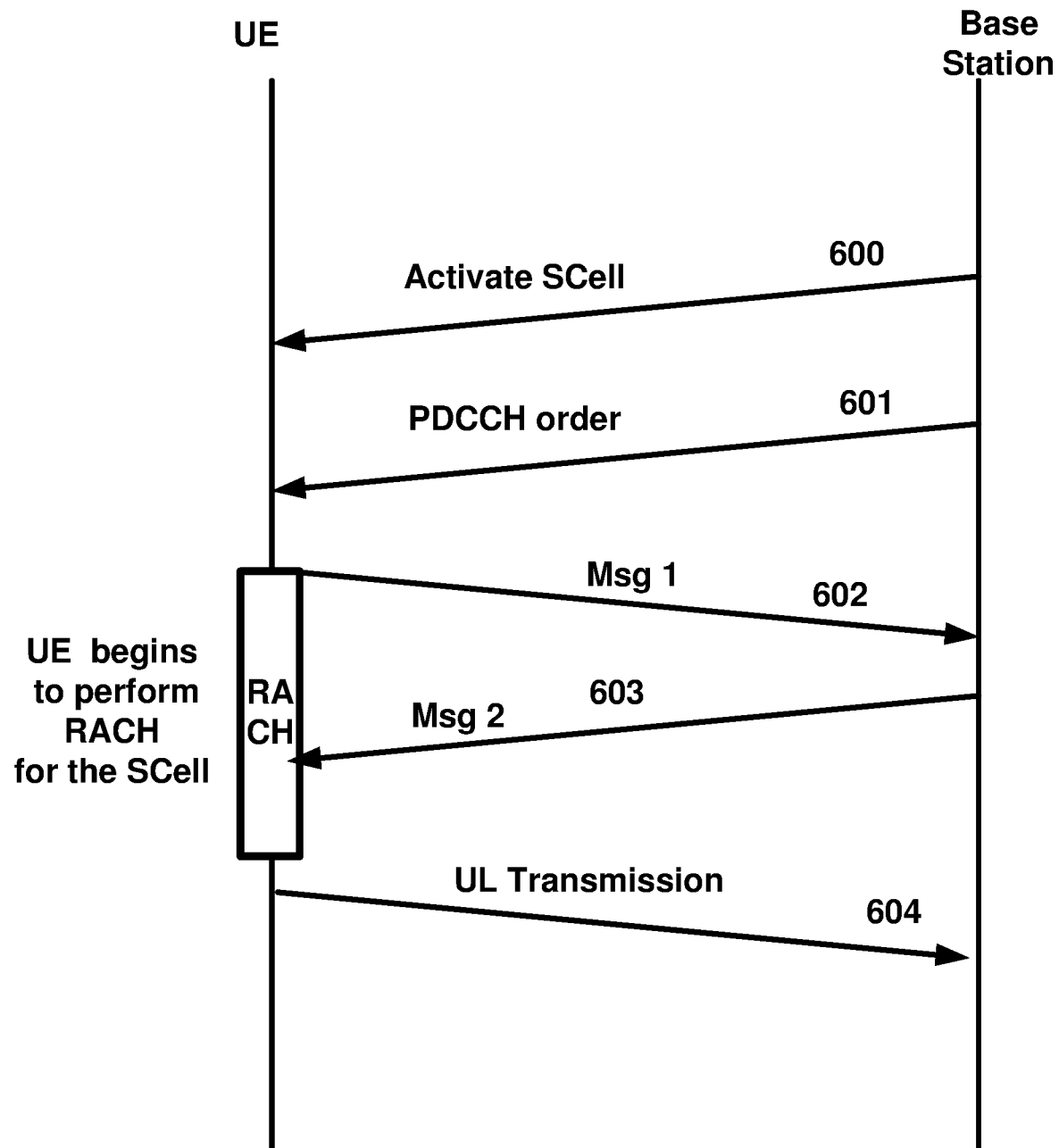
FIG. 9 is an example message flow in a random access process in a secondary TAG as per an aspect of an embodiment of the present disclosure.

FIG. 9 is an example message flow in a random access process in a secondary TAG as per an aspect of an embodiment of the present disclosure. An eNB transmits an activation command 900 to activate an SCell. A preamble 902 (Msg1) may be sent by a UE in response to a PDCCH order 901 on an SCell belonging to an sTAG. In an example embodiment, preamble transmission for SCells may be controlled by the network using PDCCH format 1A. Msg2 message 903 (RAR: random access response) in response to the preamble transmission on the SCell may be addressed to RA-RNTI in a PCell common search space (CSS). Uplink packets 904 may be transmitted on the SCell in which the preamble was transmitted.

According to some of the various aspects of embodiments, initial timing alignment may be achieved through a random access procedure. This may involve a UE transmitting a random access preamble and an eNB responding with an initial TA command NTA (amount of timing advance) within a random access response window. The start of the random access preamble may be aligned with the start of a corresponding uplink subframe at the UE assuming NTA=0. The eNB may estimate the uplink timing from the random access preamble transmitted by the UE. The TA command may be derived by the eNB based on the estimation of the difference between the desired UL timing and the actual UL timing. The UE may determine the initial uplink transmission timing relative to the corresponding downlink of the sTAG on which the preamble is transmitted.

The mapping of a serving cell to a TAG may be configured by a serving eNB with RRC signaling. The mechanism for TAG configuration and reconfiguration may be based on RRC signaling. According to some of the various aspects of embodiments, when an eNB performs an SCell addition configuration, the related TAG configuration may be configured for the SCell. In an example embodiment, an eNB may modify the TAG configuration of an S Cell by removing (releasing) the SCell and adding (configuring) a new SCell (with the same physical cell ID and frequency) with an updated TAG ID. The new SCell with the updated TAG ID may initially be inactive subsequent to being assigned the updated TAG ID. The eNB may activate the updated new SCell and start scheduling packets on the activated SCell. In an example implementation, it may not be possible to change the TAG associated with an SCell, but rather, the SCell may need to be removed and a new SCell may need to be added with another TAG. For example, if there is a need to move an SCell from an sTAG to a pTAG, at least one RRC message, for example, at least one RRC reconfiguration message, may be send to the UE to reconfigure TAG configurations by releasing the SCell and then configuring the SCell as a part of the pTAG (when an SCell is added/configured without a TAG index, the SCell may be explicitly assigned to the pTAG). The PCell may not change its TA group and may be a member of the pTAG.

The purpose of an RRC connection reconfiguration procedure may be to modify an RRC connection, (e.g. to establish, modify and/or release RBs, to perform handover, to setup, modify, and/or release measurements, to add, modify, and/or release SCells). If the received RRC Connection Reconfiguration message includes the sCellToReleaseList, the UE may perform an SCell release. If the received RRC Connection Reconfiguration message includes the sCellToAddModList, the UE may perform SCell additions or modification.

In LTE Release-10 and Release-11 CA, a PUCCH is only transmitted on the PCell (PSCell) to an eNB. In LTE-Release 12 and earlier, a UE may transmit PUCCH information on one cell (PCell or PSCell) to a given eNB.

As the number of CA capable UEs and also the number of aggregated carriers increase, the number of PUCCHs and also the PUCCH payload size may increase. Accommodating the PUCCH transmissions on the PCell may lead to a high PUCCH load on the PCell. A PUCCH on an SCell may be introduced to offload the PUCCH resource from the PCell. More than one PUCCH may be configured for example, a PUCCH on a PCell and another PUCCH on an SCell. In the example embodiments, one, two or more cells may be configured with PUCCH resources for transmitting CSI/ACK/NACK to a base station. Cells may be grouped into multiple PUCCH groups, and one or more cell within a group may be configured with a PUCCH. In an example configuration, one SCell may belong to one PUCCH group. SCells with a configured PUCCH transmitted to a base station may be called a PUCCH SCell, and a cell group with a common PUCCH resource transmitted to the same base station may be called a PUCCH group.

In an example embodiment, a MAC entity may have a configurable timer timeAlignmentTimer per TAG. The time-AlignmentTimer may be used to control how long the MAC entity considers the Serving Cells belonging to the associated TAG to be uplink time aligned. The MAC entity may, when a Timing Advance Command MAC control element is received, apply the Timing Advance Command for the indicated TAG; start or restart the timeAlignmentTimer associated with the indicated TAG. The MAC entity may, when a Timing Advance Command is received in a Random Access Response message for a serving cell belonging to a TAG and/or if the Random Access Preamble was not selected by the MAC entity, apply the Timing Advance Command for this TAG and start or restart the timeAlignmentTimer associated with this TAG. Otherwise, if the timeAlignmentTimer associated with this TAG is not running, the Timing Advance Command for this TAG may be applied and the timeAlignmentTimer associated with this TAG started. When the contention resolution is considered not successful, a timeAlignmentTimer associated with this TAG may be stopped. Otherwise, the MAC entity may ignore the received Timing Advance Command.

In example embodiments, a timer is running once it is started, until it is stopped or until it expires; otherwise it may not be running A timer can be started if it is not running or restarted if it is running. For example, a timer may be started or restarted from its initial value.

Example embodiments of the disclosure may enable operation of multi-carrier communications. Other example embodiments may comprise a non-transitory tangible computer readable media comprising instructions executable by one or more processors to cause operation of multi-carrier communications. Yet other example embodiments may comprise an article of manufacture that comprises a non-transitory tangible computer readable machine-accessible medium having instructions encoded thereon for enabling programmable hardware to cause a device (e.g. wireless communicator, UE, base station, etc.) to enable operation of multi-carrier communications. The device may include processors, memory, interfaces, and/or the like. Other example embodiments may comprise communication networks comprising devices such as base stations, wireless devices (or user equipment: UE), servers, switches, antennas, and/or the like.

FIG. 11A, FIG. 11B, FIG. 11C, FIG. 11D, FIG. 11E, and FIG. 11F are example diagrams for architectures of tight interworking between 5G RAN and LTE RAN as per an aspect of an embodiment of the present disclosure. The tight interworking may enable a multiple RX/TX UE in RRC CONNECTED to be configured to utilize radio resources provided by two schedulers located in two base stations (e.g. (e) LTE eNB and gNB) connected via a non-ideal or ideal backhaul over the Xx interface between LTE eNB and gNB or the Xn interface between eLTE eNB and gNB. Base stations involved in tight interworking for a certain UE may assume two different roles: a base station may either act as a master base station or as a secondary base station. In tight interworking, a UE may be connected to one master base station and one secondary base station. Mechanisms implemented in tight interworking may be extended to cover more than two base stations.

In FIG. 11A and FIG. 11B, a master base station may be an LTE eNB, which may be connected to EPC nodes (e.g. to an MME via the S1-C interface and to an S-GW via the S1-U interface), and a secondary base station may be a gNB, which may be a non-standalone node having a control plane connection via an Xx-C interface to an LTE eNB. In the tight interworking architecture of FIG. 11A, a user plane for a gNB may be connected to an S-GW through an LTE eNB via an Xx-U interface between LTE eNB and gNB and an S1-U interface between LTE eNB and S-GW. In the architecture of FIG. 11B, a user plane for a gNB may be connected directly to an S-GW via an S1-U interface between gNB and S-GW.

In FIG. 11C and FIG. 11D, a master base station may be a gNB, which may be connected to NGC nodes (e.g. to a control plane core node via the NG-C interface and to a user plane core node via the NG-U interface), and a secondary base station may be an eLTE eNB, which may be a non-standalone node having a control plane connection via an Xn-C interface to a gNB. In the tight interworking architecture of FIG. 11C, a user plane for an eLTE eNB may be connected to a user plane core node through a gNB via an Xn-U interface between eLTE eNB and gNB and an NG-U interface between gNB and user plane core node. In the architecture of FIG. 11D, a user plane for an eLTE eNB may be connected directly to a user plane core node via an NG-U interface between eLTE eNB and user plane core node.

In FIG. 11E and FIG. 11F, a master base station may be an eLTE eNB, which may be connected to NGC nodes (e.g. to a control plane core node via the NG-C interface and to a user plane core node via the NG-U interface), and a secondary base station may be a gNB, which may be a non-standalone node having a control plane connection via an Xn-C interface to an eLTE eNB. In the tight interworking architecture of FIG. 11E, a user plane for a gNB may be connected to a user plane core node through an eLTE eNB via an Xn-U interface between eLTE eNB and gNB and an NG-U interface between eLTE eNB and user plane core node. In the architecture of FIG. 11F, a user plane for a gNB may be connected directly to a user plane core node via an NG-U interface between gNB and user plane core node.

Figure 12A:
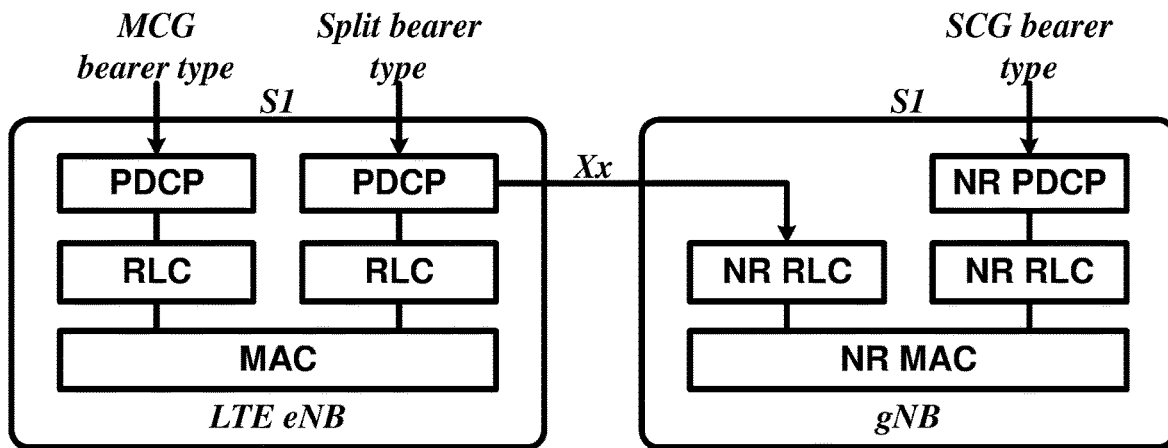
FIG. 12A, FIG. 12B, and FIG. 12C are example diagrams for radio protocol structures of tight interworking bearers as per an aspect of an embodiment of the present disclosure.
Figure 12B:
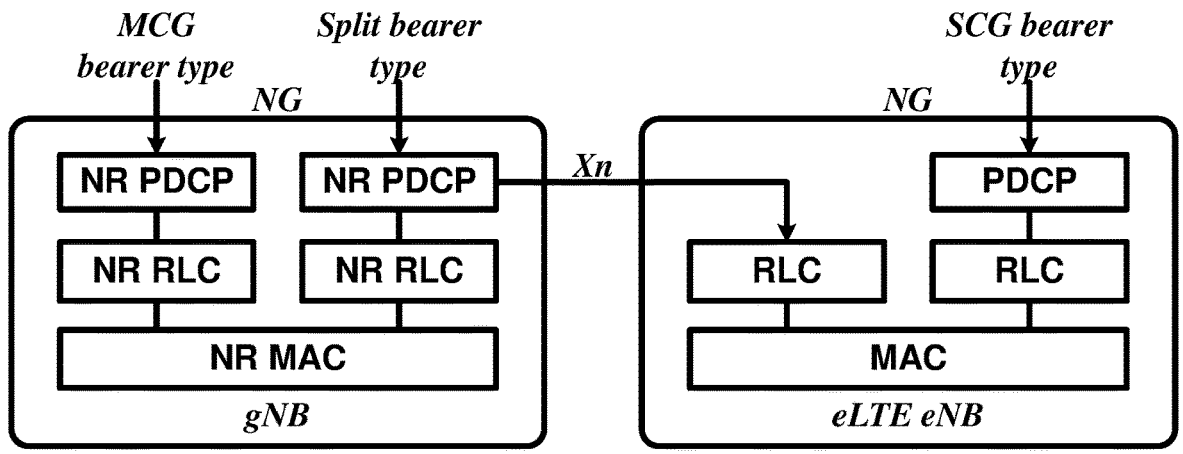
Figure 12C:
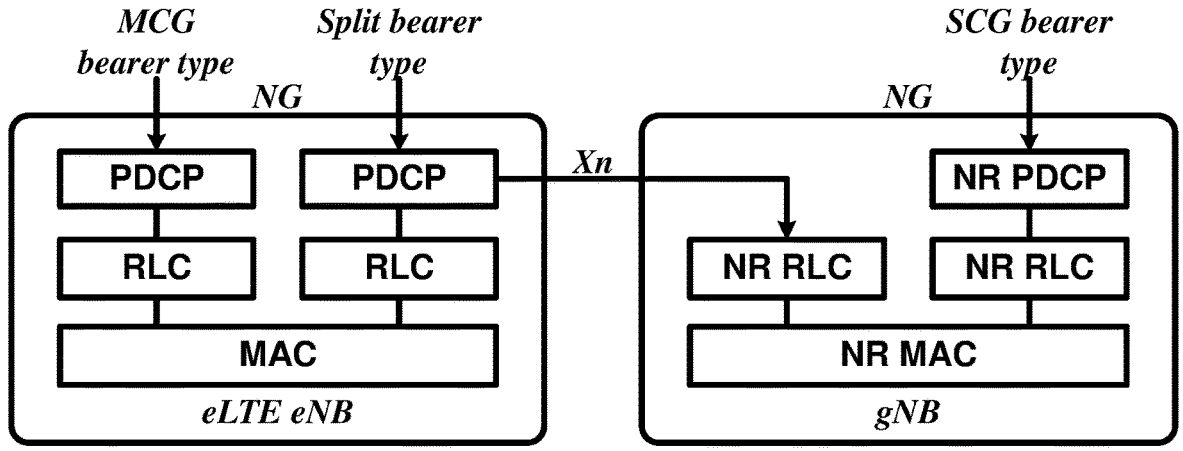

FIG. 12A, FIG. 12B, and FIG. 12C are example diagrams for radio protocol structures of tight interworking bearers as per an aspect of an embodiment of the present disclosure. In FIG. 12A, an LTE eNB may be a master base station, and a gNB may be a secondary base station. In FIG. 12B, a gNB may be a master base station, and an eLTE eNB may be a secondary base station. In FIG. 12C, an eLTE eNB may be a master base station, and a gNB may be a secondary base station. In 5G network, the radio protocol architecture that a particular bearer uses may depend on how the bearer is setup. Three example bearers including an MCG bearer, an SCG bearer, and a split bearer as shown in FIG. 12A, FIG. 12B, and FIG. 12C. NR RRC may be located in master base station, and SRBs may be configured as an MCG bearer type and may use the radio resources of the master base station. Tight interworking may also be described as having at least one bearer configured to use radio resources provided by the secondary base station. Tight interworking may or may not be configured/implemented in example embodiments of the disclosure.

In the case of tight interworking, the UE may be configured with two MAC entities: one MAC entity for master base station, and one MAC entity for secondary base station. In tight interworking, the configured set of serving cells for a UE may comprise of two subsets: the Master Cell Group (MCG) containing the serving cells of the master base station, and the Secondary Cell Group (SCG) containing the serving cells of the secondary base station. For a SCG, one or more of the following may be applied: at least one cell in the SCG has a configured UL CC and one of them, named PSCell (or PCell of SCG, or sometimes called PCell), is configured with PUCCH resources; when the SCG is configured, there may be at least one SCG bearer or one split bearer; upon detection of a physical layer problem or a random access problem on a PSCell, or the maximum number of (NR) RLC retransmissions has been reached associated with the SCG, or upon detection of an access problem on a PSCell during a SCG addition or a SCG change: a RRC connection re-establishment procedure may not be triggered, UL transmissions towards cells of the SCG are stopped, a master base station may be informed by the UE of a SCG failure type, for split bearer, the DL data transfer over the master base station is maintained; the RLC AM bearer may be configured for the split bearer; like PCell, PSCell may not be de-activated; PSCell may be changed with a SCG change (e.g. with security key change and a RACH procedure); and/or neither a direct bearer type change between a Split bearer and a SCG bearer nor simultaneous configuration of a SCG and a Split bearer are supported.

With respect to the interaction between a master base station and a secondary base station, one or more of the following principles may be applied: the master base station may maintain the RRM measurement configuration of the UE and may, (e.g., based on received measurement reports, traffic conditions, or bearer types), decide to ask a secondary base station to provide additional resources (serving cells) for a UE; upon receiving a request from the master base station, a secondary base station may create a container that may result in the configuration of additional serving cells for the UE (or decide that it has no resource available to do so); for UE capability coordination, the master base station may provide (part of) the AS configuration and the UE capabilities to the secondary base station; the master base station and the secondary base station may exchange information about a UE configuration by employing of RRC containers (inter-node messages) carried in Xn or Xx messages; the secondary base station may initiate a reconfiguration of its existing serving cells (e.g., PUCCH towards the secondary base station); the secondary base station may decide which cell is the PSCell within the SCG; the master base station may not change the content of the RRC configuration provided by the secondary base station; in the case of a SCG addition and a SCG SCell addition, the master base station may provide the latest measurement results for the SCG cell(s); both a master base station and a secondary base station may know the SFN and subframe offset of each other by OAM, (e.g., for the purpose of DRX alignment and identification of a measurement gap). In an example, when adding a new SCG SCell, dedicated RRC signaling may be used for sending required system information of the cell as for CA, except for the SFN acquired from a MIB of the PSCell of a SCG.

Figure 13A:
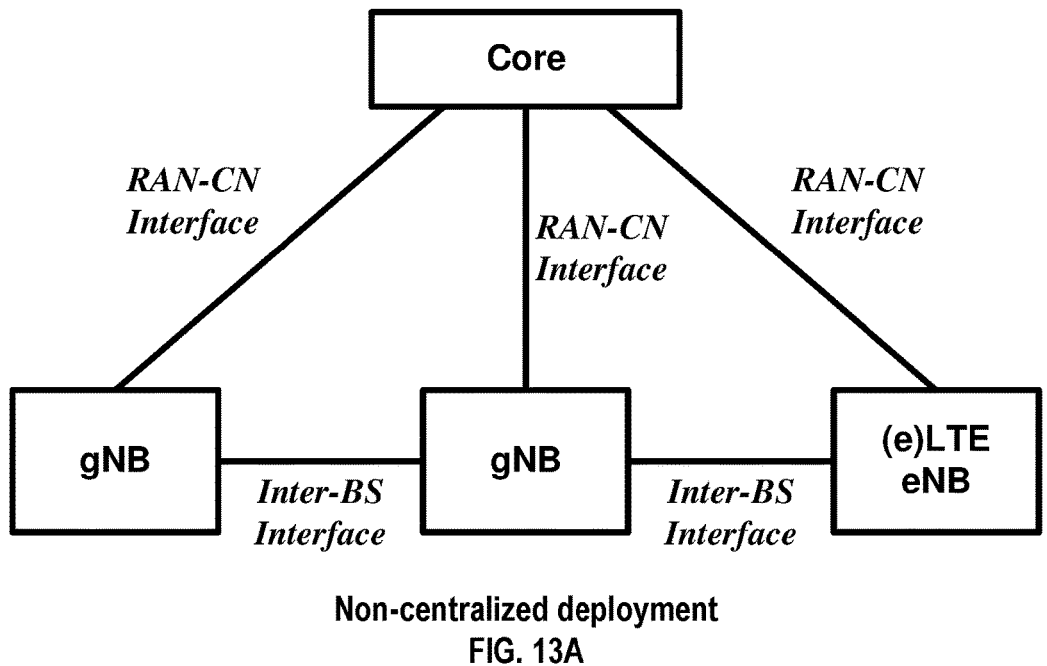
FIG. 13A and FIG. 13B are example diagrams for gNB deployment scenarios as per an aspect of an embodiment of the present disclosure.
Figure 13B:
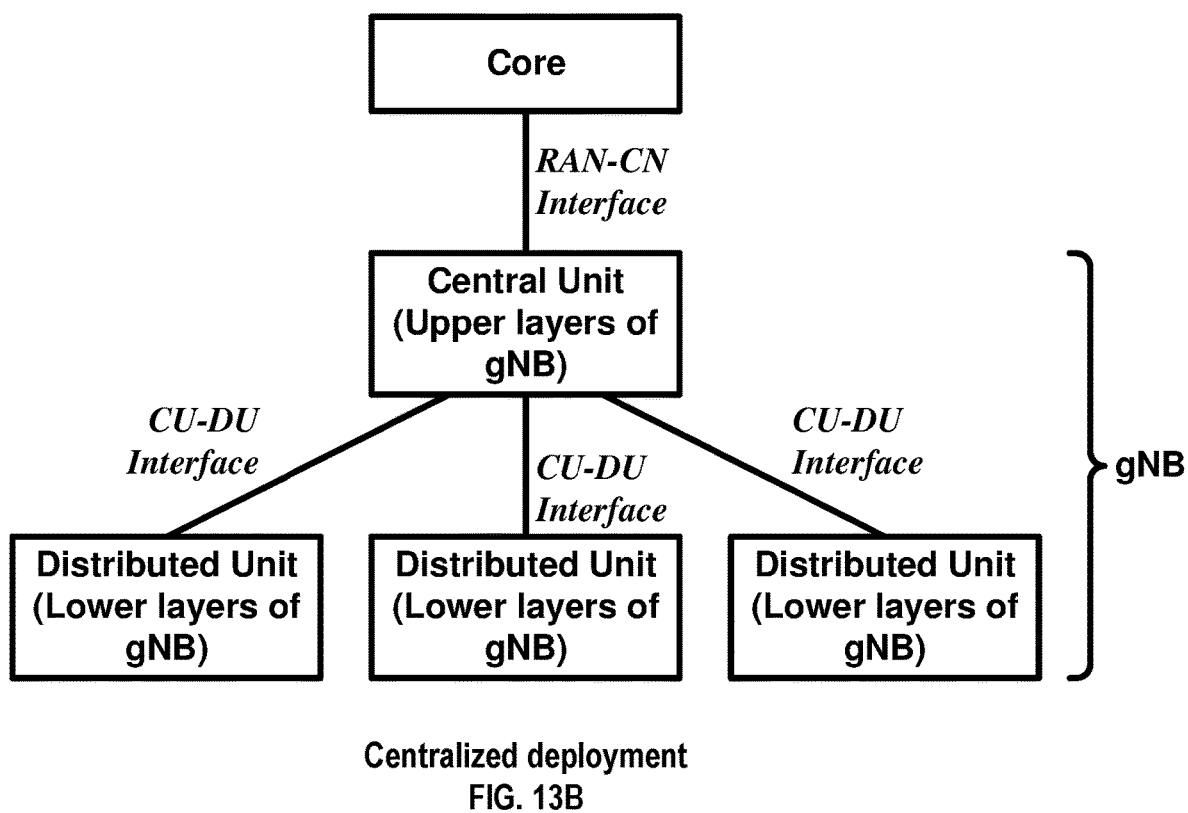

FIG. 13A and FIG. 13B are example diagrams for gNB deployment scenarios as per an aspect of an embodiment of the present disclosure. In the non-centralized deployment scenario in FIG. 13A, the full protocol stack (e.g. NR RRC, NR PDCP, NR RLC, NR MAC, and NR PHY) may be supported at one node. In the centralized deployment scenario in FIG. 13B, upper layers of gNB may be located in a Central Unit (CU), and lower layers of gNB may be located in Distributed Units (DU). The CU-DU interface (e.g. Fs interface) connecting CU and DU may be ideal or non-ideal. Fs-C may provide a control plane connection over Fs interface, and Fs-U may provide a user plane connection over Fs interface. In the centralized deployment, different functional split options between CU and DUs may be possible by locating different protocol layers (RAN functions) in CU and DU. The functional split may support flexibility to move RAN functions between CU and DU depending on service requirements and/or network environments. The functional split option may change during operation after Fs interface setup procedure or may change only in Fs setup procedure (i.e. static during operation after Fs setup procedure).

Figure 14:
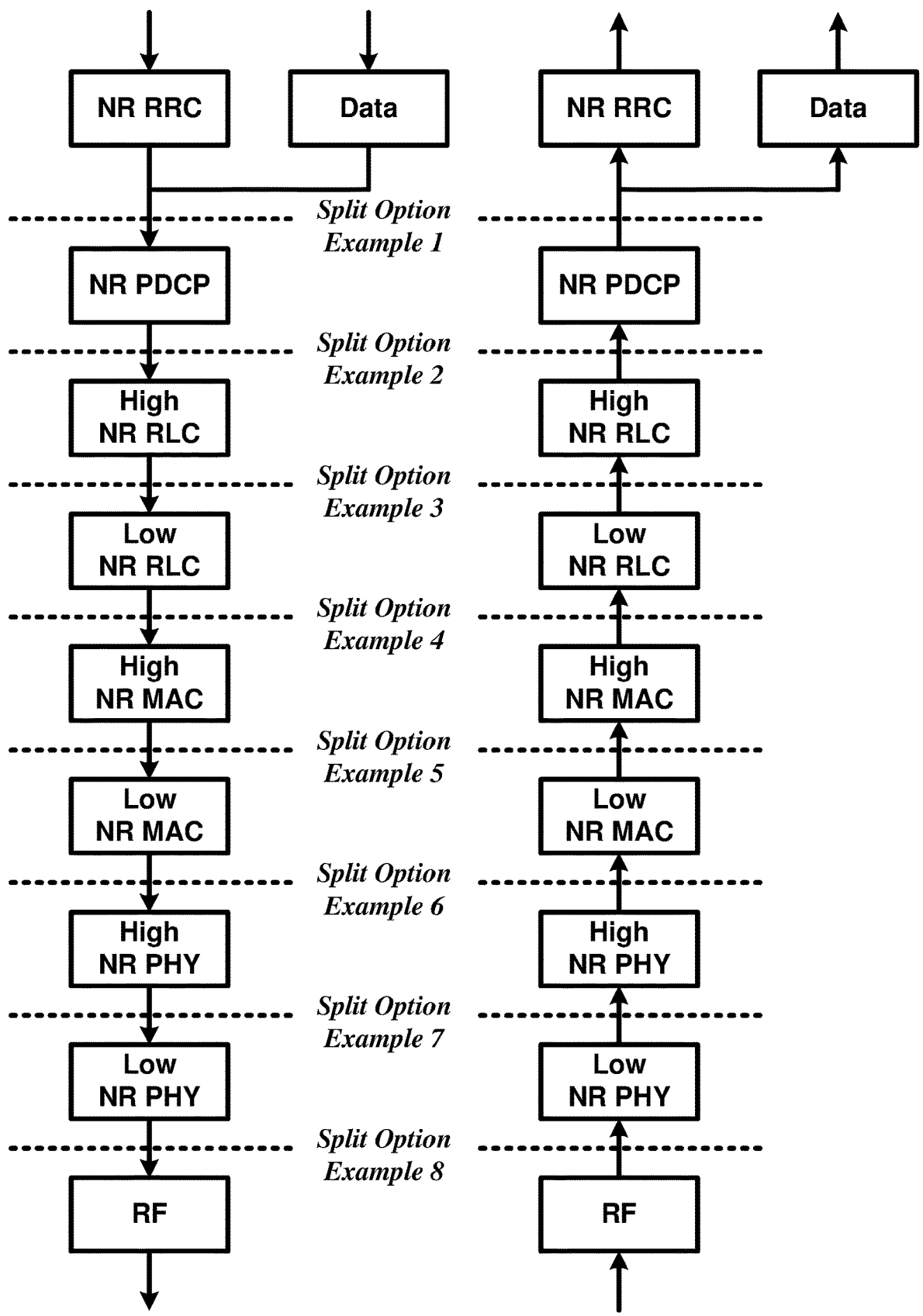
FIG. 14 is an example diagram for functional split option examples of the centralized gNB deployment scenario as per an aspect of an embodiment of the present disclosure.

FIG. 14 is an example diagram for different functional split option examples of the centralized gNB deployment scenario as per an aspect of an embodiment of the present disclosure. In the split option example 1, an NR RRC may be in CU, and NR PDCP, NR RLC, NR MAC, NR PHY, and RF may be in DU. In the split option example 2, an NR RRC and NR PDCP may be in CU, and NR RLC, NR MAC, NR PHY, and RF may be in DU. In the split option example 3, an NR RRC, NR PDCP, and partial function of NR RLC may be in CU, and the other partial function of NR RLC, NR MAC, NR PHY, and RF may be in DU. In the split option example 4, an NR RRC, NR PDCP, and NR RLC may be in CU, and NR MAC, NR PHY, and RF may be in DU. In the split option example 5, an NR RRC, NR PDCP, NR RLC, and partial function of NR MAC may be in CU, and the other partial function of NR MAC, NR PHY, and RF may be in DU. In the split option example 6, an NR RRC, NR PDCP, NR RLC, and NR MAC may be in CU, and NR PHY and RF may be in DU. In the split option example 7, an NR RRC, NR PDCP, NR RLC, NR MAC, and partial function of NR PHY may be in CU, and the other partial function of NR PHY and RF may be in DU. In the split option example 8, an NR RRC, NR PDCP, NR RLC, NR MAC, and NR PHY may be in CU, and RF may be in DU.

The functional split may be configured per CU, per DU, per UE, per bearer, per slice, or with other granularities. In per CU split, a CU may have a fixed split, and DUs may be configured to match the split option of CU. In per DU split, a DU may be configured with a different split, and a CU may provide different split options for different DUs. In per UE split, a gNB (CU and DU) may provide different split options for different UEs. In per bearer split, different split options may be utilized for different bearer types. In per slice splice, different split options may be applied for different slices.

In an example embodiment, the new radio access network (new RAN) may support different network slices, which may allow differentiated treatment customized to support different service requirements with end to end scope. The new RAN may provide a differentiated handling of traffic for different network slices that may be pre-configured and may allow a single RAN node to support multiple slices. The new RAN may support selection of a RAN part for a given network slice, by one or more slice ID(s) or NSSAI(s) provided by a UE or an NGC (e.g. NG CP). The slice ID(s) or NSSAI(s) may identify one or more of pre-configured network slices in a PLMN. For initial attach, a UE may provide a slice ID and/or an NSSAI, and a RAN node (e.g. gNB) may use the slice ID or the NSSAI for routing an initial NAS signaling to an NGC control plane function (e.g. NG CP). If a UE does not provide any slice ID or NSSAI, a RAN node may send a NAS signaling to a default NGC control plane function. For subsequent accesses, the UE may provide a temporary ID for a slice identification, which may be assigned by the NGC control plane function, to enable a RAN node to route the NAS message to a relevant NGC control plane function. The new RAN may support resource isolation between slices. The RAN resource isolation may be achieved by avoiding that shortage of shared resources in one slice breaks a service level agreement for another slice.

The amount of data traffic carried over cellular networks is expected to increase for many years to come. The number of users/devices is increasing, and each user/device accesses an increasing number and variety of services, e.g. video delivery, large files, images. This requires not only high capacity in the network, but also provisioning very high data rates to meet customers' expectations on interactivity and responsiveness. More spectrum is therefore needed for cellular operators to meet the increasing demand. Considering user expectations of high data rates along with seamless mobility, it is beneficial that more spectrum be made available for deploying macro cells as well as small cells for cellular systems.

Striving to meet the market demands, there has been increasing interest from operators in deploying some complementary access utilizing unlicensed spectrum to meet the traffic growth. This is exemplified by the large number of operator-deployed Wi-Fi networks and the 3GPP standardization of LTE/WLAN interworking solutions. This interest indicates that unlicensed spectrum, when present, may be an effective complement to licensed spectrum for cellular operators to help addressing the traffic explosion in some scenarios, such as hotspot areas. LAA offers an alternative for operators to make use of unlicensed spectrum while managing one radio network, thus offering new possibilities for optimizing the network's efficiency.

In an example embodiment, Listen-before-talk (clear channel assessment) may be implemented for transmission in an LAA cell. In a listen-before-talk (LBT) procedure, equipment may apply a clear channel assessment (CCA) check before using the channel. For example, the CCA utilizes at least energy detection to determine the presence or absence of other signals on a channel in order to determine if a channel is occupied or clear, respectively. For example, European and Japanese regulations mandate the usage of LBT in the unlicensed bands. Apart from regulatory requirements, carrier sensing via LBT may be one way for fair sharing of the unlicensed spectrum.

In an example embodiment, discontinuous transmission on an unlicensed carrier with limited maximum transmission duration may be enabled. Some of these functions may be supported by one or more signals to be transmitted from the beginning of a discontinuous LAA downlink transmission. Channel reservation may be enabled by the transmission of signals, by an LAA node, after gaining channel access via a successful LBT operation, so that other nodes that receive the transmitted signal with energy above a certain threshold sense the channel to be occupied. Functions that may need to be supported by one or more signals for LAA operation with discontinuous downlink transmission may include one or more of the following: detection of the LAA downlink transmission (including cell identification) by wireless devices; time & frequency synchronization of wireless devices.

In an example embodiment, DL LAA design may employ subframe boundary alignment according to LTE-A carrier aggregation timing relationships across serving cells aggregated by CA. This may not imply that the base station transmissions may start only at the subframe boundary. LAA may support transmitting PDSCH when not all OFDM symbols are available for transmission in a subframe according to LBT. Delivery of necessary control information for the PDSCH may also be supported.

LBT procedure may be employed for fair and friendly coexistence of LAA with other operators and technologies operating in unlicensed spectrum. LBT procedures on a node attempting to transmit on a carrier in unlicensed spectrum require the node to perform a clear channel assessment to determine if the channel is free for use. An LBT procedure may involve at least energy detection to determine if the channel is being used. For example, regulatory requirements in some regions, e.g., in Europe, specify an energy detection threshold such that if a node receives energy greater than this threshold, the node assumes that the channel is not free. While nodes may follow such regulatory requirements, a node may optionally use a lower threshold for energy detection than that specified by regulatory requirements. In an example, LAA may employ a mechanism to adaptively change the energy detection threshold, e.g., LAA may employ a mechanism to adaptively lower the energy detection threshold from an upper bound. Adaptation mechanism may not preclude static or semi-static setting of the threshold. In an example Category 4 LBT mechanism or other type of LBT mechanisms may be implemented.

Various example LBT mechanisms may be implemented. In an example, for some signals, in some implementation scenarios, in some situations, and/or in some frequencies no LBT procedure may performed by the transmitting entity. In an example, Category 2 (e.g. LBT without random back-off) may be implemented. The duration of time that the channel is sensed to be idle before the transmitting entity transmits may be deterministic. In an example, Category 3 (e.g. LBT with random back-off with a contention window of fixed size) may be implemented. The LBT procedure may have the following procedure as one of its components. The transmitting entity may draw a random number N within a contention window. The size of the contention window may be specified by the minimum and maximum value of N. The size of the contention window may be fixed. The random number N may be employed in the LBT procedure to determine the duration of time that the channel is sensed to be idle before the transmitting entity transmits on the channel. In an example, Category 4 (e.g. LBT with random back-off with a contention window of variable size) may be implemented. The transmitting entity may draw a random number N within a contention window. The size of contention window may be specified by the minimum and maximum value of N. The transmitting entity may vary the size of the contention window when drawing the random number N. The random number N is used in the LBT procedure to determine the duration of time that the channel is sensed to be idle before the transmitting entity transmits on the channel LAA may employ uplink LBT at the wireless device. The UL LBT scheme may be different from the DL LBT scheme (e.g. by using different LBT mechanisms or parameters) for example, since the LAA UL is based on scheduled access which affects a wireless device's channel contention opportunities. Other considerations motivating a different UL LBT scheme include, but are not limited to, multiplexing of multiple wireless devices in a single subframe.

In an example, a DL transmission burst may be a continuous transmission from a DL transmitting node with no transmission immediately before or after from the same node on the same CC. An UL transmission burst from a wireless device perspective may be a continuous transmission from a wireless device with no transmission immediately before or after from the same wireless device on the same CC. In an example, UL transmission burst is defined from a wireless device perspective. In an example, an UL transmission burst may be defined from a base station perspective. In an example, in case of a base station operating DL+UL LAA over the same unlicensed carrier, DL transmission burst(s) and UL transmission burst(s) on LAA may be scheduled in a TDM manner over the same unlicensed carrier. For example, an instant in time may be part of a DL transmission burst or an UL transmission burst.

A New Radio (NR) system may support both single beam and multi-beam operations. In a multi-beam system, a base station (e.g., gNB) may perform a downlink beam sweeping to provide coverage for downlink Synchronization Signals (SS s) and common control channels. A User Equipment (UE) may perform an uplink beam sweeping for uplink direction to access a cell. In a single beam scenario, a gNB may configure time-repetition transmission for one SS block, which may comprise at least Primary Synchronization Signal (PSS), Secondary Synchronization Signal (SSS), and Physical Broadcast Channel (PBCH), with a wide beam. In a multi-beam scenario, a gNB may configure at least some of these signals and physical channels in multiple beams. A UE may identify at least OFDM symbol index, slot index in a radio frame and radio frame number from an SS block.

Figure 15:
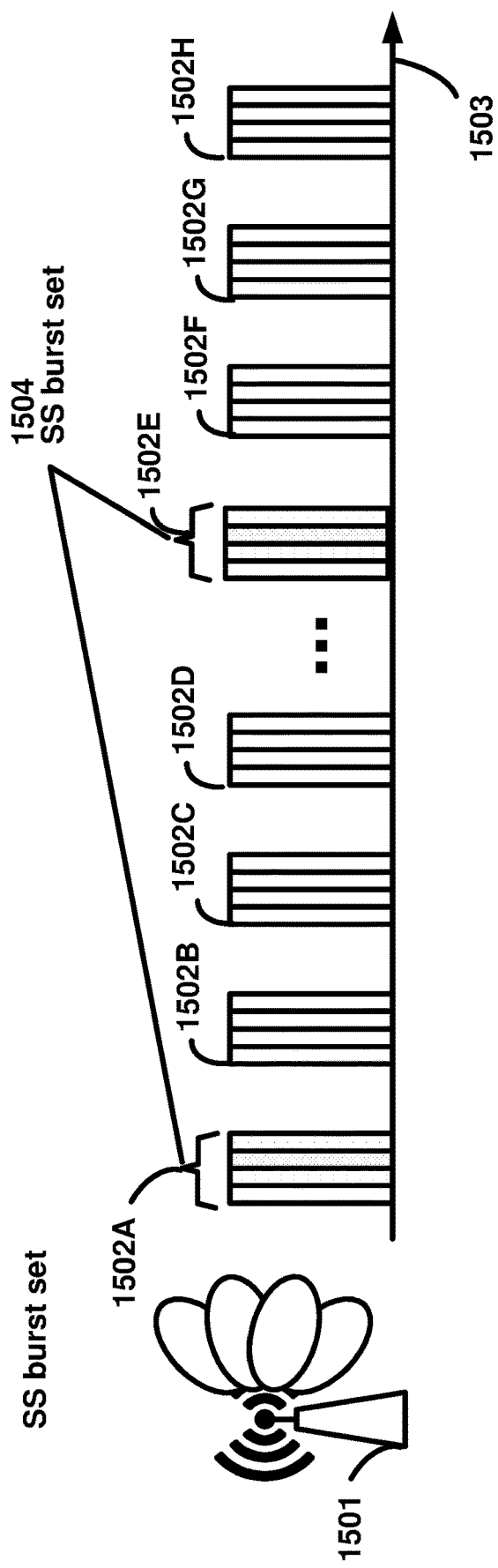
FIG. 15 is an example diagram for synchronization signal block transmissions as per an aspect of an embodiment of the present disclosure.

In an example, in an RRC INACTIVE state or RRC IDLE state, a UE may assume that SS blocks form an SS burst, and an SS burst set. An SS burst set may have a given periodicity. In multi-beam scenarios, SS blocks may be transmitted in multiple beams, together forming an SS burst. One or more SS blocks may be transmitted on one beam. A beam has a steering direction. If multiple SS bursts are transmitted with beams, these SS bursts together may form an SS burst set as shown in FIG. 15. A base station 1501 (e.g., a gNB in NR) may transmit SS bursts 1502A to 1502H during time periods 1503. A plurality of these SS bursts may comprise an SS burst set, such as an SS burst set 1504 (e.g., SS bursts 1502A and 1502E). An SS burst set may comprise any number of a plurality of SS bursts 1502A to 1502H. Each SS burst within an SS burst set may transmitted at a fixed or variable periodicity during time periods 1503.

An SS may be based on Cyclic Prefix-Orthogonal Frequency Division Multiplexing (CP-OFDM). The SS may comprise at least two types of synchronization signals; NR-PSS (Primary synchronization signal) and NR-SSS (Secondary synchronization signal). NR-PSS may be defined at least for initial symbol boundary synchronization to the NR cell. NR-SSS may be defined for detection of NR cell ID or at least part of NR cell ID. NR-SSS detection may be based on the fixed time/frequency relationship with NR-PSS resource position irrespective of duplex mode and beam operation type at least within a given frequency range and CP overhead. Normal CP may be supported for NR-PSS and NR-SSS.

The NR may comprise at least one physical broadcast channel (NR-PBCH). When a gNB transmit (or broadcast) the NR-PBCH, a UE may decode the NR-PBCH based on the fixed relationship with NR-PSS and/or NR-SSS resource position irrespective of duplex mode and beam operation type at least within a given frequency range and CP overhead. NR-PBCH may be a non-scheduled broadcast channel carrying at least a part of minimum system information with fixed payload size and periodicity predefined in the specification depending on carrier frequency range.

In single beam and multi-beam scenarios, NR may comprise an SS block that may support time (frequency, and/or spatial) division multiplexing of NR-PSS, NR-SSS, and NR-PBCH. A gNB may transmit NR-PSS, NR-SSS and/or NR-PBCH within an SS block. For a given frequency band, an SS block may correspond to N OFDM symbols based on the default subcarrier spacing, and N may be a constant. The signal multiplexing structure may be fixed in NR. A wireless device may identify, e.g., from an SS block, an OFDM symbol index, a slot index in a radio frame, and a radio frame number from an SS block.

A NR may support an SS burst comprising one or more SS blocks. An SS burst set may comprise one or more SS bursts. For example, a number of SS bursts within a SS burst set may be finite. From physical layer specification perspective, NR may support at least one periodicity of SS burst set. From UE perspective, SS burst set transmission may be periodic, and UE may assume that a given SS block is repeated with an SS burst set periodicity.

Within an SS burst set periodicity, NR-PBCH repeated in one or more SS blocks may change. A set of possible SS block time locations may be specified per frequency band in an RRC message. The maximum number of SS-blocks within SS burst set may be carrier frequency dependent. The position(s) of actual transmitted SS-blocks may be informed at least for helping CONNECTED/IDLE mode measurement, for helping CONNECTED mode UE to receive downlink (DL) data/control in one or more SS-blocks, or for helping IDLE mode UE to receive DL data/control in one or more SS-blocks. A UE may not assume that the gNB transmits the same number of physical beam(s). A UE may not assume the same physical beam(s) across different SS-blocks within an SS burst set. For an initial cell selection, UE may assume default SS burst set periodicity which may be broadcast via an RRC message and frequency band-dependent. At least for multi-beams operation case, the time index of SS-block may be indicated to the UE.

For CONNECTED and IDLE mode UEs, NR may support network indication of SS burst set periodicity and information to derive measurement timing/duration (e.g., time window for NR-SS detection). A gNB may provide (e.g., via broadcasting an RRC message) one SS burst set periodicity information per frequency carrier to UE and information to derive measurement timing/duration if possible. In case that one SS burst set periodicity and one information regarding timing/duration are indicated, a UE may assume the periodicity and timing/duration for all cells on the same carrier. If a gNB does not provide indication of SS burst set periodicity and information to derive measurement timing/duration, a UE may assume a predefined periodicity, e.g., 5 ms, as the SS burst set periodicity. NR may support set of SS burst set periodicity values for adaptation and network indication.

For initial access, a UE may assume a signal corresponding to a specific subcarrier spacing of NR-PSS/SSS in a given frequency band given by a NR specification. For NR-PSS, a Zadoff-Chu (ZC) sequence may be employed as a sequence for NR-PSS. NR may define at least one basic sequence length for a SS in case of sequence-based SS design. The number of antenna port of NR-PSS may be 1. For NR-PBCH transmission, NR may support a fixed number of antenna port(s). A UE may not be required for a blind detection of NR-PBCH transmission scheme or number of antenna ports. A UE may assume the same PBCH numerology as that of NR-SS. For the minimum system information delivery, NR-PBCH may comprise a part of minimum system information. NR-PBCH contents may comprise at least a part of the SFN (system frame number) or CRC. A gNB may transmit the remaining minimum system information in shared downlink channel via NR-PDSCH.

In a multi-beam example, one or more of PSS, SSS, or PBCH signals may be repeated for a cell, e.g., to support cell selection, cell reselection, and/or initial access procedures. For an SS burst, an associated PBCH or a physical downlink shared channel (PDSCH) scheduling system information may be broadcasted by a base station to multiple wireless devices. The PDSCH may be indicated by a physical downlink control channel (PDCCH) in a common search space. The system information may comprise a physical random access channel (PRACH) configuration for a beam. For a beam, a base station (e.g., a gNB in NR) may have a RACH configuration which may include a PRACH preamble pool, time and/or frequency radio resources, and other power related parameters. A wireless device may use a PRACH preamble from a RACH configuration to initiate a contention-based RACH procedure or a contention-free RACH procedure. A wireless device may perform a 4-step RACH procedure, which may be a contention-based RACH procedure or a contention-free RACH procedure. The wireless device may select a beam associated with an SS block that may have the best receiving signal quality. The wireless device may successfully detect a cell identifier associated with the cell and decode system information with a RACH configuration. The wireless device may use one PRACH preamble and select one PRACH resource from RACH resources indicated by the system information associated with the selected beam. A PRACH resource may comprise at least one of: a PRACH index indicating a PRACH preamble, a PRACH format, a PRACH numerology, time and/or frequency radio resource allocation, power setting of a PRACH transmission, and/or other radio resource parameters. For a contention-free RACH procedure, the PRACH preamble and resource may be indicated in a DCI or other high layer signaling.

In an example, a UE may detect one or more PSS/SSS/PBCH for cell selection/reselection and/or initial access procedures. PBCH, or a Physical Downlink Shared Channel (PDSCH), indicated by a Physical Downlink Control Channel (PDCCH) in common search space, scheduling a system information, such as System Information Block type 2 (SIB2), may be broadcasted to multiple UEs. In an example, SIB2 may carry one or more Physical Random Access Channel (PRACH) configuration. In an example, a gNB may have one or more Random Access Channel (RACH) configuration which may include PRACH preamble pool, time/ frequency radio resources, and other power related parameters. A UE may select a PRACH preamble from a RACH configuration to initiate a contention-based RACH procedure, or a contention-free RACH procedure.

Figure 16B:
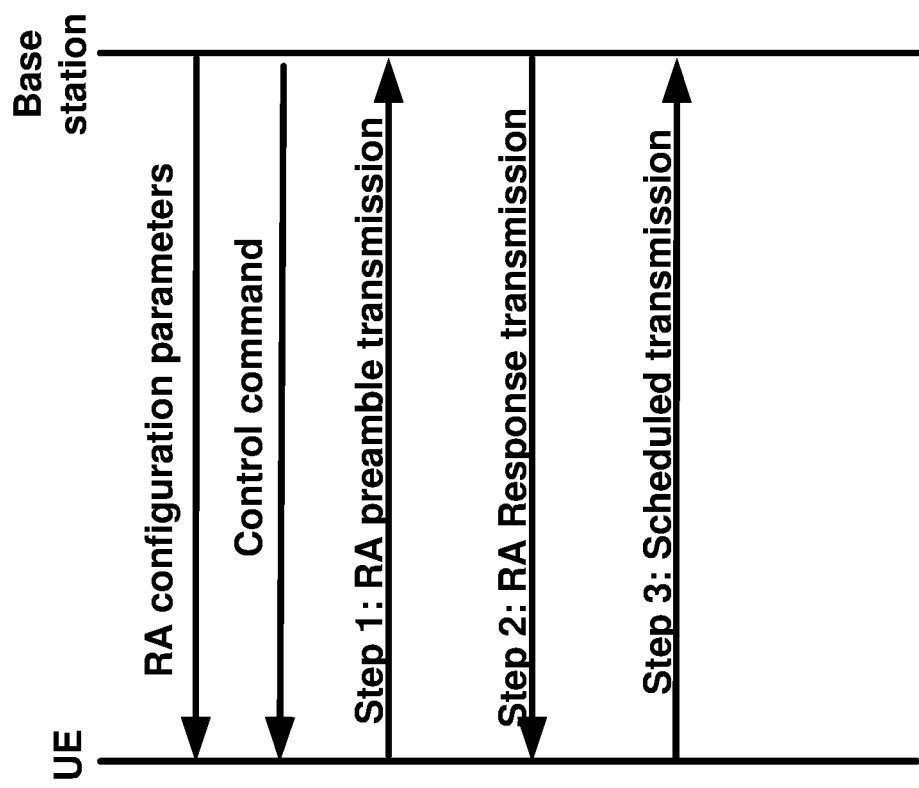
FIG. 16A and FIG. 16B are example diagrams of random access procedures as per an aspect of an embodiment of the present disclosure.
Figure 16A:
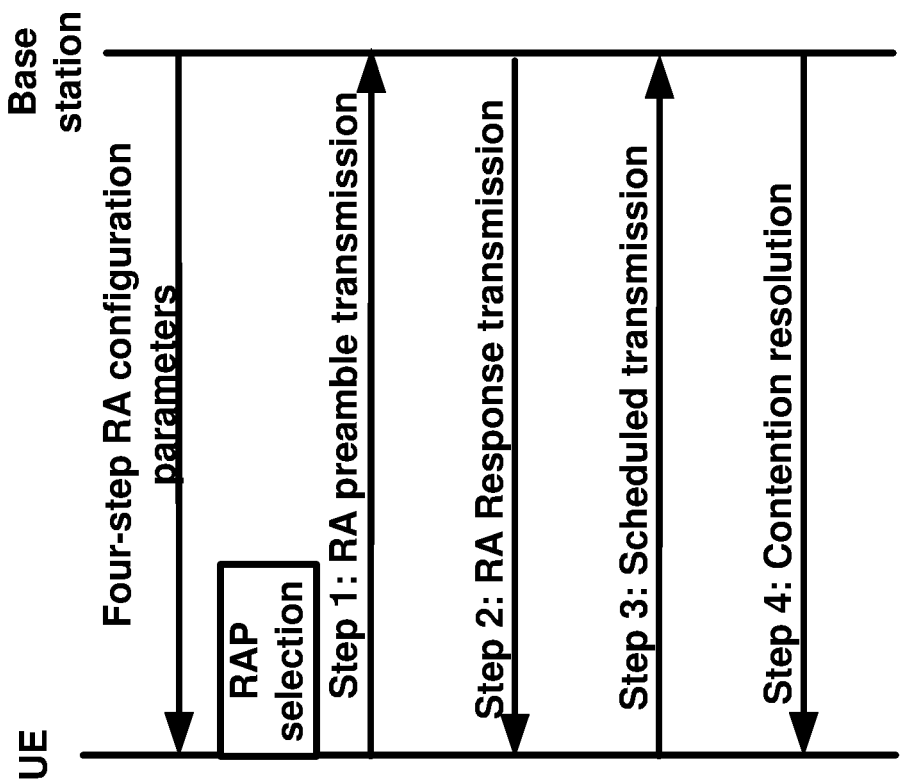

In an example, a UE may perform a 4-step RACH procedure, which may be a contention-based or contention-free RACH procedure. A four-step random access (RA) procedure may comprise RA preamble (RAP) transmission in the first step, random access response (RAR) transmission in the second step, scheduled transmission of one or more transport blocks (TBs) in the third step, and contention resolution in the fourth step as shown in FIG. 16. Specifically, FIG. 16A shows a contention-based 4-step RA procedure, and FIG. 16B shows a contention-free RA procedure.

In the first step, a UE may transmit a RAP using a configured RA preamble format with a Tx beam. RA channel (RACH) resource may be defined as a time-frequency resource to transmit a RAP. Broadcast system information may inform whether a UE needs to transmit one or multiple/repeated preamble within a subset of RACH resources.

A base station may configure an association between DL signal/channel, and a subset of RACH resources and/or a subset of RAP indices, for determining the downlink (DL) transmission in the second step. Based on the DL measurement and the corresponding association, a UE may select the subset of RACH resources and/or the subset of RAP indices. In an example, there may be two RAP groups informed by broadcast system information and one may be optional. If a base station configures the two groups in the four-step RA procedure, a UE may determine which group the UE selects a RAP from, based on the pathloss and a size of the message to be transmitted by the UE in the third step. A base station may use a group type to which a RAP belongs as an indication of the message size in the third step and the radio conditions at a UE. A base station may broadcast the RAP grouping information along with one or more thresholds on system information.

In the second step of the four-step RA procedure, a base station may transmit a RA response (RAR) to the UE in response to reception of a RAP that the UE transmits. A UE may monitor the PDCCH carrying a DCI, to detect RAR transmitted on a PDSCH in a RA Response window. The DCI may be CRC-scrambled by the RA-RNTI (Random Access-Radio Network Temporary Identifier). RA-RNTI may be used on the PDCCH when Random Access Response messages are transmitted. It may unambiguously identify which time-frequency resource is used by the MAC entity to transmit the Random Access preamble. The RA Response window may start at the subframe that contains the end of a RAP transmission plus three subframes. The RA Response window may have a length indicated by ra-ResponseWindowSize. A UE may compute the RA-RNTI associated with the PRACH in which the UE transmits a RAP as: RA-RNTI=1+t_id+10*f_id, where t_id is an index of a first subframe of a specified PRACH (0≤t_id<10), and f_id is an index of a specified PRACH within the subframe, in ascending order of frequency domain (0≤f_id<6). In an example, different types of UEs, e.g. NB-IoT, BL-UE, or UE-EC may employ different formulas for RA-RNTI calculations.

A UE may stop monitoring for RAR(s) after decoding of a MAC packet data unit (PDU) for RAR comprising a RAP identifier (RAPID) that matches the RAP transmitted by the UE. The MAC PDU may comprise one or more MAC RARs and a MAC header that may comprise a subheader having a backoff indicator (BI) and one or more subheader that comprises RAPIDs.

Figure 17:
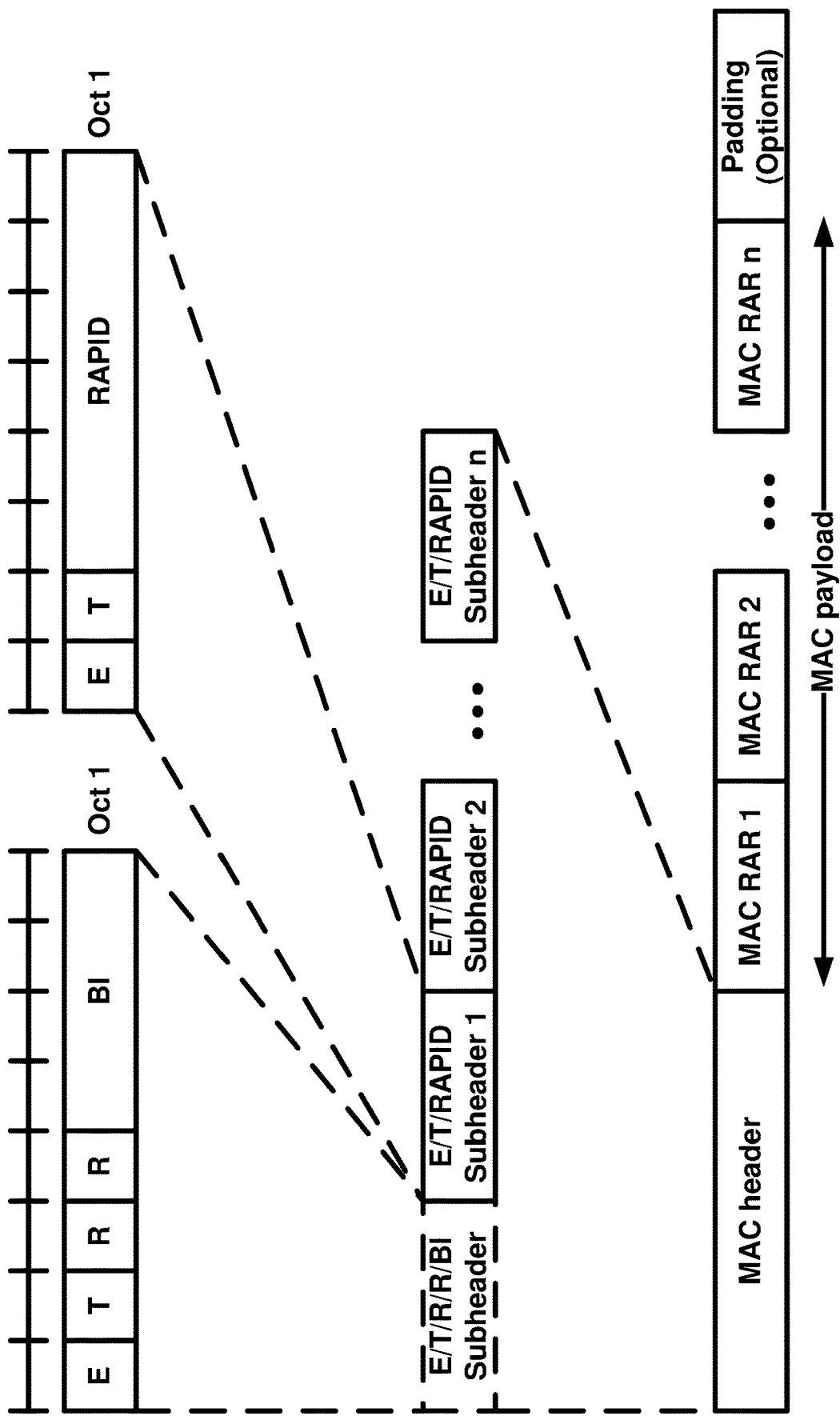
FIG. 17 is an example diagram of a MAC PDU comprising a RAR as per an aspect of an embodiment of the present disclosure.

FIG. 17 illustrates an example of a MAC PDU comprising a MAC header and MAC RARs for a four-step RA procedure. If a RAR comprises a RAPID corresponding to a RAP that a UE transmits, the UE may process the data, such as a timing advance (TA) command, a UL grant, and a Temporary C-RNTI (TC-RNTI), in the RAR.

Figure 18A:
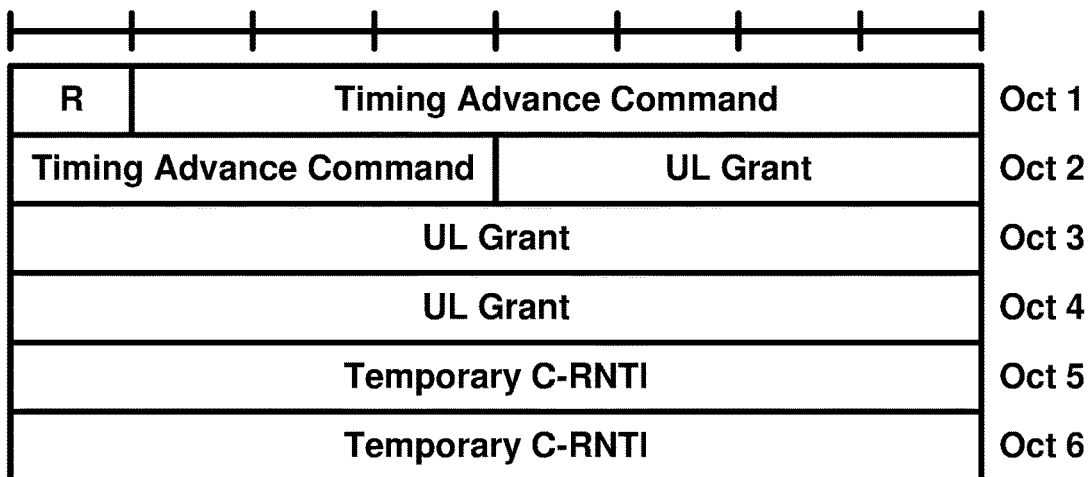
FIG. 18A, FIG. 18B and FIG. 18C are example diagrams of RAR MAC CEs as per an aspect of an embodiment of the present disclosure.
Figure 18B:
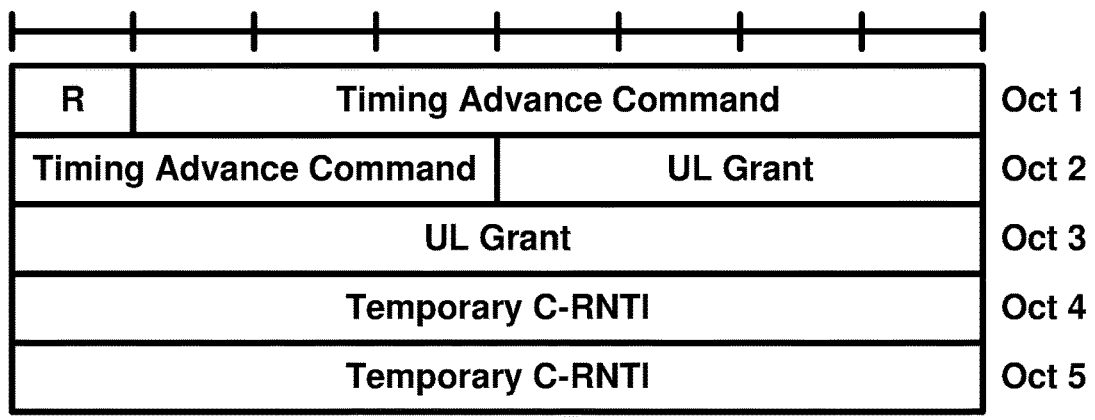
Figure 18C:
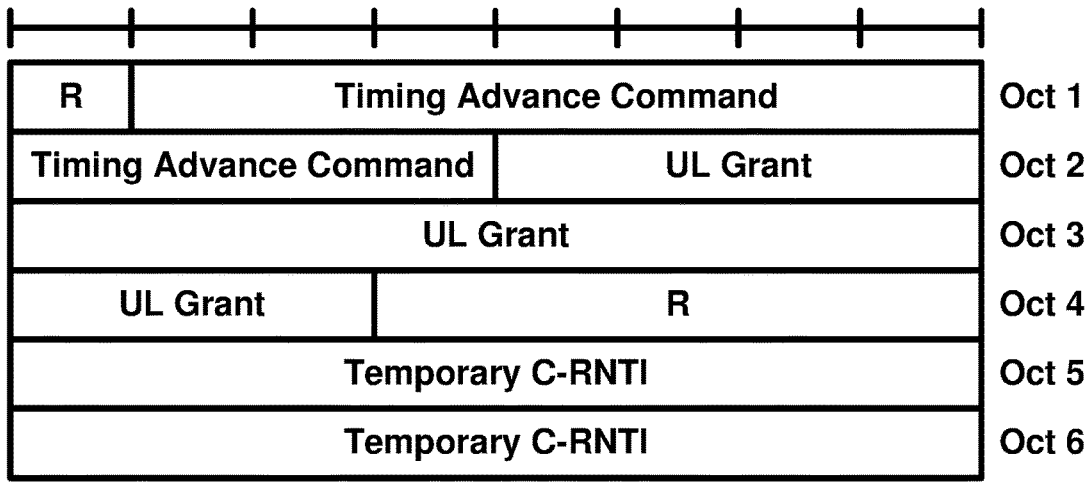

FIG. 18A, FIG. 18B and FIG. 18C show contents of a MAC RAR. Specifically, FIG. 18A shows the contents of a MAC RAR of a normal UE, FIG. 18B shows the contents of a MAC RAR of an MTC UE, and FIG. 18C shows the contents of MAC RAR of a NB-IOT UE.

In the third step of the four-step RA procedure, a UE may adjust UL time alignment by using the TA value corresponding to the TA command in the received RAR in the second step and may transmit the one or more TBs to a base station using the UL resources assigned in the UL grant in the received RAR. The TBs that a UE transmits in the third step may comprise RRC signaling, such as RRC connection request, RRC connection Re-establishment request, or RRC connection resume request, and a UE identity. The identity transmitted in the third step is used as part of the contention-resolution mechanism in the fourth step.

The fourth step in the four-step RA procedure may comprise a DL message for contention resolution. In an example, one or more UEs may perform simultaneous RA attempts selecting the same RAP in the first step and receive the same RAR with the same TC-RNTI in the second step. The contention resolution in the fourth step may be to ensure that a UE does not incorrectly use another UE Identity. The contention resolution mechanism may be based on either C-RNTI on PDCCH or UE Contention Resolution Identity on DL-SCH, depending on whether a UE has a C-RNTI or not. If a UE has C-RNTI, upon detection of C-RNTI on the PDCCH, the UE may determine the success of RA procedure. If a UE does not have C-RNTI pre-assigned, the UE may monitor DL-SCH associated with TC-RNTI that a base station transmits in a RAR of the second step and compare the identity in the data transmitted by the base station on DL-SCH in the fourth step with the identity that the UE transmits in the third step. If the two identities are identical, the UE may determine the success of RA procedure and promote the TC-RNTI to the C-RNTI.

The forth step in the four-step RA procedure may allow HARQ retransmission. A UE may start mac-ContentionResolutionTimer when the UE transmits one or more TBs to a base station in the third step and may restart mac-ContentionResolutionTimer at each HARQ retransmission. When a UE receives data on the DL resources identified by C-RNTI or TC-RNTI in the fourth step, the UE may stop the mac-ContentionResolutionTimer. If the UE does not detect the contention resolution identity that matches to the identity transmitted by the UE in the third step, the UE may determine the failure of RA procedure and discard the TC-RNTI. If mac-ContentionResolutionTimer expires, the UE may determine the failure of RA procedure and discard the TC-RNTI. If the contention resolution is failed, a UE may flush the HARQ buffer used for transmission of the MAC PDU and may restart the four-step RA procedure from the first step. The UE may delay the subsequent RAP transmission by the backoff time randomly selected according to a uniform distribution between 0 and the backoff parameter value corresponding the BI in the MAC PDU for RAR.

In a four-step RA procedure, the usage of the first two steps may be to obtain UL time alignment for a UE and obtain an uplink grant. The third and fourth steps may be used to setup RRC connections, and/or resolve contention from different UEs.

Figure 19:
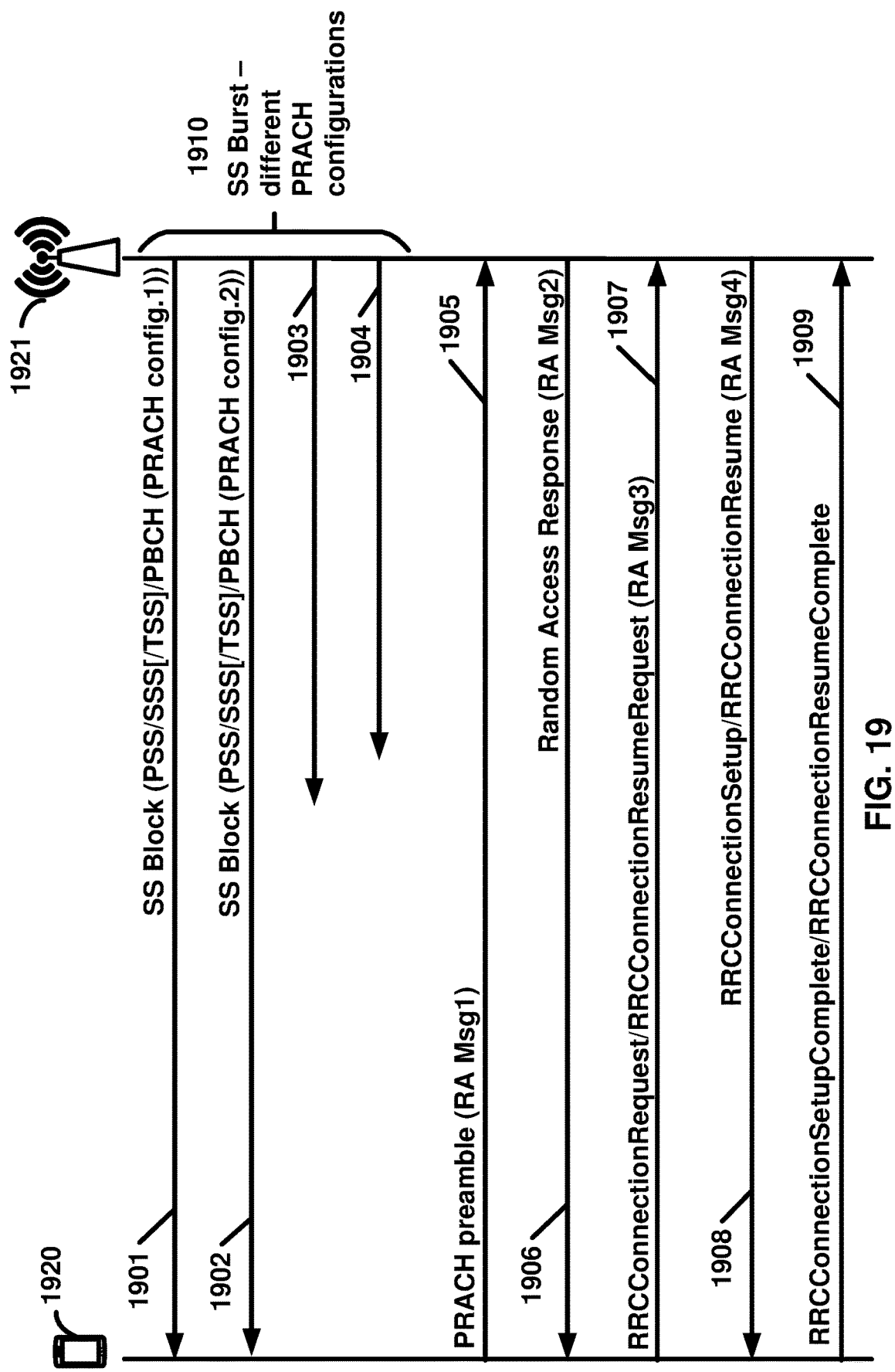
FIG. 19 is an example diagram for random access procedure when configured with multiple beams as per an aspect of an embodiment of the present disclosure.

FIG. 19 shows an example of a random access procedure (e.g., via a RACH) that may include sending, by a base station, one or more SS blocks. A wireless device 1920 (e.g., a UE) may transmit one or more preambles to a base station 1921 (e.g., a gNB in NR). Each preamble transmission by the wireless device may be associated with a separate random access procedure, such as shown in FIG. 19. The random access procedure may begin at step 1901 with a base station 1921 (e.g., a gNB in NR) sending a first SS block to a wireless device 1921 (e.g., a UE). Any of the SS blocks may comprise one or more of a PSS, SSS, tertiary synchronization signal (TSS), or PBCH signal. The first SS block in step 1901 may be associated with a first PRACH configuration. At step 1902, the base station 1921 may send to the wireless device 1920 a second SS block that may be associated with a second PRACH configuration. At step 1903, the base station 1921 may send to the wireless device 1920 a third SS block that may be associated with a third PRACH configuration. At step 1904, the base station 1921 may send to the wireless device 1920 a fourth SS block that may be associated with a fourth PRACH configuration. Any number of SS blocks may be sent in the same manner in addition to, or replacing, steps 1903 and 1904. An SS burst may comprise any number of SS blocks. For example, SS burst 1910 comprises the three SS blocks sent during steps 1902-1904.

The wireless device 1920 may send to the base station 1921 a preamble, at step 1905, e.g., after or in response to receiving one or more SS blocks or SS bursts. The preamble may comprise a PRACH preamble and may be referred to as RA Msg 1. The PRACH preamble may be transmitted in step 1905 according to or based on a PRACH configuration that may be received in an SS block (e.g., one of the SS blocks from steps 1901-1904) that may be determined to be the best SS block beam. The wireless device 1920 may determine a best SS block beam from among SS blocks it may receive prior to sending the PRACH preamble. The base station 1921 may send a random access response (RAR), which may be referred to as RA Msg2, at step 1906, e.g., after or in response to receiving the PRACH preamble. The RAR may be transmitted in step 1906 via a DL beam that corresponds to the SS block beam associated with the PRACH configuration. The base station 1921 may determine the best SS block beam from among SS blocks it previously sent prior to receiving the PRACH preamble. The base station 1621 may receive the PRACH preamble according to or based on the PRACH configuration associated with the best SS block beam.

The wireless device 1920 may send to the base station 1921 an RRCConnectionRequest and/or RRCConnectionResumeRequest message, which may be referred to as RA Msg3, at step 1907, e.g., after or in response to receiving the RAR. The base station 1921 may send to the wireless device 1920 an RRCConnectionSetup and/or RRCConnectionResume message, which may be referred to as RA Msg4, at step 1908, e.g., after or in response to receiving the RRCConnectionRequest and/or RRCConnectionResumeRequest message. The wireless device 1920 may send to the base station 1921 an RRCConnectionSetupComplete and/or RRCConnectionResumeComplete message, which may be referred to as RA Msg5, at step 1909, e.g., after or in response to receiving the RRCConnectionSetup and/or RRCConnectionResume. An RRC connection may be established between the wireless device 1920 and the base station 1921, and the random access procedure may end, e.g., after or in response to receiving the RRCConnectionSetupComplete and/or RRCConnectionResumeComplete message.

A best beam, including but not limited to a best SS block beam, may be determined based on a channel state information reference signal (CSI-RS). A wireless device may use a CSI-RS in a multi-beam system for estimating the beam quality of the links between the wireless device and a base station. For example, based on a measurement of a CSI-RS, a wireless device may report CSI for downlink channel adaption. A CSI parameter may include a precoding matrix index (PMI), a channel quality index (CQI) value, and/or a rank indicator (RI). A wireless device may report a beam index based on a reference signal received power (RSRP) measurement on a CSI-RS. The wireless device may report the beam index in a CSI resource indication (CRI) for downlink beam selection. A base station may transmit a CSI-RS via a CSI-RS resource, such as via one or more antenna ports, or via one or more time and/or frequency radio resources. A beam may be associated with a CSI-RS. A CSI-RS may comprise an indication of a beam direction. Each of a plurality of beams may be associated with one of a plurality of CSI-RSs. A CSI-RS resource may be configured in a cell-specific way, e.g., via common RRC signaling. Additionally or alternatively, a CSI-RS resource may be configured in a wireless device-specific way, e.g., via dedicated RRC signaling and/or layer 1 and/or layer 2 (L1/L2) signaling. Multiple wireless devices in or served by a cell may measure a cell-specific CSI-RS resource. A dedicated subset of wireless devices in or served by a cell may measure a wireless device-specific CSI-RS resource. A base station may transmit a CSI-RS resource periodically, using aperiodic transmission, or using a multi-shot or semi-persistent transmission. In a periodic transmission, a base station may transmit the configured CSI-RS resource using a configured periodicity in the time domain. In an aperiodic transmission, a base station may transmit the configured CSI-RS resource in a dedicated time slot. In a multi-shot or semi-persistent transmission, a base station may transmit the configured CSI-RS resource in a configured period. A base station may configure different CSI-RS resources in different terms for different purposes. Different terms may include, e.g., cell-specific, device-specific, periodic, aperiodic, multi-shot, or other terms. Different purposes may include, e.g., beam management, CQI reporting, or other purposes.

Figure 20:
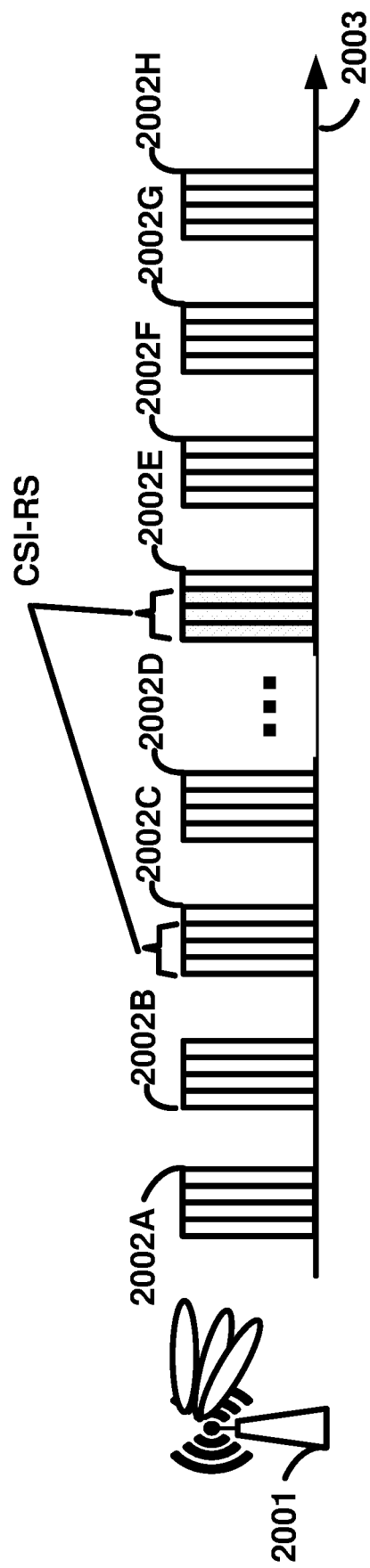
FIG. 20 is an example of channel state information reference signal transmissions when configured with multiple beams as per an aspect of an embodiment of the present disclosure.

FIG. 20 shows an example of transmitting CSI-RSs periodically for a beam. A base station 2001 may transmit a beam in a predefined order in the time domain, such as during time periods 2003. Beams used for a CSI-RS transmission, such as for CSI-RS 2004 in transmissions 2002C and/or 2003E, may have a different beam width relative to a beam width for SS-blocks transmission, such as for SS blocks 2002A, 2002B, 2002D, and 2002F-2002H. Additionally or alternatively, a beam width of a beam used for a CSI-RS transmission may have the same value as a beam width for an SS block. Some or all of one or more CSI-RSs may be included in one or more beams. An SS block may occupy a number of OFDM symbols (e.g., 4), and a number of subcarriers (e.g., 240), carrying a synchronization sequence signal. The synchronization sequence signal may identify a cell.

Figure 21:
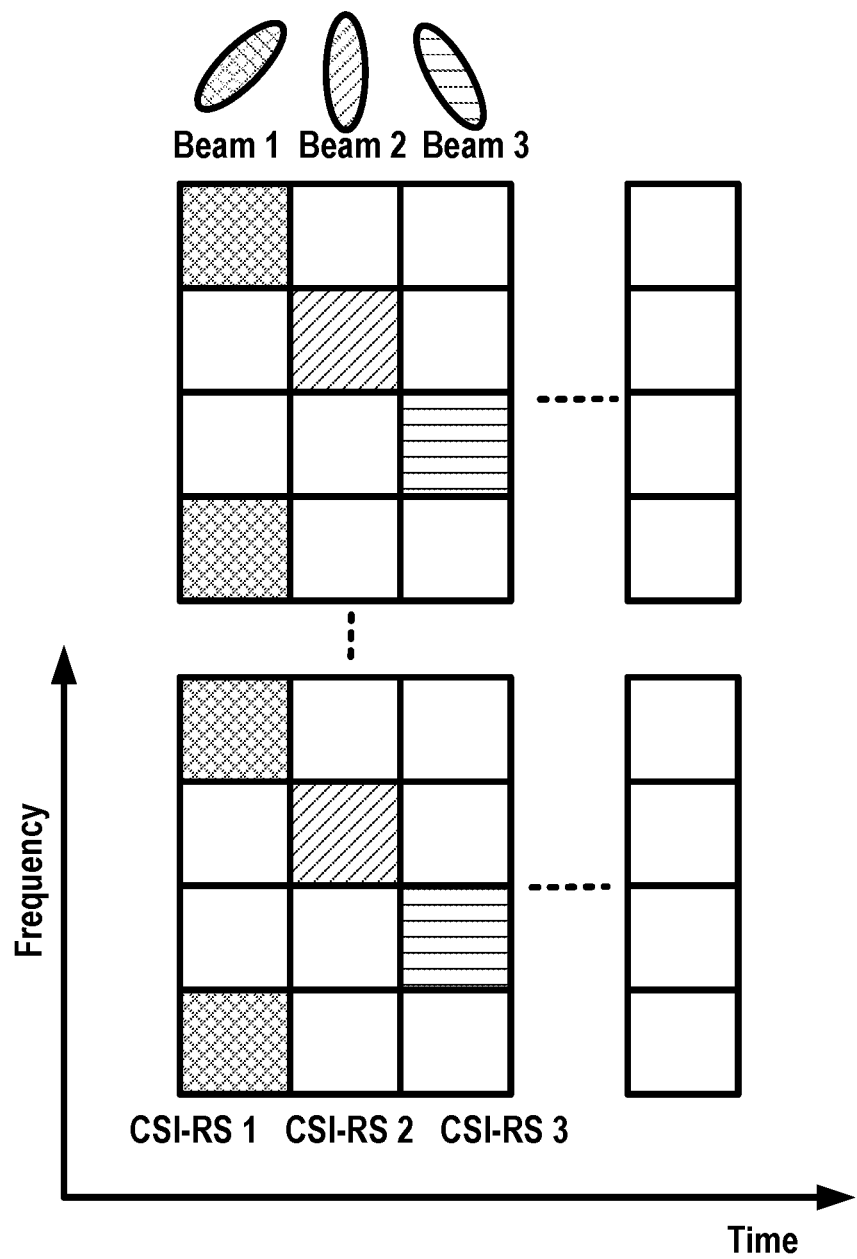
FIG. 21 is an example of channel state information reference signal transmissions when configured with multiple beams as per an aspect of an embodiment of the present disclosure.

FIG. 21 shows an example of a CSI-RS that may be mapped in time and frequency domains. Each square shown in FIG. 21 may represent a resource block within a bandwidth of a cell. Each resource block may comprise a number of subcarriers. A cell may have a bandwidth comprising a number of resource blocks. A base station (e.g., a gNB in NR) may transmit one or more Radio Resource Control (RRC) messages comprising CSI-RS resource configuration parameters for one or more CSI-RS. One or more of the following parameters may be configured by higher layer signaling for each CSI-RS resource configuration: CSI-RS resource configuration identity, number of CSI-RS ports, CSI-RS configuration (e.g., symbol and RE locations in a subframe), CSI-RS subframe configuration (e.g., subframe location, offset, and periodicity in a radio frame), CSI-RS power parameter, CSI-RS sequence parameter, CDM type parameter, frequency density, transmission comb, QCL parameters (e.g., QCL-scramblingidentity, crs-portscount, mbsfn-subframeconfiglist, csi-rs-configZPid, qcl-csi-rs-configNZPid), and/or other radio resource parameters.

FIG. 21 shows three beams that may be configured for a wireless device, e.g., in a wireless device-specific configuration. Any number of additional beams (e.g., represented by the column of blank squares) or fewer beams may be included. Beam 1 may be allocated with CSI-RS 1 that may be transmitted in some subcarriers in a resource block (RB) of a first symbol. Beam 2 may be allocated with CSI-RS 2 that may be transmitted in some subcarriers in an RB of a second symbol. Beam 3 may be allocated with CSI-RS 3 that may be transmitted in some subcarriers in an RB of a third symbol. All subcarriers in an RB may not necessarily be used for transmitting a particular CSI-RS (e.g., CSI-RS 1) on an associated beam (e.g., beam 1) for that CSI-RS. By using frequency division multiplexing (FDM), other subcarriers, not used for beam 1 for the wireless device in the same RB, may be used for other CSI-RS transmissions associated with a different beam for other wireless devices. Additionally or alternatively, by using time domain multiplexing (TDM), beams used for a wireless device may be configured such that different beams (e.g., beam 1, beam 2, and beam 3) for the wireless device may be transmitted using some symbols different from beams of other wireless devices.

Beam management may use a device-specific configured CSI-RS. In a beam management procedure, a wireless device may monitor a channel quality of a beam pair link comprising a transmitting beam by a base station (e.g., a gNB in NR) and a receiving beam by the wireless device (e.g., a UE). When multiple CSI-RSs associated with multiple beams are configured, a wireless device may monitor multiple beam pair links between the base station and the wireless device.

A wireless device may transmit one or more beam management reports to a base station. A beam management report may indicate one or more beam pair quality parameters, comprising, e.g., one or more beam identifications, RSRP, PMI, CQI, and/or RI, of a subset of configured beams.

A base station and/or a wireless device may perform a downlink L1/L2 beam management procedure. One or more downlink L1/L2 beam management procedures may be performed within one or multiple transmission and receiving points (TRPs), such as shown in FIG. 23A and FIG. 23B, respectively.

FIG. 22 shows examples of three beam management procedures, P1, P2, and P3. Procedure P1 may be used to enable a wireless device measurement on different transmit (Tx) beams of a TRP (or multiple TRPs), e.g., to support a selection of Tx beams and/or wireless device receive (Rx) beam(s) (shown as ovals in the top row and bottom row, respectively, of P1). Beamforming at a TRP (or multiple TRPs) may include, e.g., an intra-TRP and/or inter-TRP Tx beam sweep from a set of different beams (shown, in the top rows of P1 and P2, as ovals rotated in a counter-clockwise direction indicated by the dashed arrow). Beamforming at a wireless device 2201, may include, e.g., a wireless device Rx beam sweep from a set of different beams (shown, in the bottom rows of P1 and P3, as ovals rotated in a clockwise direction indicated by the dashed arrow). Procedure P2 may be used to enable a wireless device measurement on different Tx beams of a TRP (or multiple TRPs) (shown, in the top row of P2, as ovals rotated in a counter-clockwise direction indicated by the dashed arrow), e.g., which may change inter-TRP and/or intra-TRP Tx beam(s). Procedure P2 may be performed, e.g., on a smaller set of beams for beam refinement than in procedure P1. P2 may be a particular example of P1. Procedure P3 may be used to enable a wireless device measurement on the same Tx beam (shown as oval in P3), e.g., to change a wireless device Rx beam if the wireless device 2201 uses beamforming A wireless device 2201 (e.g., a UE) and/or a base station 2202 (e.g., a gNB) may trigger a beam failure recovery mechanism. The wireless device 2201 may trigger a beam failure recovery (BFR) request transmission, e.g., if a beam failure event occurs. A beam failure event may include, e.g., a determination that a quality of beam pair link(s) of an associated control channel is unsatisfactory. A determination of an unsatisfactory quality of beam pair link(s) of an associated channel may be based on the quality falling below a threshold and/or an expiration of a timer.

The wireless device 2201 may measure a quality of beam pair link(s) using one or more reference signals (RS). One or more SS blocks, one or more CSI-RS resources, and/or one or more demodulation reference signals (DM-RSs) of a PBCH may be used as a RS for measuring a quality of a beam pair link. Each of the one or more CSI-RS resources may be associated with a CSI-RS resource index (CRI). A quality of a beam pair link may be based on one or more of an RSRP value, reference signal received quality (RSRQ) value, and/or CSI value measured on RS resources. The base station 2202 may indicate that an RS resource, e.g., that may be used for measuring a beam pair link quality, is quasi-co-located (QCLed) with one or more DM-RSs of a control channel. The RS resource and the DM-RSs of the control channel may be QCLed when the channel characteristics from a transmission via an RS to the wireless device 2201, and the channel characteristics from a transmission via a control channel to the wireless device, are similar or the same under a configured criterion.

Figure 23A:
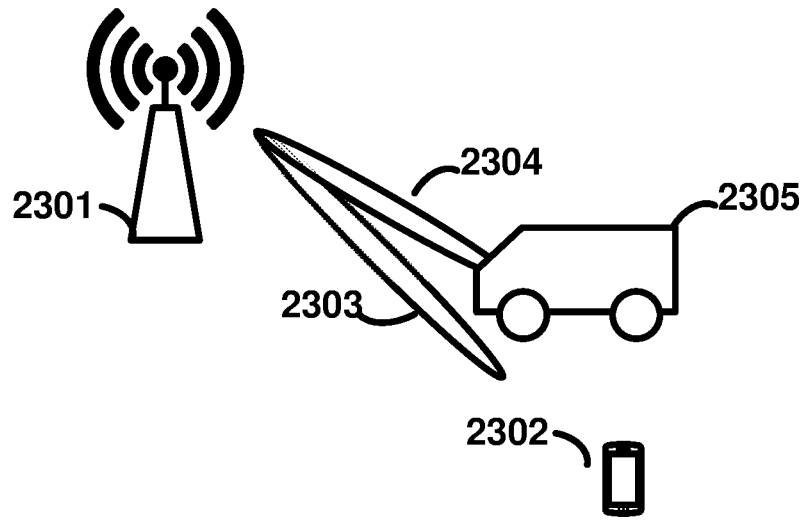
FIG. 23A is an example diagram for downlink beam failure scenario in a transmission receiving point (TRP) as per an aspect of an embodiment of the present disclosure.
Figure 23B:
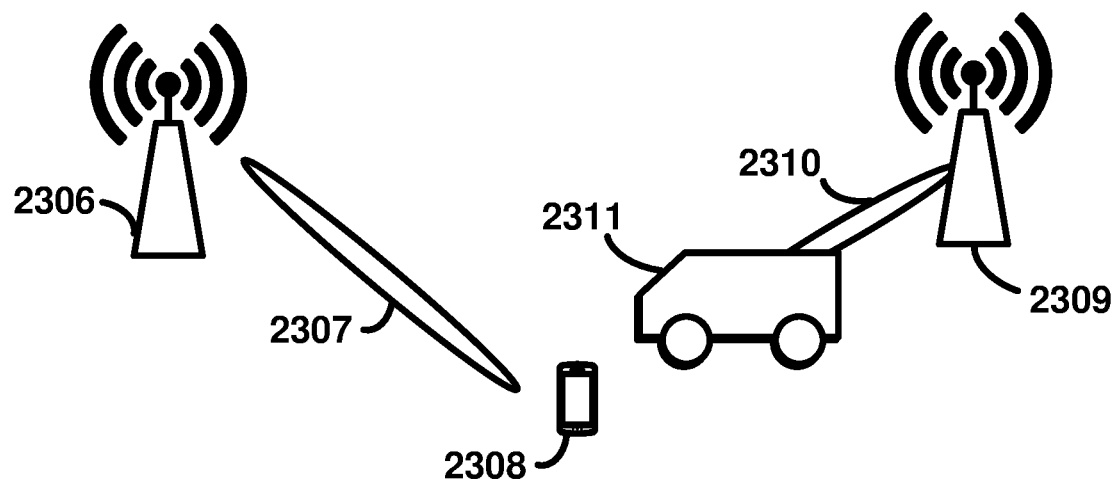
FIG. 23B is an example diagram for downlink beam failure scenario in multiple TRPs as per an aspect of an embodiment of the present disclosure.

FIG. 23A shows an example of a beam failure event involving a single TRP. A single TRP such as at a base station 2301 may transmit, to a wireless device 2302, a first beam 2303 and a second beam 2304. A beam failure event may occur if, e.g., a serving beam, such as the second beam 2304, is blocked by a moving vehicle 2305 or other obstruction (e.g., building, tree, land, or any object) and configured beams (e.g., the first beam 2303 and/or the second beam 2304), including the serving beam, are received from the single TRP. The wireless device 2302 may trigger a mechanism to recover from beam failure when a beam failure occurs.

FIG. 23B shows an example of a beam failure event involving multiple TRPs. Multiple TRPs, such as at a first base station 2306 and at a second base station 2309, may transmit, to a wireless device 2308, a first beam 2307 (e.g., from the first base station 2306) and a second beam 2310 (e.g., from the second base station 2309). A beam failure event may occur when, e.g., a serving beam, such as the second beam 2310, is blocked by a moving vehicle 2311 or other obstruction (e.g., building, tree, land, or any object) and configured beams (e.g., the first beam 2307 and/or the second beam 2310) are received from multiple TRPs. The wireless device 2008 may trigger a mechanism to recover from beam failure when a beam failure occurs.

A wireless device may monitor a PDCCH, such as a New Radio PDCCH (NR-PDCCH), on M beam pair links simultaneously, where M>1 and the maximum value of M may depend at least on the wireless device capability. Such monitoring may increase robustness against beam pair link blocking. A base station may transmit, and the wireless device may receive, one or more messages configured to cause the wireless device to monitor NR-PDCCH on different beam pair link(s) and/or in different NR-PDCCH OFDM symbol.

A base station may transmit higher layer signaling, and/or a MAC control element (MAC CE), that may comprise parameters related to a wireless device Rx beam setting for monitoring NR-PDCCH on multiple beam pair links. A base station may transmit one or more indications of a spatial QCL assumption between a first DL RS antenna port(s) and a second DL RS antenna port(s). The first DL RS antenna port(s) may be for one or more of a cell-specific CSI-RS, device-specific CSI-RS, SS block, PBCH with DM-RSs of PBCH, and/or PBCH without DM-RSs of PBCH. The second DL RS antenna port(s) may be for demodulation of a DL control channel Signaling for a beam indication for a NR-PDCCH (e.g., configuration to monitor NR-PDCCH) may be via MAC CE signaling, RRC signaling, DCI signaling, or specification-transparent and/or an implicit method, and any combination thereof.

For reception of unicast DL data channel, a base station may indicate spatial QCL parameters between DL RS antenna port(s) and DM-RS antenna port(s) of DL data channel. A base station may transmit DCI (e.g., downlink grants) comprising information indicating the RS antenna port(s). The information may indicate the RS antenna port(s) which may be QCLed with DM-RS antenna port(s). A different set of DM-RS antenna port(s) for the DL data channel may be indicated as a QCL with a different set of RS antenna port(s).

If a base station transmits a signal indicating a spatial QCL parameters between CSI-RS and DM-RS for PDCCH, a wireless device may use CSI-RSs QCLed with DM-RS for a PDCCH to monitor beam pair link quality. If a beam failure event occurs, the wireless device may transmit a beam failure recovery request, such as by a determined configuration.

If a wireless device transmits a beam failure recovery request, e.g., via an uplink physical channel or signal, a base station may detect that there is a beam failure event, for the wireless device, by monitoring the uplink physical channel or signal. The base station may initiate a beam recovery mechanism to recover the beam pair link for transmitting PDCCH between the base station and the wireless device. The base station may transmit one or more control signals, to the wireless device, e.g., after or in response to receiving the beam failure recovery request. A beam recovery mechanism may be, e.g., an L1 scheme, or a higher layer scheme.

A base station may transmit one or more messages comprising, e.g., configuration parameters of an uplink physical channel and/or a signal for transmitting a beam failure recovery request. The uplink physical channel and/or signal may be based on at least one of the following: a non-contention based PRACH (e.g., a beam failure recovery PRACH or BFR-PRACH), which may use a resource orthogonal to resources of other PRACH transmissions; a PUCCH (e.g., beam failure recovery PUCCH or BFR-PUCCH); and/or a contention-based PRACH resource. Combinations of these candidate signal and/or channels may be configured by a base station.

A gNB may respond a confirmation message to a UE after receiving one or multiple BFR request. The confirmation message may include the CRI associated with the candidate beam the UE indicates in the one or multiple BFR request. The confirmation message may be a L1 control information.

In carrier aggregation (CA), two or more component carriers (CCs) may be aggregated. A wireless device may simultaneously receive or transmit on one or more CCs, depending on capabilities of the wireless device, using the technique of CA. In an example, a wireless device may support CA for contiguous CCs and/or for non-contiguous CCs. CCs may be organized into cells. For example, CCs may be organized into one primary cell (PCell) and one or more secondary cells (SCells).

When configured with CA, a wireless device may have one RRC connection with a network. During an RRC connection establishment/re-establishment/handover, a cell providing NAS mobility information may be a serving cell. During an RRC connection re-establishment/handover procedure, a cell providing a security input may be a serving cell. In an example, the serving cell may denote a PCell. In an example, a gNB may transmit, to a wireless device, one or more messages comprising configuration parameters of a plurality of one or more SCells, depending on capabilities of the wireless device.

When configured with CA, a base station and/or a wireless device may employ an activation/deactivation mechanism of an SCell to improve battery or power consumption of the wireless device. When a wireless device is configured with one or more SCells, a gNB may activate or deactivate at least one of the one or more SCells. Upon configuration of an SCell, the SCell may be deactivated unless an SCell state associated with the SCell is set to "activated" or "dormant".

In an example, a wireless device may activate/deactivate an SCell in response to receiving an SCell Activation/Deactivation MAC CE.

In an example, a gNB may transmit, to a wireless device, one or more messages comprising an SCell timer (e.g., sCellDeactivationTimer). In an example, a wireless device may deactivate an SCell in response to an expiry of the SCell timer.

When a wireless device receives an SCell Activation/Deactivation MAC CE activating an SCell, the wireless device may activate the SCell. In response to the activating the SCell, the wireless device may perform operations comprising: SRS transmissions on the SCell; CQI/PMI/RI/CRI reporting for the SCell; PDCCH monitoring on the SCell; PDCCH monitoring for the SCell; and/or PUCCH transmissions on the SCell.

In an example, in response to the activating the SCell, the wireless device may start or restart a first SCell timer (e.g., sCellDeactivationTimer) associated with the SCell. The wireless device may start or restart the first SCell timer in the slot when the SCell Activation/Deactivation MAC CE activating the SCell has been received. In an example, in response to the activating the SCell, the wireless device may (re-)initialize one or more suspended configured uplink grants of a configured grant Type 1 associated with the SCell according to a stored configuration. In an example, in response to the activating the SCell, the wireless device may trigger PHR.

When a wireless device receives an SCell Activation/Deactivation MAC CE deactivating an activated SCell, the wireless device may deactivate the activated SCell. In an example, when a first SCell timer (e.g., sCellDeactivationTimer) associated with an activated SCell expires, the wireless device may deactivate the activated SCell. In response to the deactivating the activated SCell, the wireless device may stop the first SCell timer associated with the activated SCell. In an example, in response to the deactivating the activated S Cell, the wireless device may clear one or more configured downlink assignments, and/or one or more configured uplink grants of a configured uplink grant Type 2 associated with the activated SCell. In an example, in response to the deactivating the activated SCell, the wireless device may: suspend one or more configured uplink grants of a configured uplink grant Type 1 associated with the activated SCell; and/or flush HARQ buffers associated with the activated SCell.

In an example, when an SCell is deactivated, a wireless device may not perform operations comprising: transmitting SRS on the SCell; reporting CQI/PMI/RI/CRI for the SCell; transmitting on UL-SCH on the SCell; transmitting on RACH on the SCell; monitoring at least one first PDCCH on the SCell; monitoring at least one second PDCCH for the SCell; and/or transmitting a PUCCH on the SCell.

In an example, when at least one first PDCCH on an activated SCell indicates an uplink grant or a downlink assignment, a wireless device may restart a first SCell timer (e.g., sCellDeactivationTimer) associated with the activated SCell. In an example, when at least one second PDCCH on a serving cell (e.g. a PCell or an SCell configured with PUCCH, i.e. PUCCH SCell) scheduling the activated SCell indicates an uplink grant or a downlink assignment for the activated SCell, a wireless device may restart the first SCell timer (e.g., sCellDeactivationTimer) associated with the activated SCell.

In an example, when an SCell is deactivated, if there is an ongoing random access procedure on the SCell, a wireless device may abort the ongoing random access procedure on the SCell.

Figure 24A:
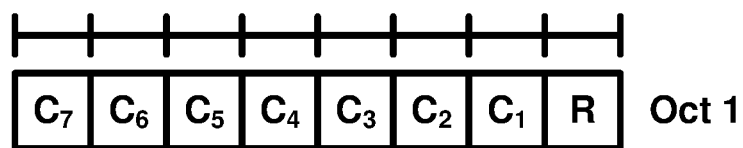
FIG. 24A is an example diagram for a secondary activation/deactivation medium access control control element (MAC CE) as per an aspect of an embodiment of the present disclosure.

FIG. 24A shows an example of an SCell Activation/Deactivation MAC CE of one octet. A first MAC PDU subheader with a first LCID (e.g., '111010') may identify the SCell Activation/Deactivation MAC CE of one octet. The SCell Activation/Deactivation MAC CE of one octet may have a fixed size. The SCell Activation/Deactivation MAC CE of one octet may comprise a single octet. The single octet may comprise a first number of C-fields (e.g. seven) and a second number of R-fields (e.g., one).

Figure 24B:
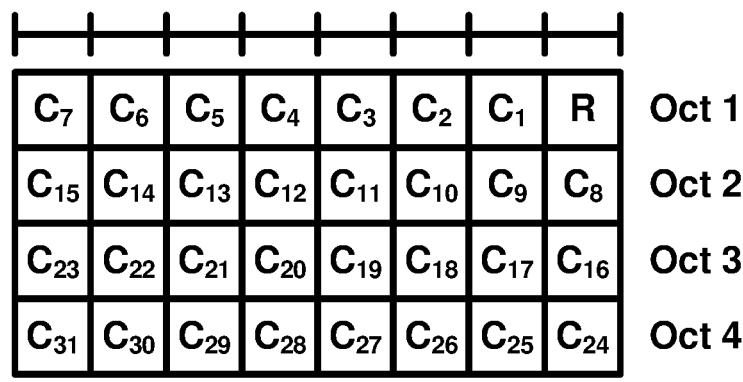
FIG. 24B is an example diagram for a secondary activation/deactivation MAC CE as per an aspect of an embodiment of the present disclosure.

FIG. 24B shows an example of an SCell Activation/Deactivation MAC CE of four octets. A second MAC PDU subheader with a second LCID (e.g., '111001') may identify the SCell Activation/Deactivation MAC CE of four octets. The SCell Activation/Deactivation MAC CE of four octets may have a fixed size. The SCell Activation/Deactivation MAC CE of four octets may comprise four octets. The four octets may comprise a third number of C-fields (e.g., 31) and a fourth number of R-fields (e.g., 1).

In FIG. 24A and/or FIG. 24B, a $C_i$ field may indicate an activation/deactivation status of an SCell with an SCell index i if an SCell with SCell index i is configured. In an example, when the $C_i$ field is set to one, an SCell with an SCell index i may be activated. In an example, when the $C_i$ field is set to zero, an SCell with an SCell index i may be deactivated. In an example, if there is no SCell configured with SCell index i, the wireless device may ignore the $C_i$ field. In FIG. 24A and FIG. 24B, an R field may indicate a reserved bit. The R field may be set to zero.

Figure 25A:
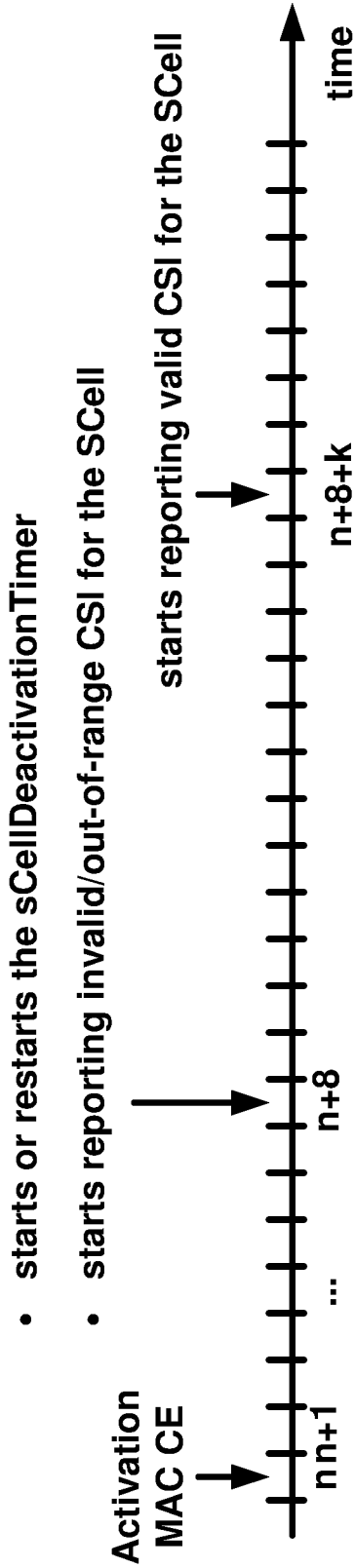
FIG. 25A is an example diagram for timing for CSI report when activation of a secondary cell as per an aspect of an embodiment of the present disclosure.
Figure 25B:
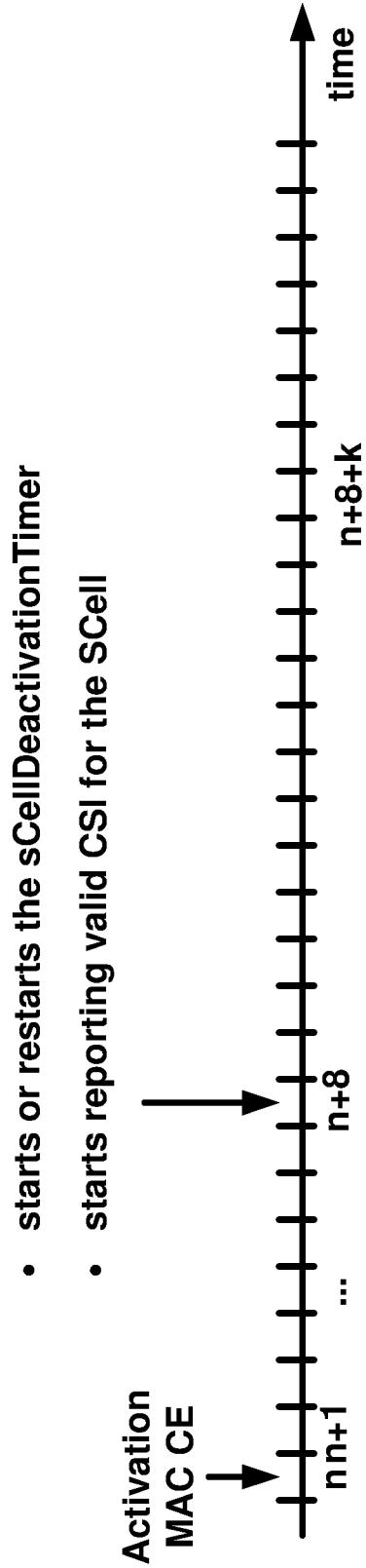
FIG. 25B is an example diagram for timing for CSI report when activation of a secondary cell as per an aspect of an embodiment of the present disclosure.

FIG. 25A and FIG. 25B show timeline when a UE receives a MAC activation command. When a UE receives a MAC activation command for a secondary cell in subframe n, the corresponding actions in the MAC layer shall be applied no later than the minimum requirement defined in 3GPP TS 36.133 or TS 38.133 and no earlier than subframe n+8, except for the following: the actions related to CSI reporting and the actions related to the sCellDeactivationTimer associated with the secondary cell, which shall be applied in subframe n+8. When a UE receives a MAC deactivation command for a secondary cell or the sCellDeactivationTimer associated with the secondary cell expires in subframe n, the corresponding actions in the MAC layer shall apply no later than the minimum requirement defined in 3GPP TS 36.133 or TS 38.133, except for the actions related to CSI reporting which shall be applied in subframe n+8.

When a UE receives a MAC activation command for a secondary cell in subframe n, the actions related to CSI reporting and the actions related to the sCellDeactivationTimer associated with the secondary cell, are applied in subframe n+8. When a UE receives a MAC deactivation command for a secondary cell or other deactivation conditions are met (e.g. the sCellDeactivationTimer associated with the secondary cell expires) in subframe n, the actions related to CSI reporting are applied in subframe n+8. The UE starts reporting invalid or valid CSI for the SCell at the $(n+8)^{th}$ subframe, and start or restart the sCellDeactivationTimer when receiving the MAC CE activating the SCell in the $n^{th}$ subframe. For some UE having slow activation, it may report an invalid CSI (out-of-range CSI) at the $(n+8)^{th}$ subframe, for some UE having a quick activation, it may report a valid CSI at the $(n+8)^{th}$ subframe.

When a UE receives a MAC activation command for an SCell in subframe n, the UE starts reporting CQI/PMI/RI/PTI for the SCell at subframe n+8 and starts or restarts the sCellDeactivationTimer associated with the SCell at subframe n+8. It is important to define the timing of these actions for both UE and eNB. For example, sCellDeactivationTimer is maintained in both eNB and UE and it is important that both UE and eNB stop, start and/or restart this timer in the same TTI. Otherwise, the sCellDeactivationTimer in the UE may not be in-sync with the corresponding sCellDeactivationTimer in the eNB. Also, eNB starts monitoring and receiving CSI (CQI/PMI/RI/PTI) according to the predefined timing in the same TTI and/or after UE starts transmitting the CSI. If the CSI timings in UE and eNB are not coordinated based on a common standard or air interface signaling the network operation may result in inefficient operations and/or errors.

FIG. 26 shows DCI formats for an example of 20 MHz FDD operation with 2 Tx antennas at the base station and no carrier aggregation in an LTE system. In a NR system, the DCI formats may comprise at least one of: DCI format 0_0/0_1 indicating scheduling of PUSCH in a cell; DCI format 1_0/1_1 indicating scheduling of PDSCH in a cell; DCI format 2_0 notifying a group of UEs of slot format; DCI format 2_1 notifying a group of UEs of PRB(s) and OFDM symbol(s) where a UE may assume no transmission is intended for the UE; DCI format 2_2 indicating transmission of TPC commands for PUCCH and PUSCH; and/or DCI format 2_3 indicating transmission of a group of TPC commands for SRS transmission by one or more UEs. In an example, a gNB may transmit a DCI via a PDCCH for scheduling decision and power-control commends. More specifically, the DCI may comprise at least one of: downlink scheduling assignments, uplink scheduling grants, power-control commands. The downlink scheduling assignments may comprise at least one of: PDSCH resource indication, transport format, HARQ information, and control information related to multiple antenna schemes, a command for power control of the PUCCH used for transmission of ACK/NACK in response to downlink scheduling assignments. The uplink scheduling grants may comprise at least one of: PUSCH resource indication, transport format, and HARQ related information, a power control command of the PUSCH.

In an example, different types of control information may correspond to different DCI message sizes. For example, supporting spatial multiplexing with noncontiguous allocation of RBs in the frequency domain may require a larger scheduling message in comparison with an uplink grant allowing for frequency-contiguous allocation only. DCIs may be categorized into different DCI formats, where a format corresponds to a certain message size and usage.

In an example, a UE may monitor one or more PDCCH to detect one or more DCI with one or more DCI format. The one or more PDCCH may be transmitted in common search space or UE-specific search space. A UE may monitor PDCCH with only a limited set of DCI format, to save power consumption. For example, a normal UE may not be required to detect a DCI with DCI format 6 which is used for an eMTC UE. The more DCI format to be detected, the more power be consumed at the UE.

In an example, a UE may monitor one or more PDCCH candidates to detect one or more DCI with one or more DCI format. The one or more PDCCH may be transmitted in common search space or UE-specific search space. A UE may monitor PDCCH with only a limited set of DCI format, to save power consumption. For example, a normal UE may not be required to detect a DCI with DCI format 6 which is used for an eMTC UE. The more DCI format to be detected, the more power be consumed at the UE.

In an example, the one or more PDCCH candidates that a UE monitors may be defined in terms of PDCCH UE-specific search spaces. A PDCCH UE-specific search space at CCE aggregation level $L \in \{1, 2, 4, 8\}$ may be defined by a set of PDCCH candidates for CCE aggregation level L. In an example, for a DCI format, a UE may be configured per serving cell by one or more higher layer parameters a number of PDCCH candidates per CCE aggregation level L.

In an example, in non-DRX mode operation, a UE may monitor one or more PDCCH candidate in control resource set q according to a periodicity of $W_{PDCCH, q}$ symbols that may be configured by one or more higher layer parameters for control resource set q.

In an example, if a UE is configured with higher layer parameter, e.g., cif-InSchedulingCell, the carrier indicator field value may correspond to cif-InSchedulingCell.

In an example, for the serving cell on which a UE may monitor one or more PDCCH candidate in a UE-specific search space, if the UE is not configured with a carrier indicator field, the UE may monitor the one or more PDCCH candidates without carrier indicator field. In an example, for the serving cell on which a UE may monitor one or more PDCCH candidates in a UE-specific search space, if a UE is configured with a carrier indicator field, the UE may monitor the one or more PDCCH candidates with carrier indicator field.

In an example, a UE may not monitor one or more PDCCH candidates on a secondary cell if the UE is configured to monitor one or more PDCCH candidates with carrier indicator field corresponding to that secondary cell in another serving cell. For example, for the serving cell on which the UE may monitor one or more PDCCH candidates, the UE may monitor the one or more PDCCH candidates at least for the same serving cell.

In an example, the information in the DCI formats used for downlink scheduling can be organized into different groups, with the field present varying between the DCI formats, including at least one of: resource information, consisting of: carrier indicator (0 or 3 bits), RB allocation; HARQ process number; MCS, NDI, and RV (for the first TB); MCS, NDI and RV (for the second TB); MIMO related information; PDSCH resource-element mapping and QCI; Downlink assignment index (DAI); TPC for PUCCH; SRS request (1 bit), triggering one-shot SRS transmission; ACK/NACK offset; DCI format 0/1A indication, used to differentiate between DCI format 1A and 0; and padding if necessary. The MIMO related information may comprise at least one of: PMI, precoding information, transport block swap flag, power offset between PDSCH and reference signal, reference-signal scrambling sequence, number of layers, and/or antenna ports for the transmission.

In an example, the information in the DCI formats used for uplink scheduling can be organized into different groups, with the field present varying between the DCI formats, including at least one of: resource information, consisting of: carrier indicator, resource allocation type, RB allocation; MCS, NDI (for the first TB); MCS, NDI (for the second TB); phase rotation of the uplink DMRS; precoding information; CSI request, requesting an aperiodic CSI report; SRS request (2 bit), used to trigger aperiodic SRS transmission using one of up to three preconfigured settings; uplink index/DAI; TPC for PUSCH; DCI format 0/1A indication; and padding if necessary.

In an example, a gNB may perform CRC scrambling for a DCI, before transmitting the DCI via a PDCCH. The gNB may perform CRC scrambling by bit-wise addition (or Modulo-2 addition or exclusive OR (XOR) operation) of multiple bits of at least one wireless device identifier (e.g., C-RNTI, CS-RNTI, TPC-CS-RNTI, TPC-PUCCH-RNTI, TPC-PUSCH-RNTI, SP CSI C-RNTI, SRS-TPC-RNTI, INT-RNTI, SFI-RNTI, P-RNTI, SI-RNTI, RA-RNTI, and/or MCS-C-RNTI) with the CRC bits of the DCI. The wireless device may check the CRC bits of the DCI, when detecting the DCI. The wireless device may receive the DCI when the CRC is scrambled by a sequence of bits that is the same as the at least one wireless device identifier.

In a NR system, in order to support wide bandwidth operation, a gNB may transmit one or more PDCCH in different control resource sets. A gNB may transmit one or more RRC message comprising configuration parameters of one or more control resource sets. At least one of the one or more control resource sets may comprise at least one of: a first OFDM symbol; a number of consecutive OFDM symbols; a set of resource blocks; a CCE-to-REG mapping; and a REG bundle size, in case of interleaved CCE-to-REG mapping.

In an example, a wireless device may transmit one or more uplink control information (UCI) via one or more PUCCH resources to a base station. The one or more UCI may comprise at least one of: HARQ-ACK information; scheduling request (SR); and/or CSI report. In an example, a PUCCH resource may be identified by at least: frequency location (e.g., starting PRB); and/or a PUCCH format associated with initial cyclic shift of a base sequence and time domain location (e.g., starting symbol index). In an example, a PUCCH format may be PUCCH format 0, PUCCH format 1, PUCCH format 2, PUCCH format 3, or PUCCH format 4. A PUCCH format 0 may have a length of 1 or 2 OFDM symbols and be less than or equal to 2 bits. A PUCCH format 1 may occupy a number between 4 and 14 of OFDM symbols and be less than or equal to 2 bits. A PUCCH format 2 may occupy 1 or 2 OFDM symbols and be greater than 2 bits. A PUCCH format 3 may occupy a number between 4 and 14 of OFDM symbols and be greater than 2 bits. A PUCCH format 4 may occupy a number between 4 and 14 of OFDM symbols and be greater than 2 bits. The PUCCH resource may be configured on a PCell, or a PUCCH secondary cell.

In an example, when configured with multiple uplink BWPs, a base station may transmit to a wireless device, one or more RRC messages comprising configuration parameters of one or more PUCCH resource sets (e.g., at most 4 sets) on an uplink BWP of the multiple uplink BWPs. Each PUCCH resource set may be configured with a PUCCH resource set index, a list of PUCCH resources with each PUCCH resource being identified by a PUCCH resource identifier (e.g., pucch-Resourceid), and/or a maximum number of UCI information bits a wireless device may transmit using one of the plurality of PUCCH resources in the PUCCH resource set.

In an example, when configured with one or more PUCCH resource sets, a wireless device may select one of the one or more PUCCH resource sets based on a total bit length of UCI information bits (e.g., HARQ-ARQ bits, SR, and/or CSI) the wireless device will transmit. In an example, when the total bit length of UCI information bits is less than or equal to 2, the wireless device may select a first PUCCH resource set with the PUCCH resource set index equal to "0". In an example, when the total bit length of UCI information bits is greater than 2 and less than or equal to a first configured value, the wireless device may select a second PUCCH resource set with the PUCCH resource set index equal to "1". In an example, when the total bit length of UCI information bits is greater than the first configured value and less than or equal to a second configured value, the wireless device may select a third PUCCH resource set with the PUCCH resource set index equal to "2". In an example, when the total bit length of UCI information bits is greater than the second configured value and less than or equal to a third value (e.g., 1706), the wireless device may select a fourth PUCCH resource set with the PUCCH resource set index equal to "3".

In an example, a wireless device may determine, based on a number of uplink symbols of UCI transmission and a number of UCI bits, a PUCCH format from a plurality of PUCCH formats comprising PUCCH format 0, PUCCH format 1, PUCCH format 2, PUCCH format 3 and/or PUCCH format 4. In an example, the wireless device may transmit UCI in a PUCCH using PUCCH format 0 if the transmission is over 1 symbol or 2 symbols and the number of HARQ-ACK information bits with positive or negative SR (HARQ-ACK/SR bits) is 1 or 2. In an example, the wireless device may transmit UCI in a PUCCH using PUCCH format 1 if the transmission is over 4 or more symbols and the number of HARQ-ACK/SR bits is 1 or 2. In an example, the wireless device may transmit UCI in a PUCCH using PUCCH format 2 if the transmission is over 1 symbol or 2 symbols and the number of UCI bits is more than 2. In an example, the wireless device may transmit UCI in a PUCCH using PUCCH format 3 if the transmission is over 4 or more symbols, the number of UCI bits is more than 2 and PUCCH resource does not include an orthogonal cover code. In an example, the wireless device may transmit UCI in a PUCCH using PUCCH format 4 if the transmission is over 4 or more symbols, the number of UCI bits is more than 2 and the PUCCH resource includes an orthogonal cover code.

In an example, in order to transmit HARQ-ACK information on a PUCCH resource, a wireless device may determine the PUCCH resource from a PUCCH resource set. The PUCCH resource set may be determined as mentioned above. The wireless device may determine the PUCCH resource based on a PUCCH resource indicator field in a DCI (e.g., with a DCI format 1_0 or DCI for 1_1) received on a PDCCH. A 3-bit PUCCH resource indicator field in the DCI may indicate one of eight PUCCH resources in the PUCCH resource set. The wireless device may transmit the HARQ-ACK information in a PUCCH resource indicated by the 3-bit PUCCH resource indicator field in the DCI.

In an example, the wireless device may transmit one or more UCI bits via a PUCCH resource of an active uplink BWP of a PCell or a PUCCH secondary cell. Since at most one active uplink BWP in a cell is supported for a wireless device, the PUCCH resource indicated in the DCI is naturally a PUCCH resource on the active uplink BWP of the cell.

Figure 27:
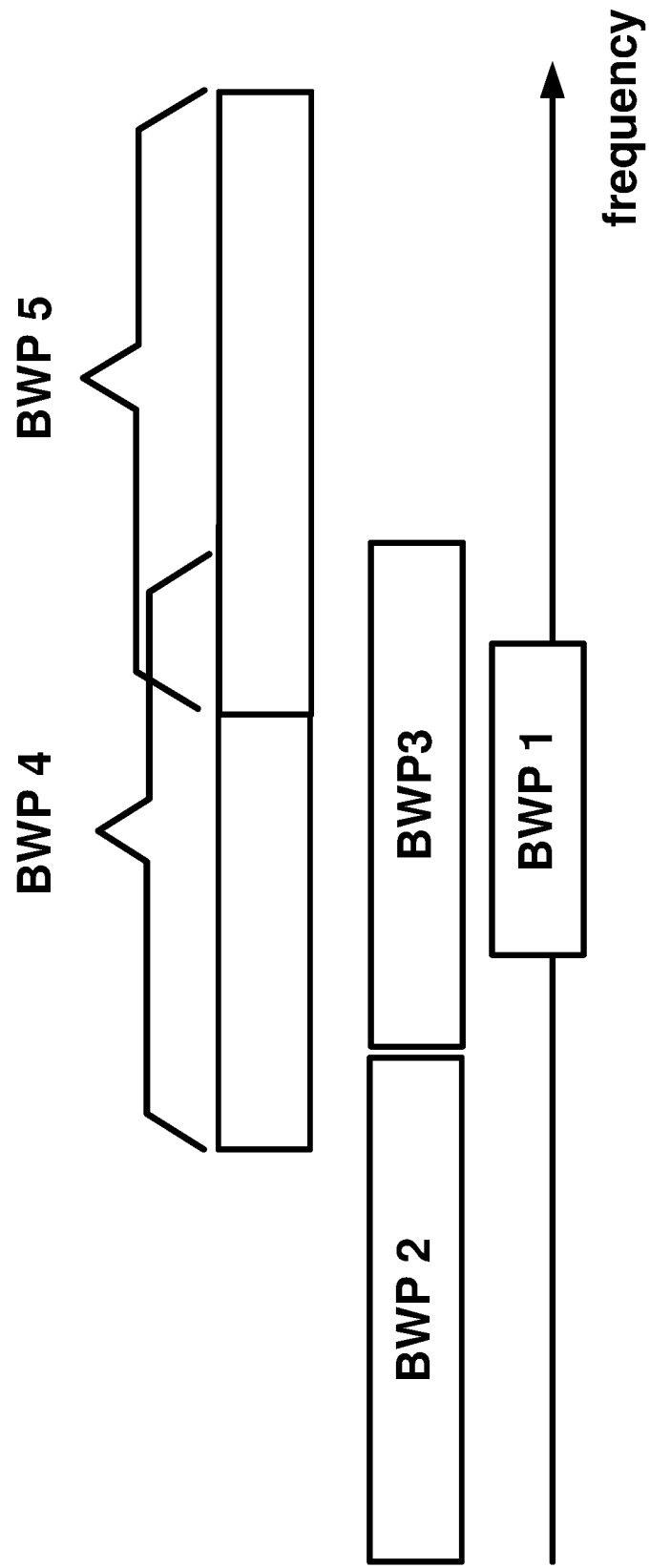
FIG. 27 is an example diagram for bandwidth part (BWP) configurations as per an aspect of an embodiment of the present disclosure.

FIG. 27 shows example of multiple BWPs configuration. A gNB may transmit one or more messages comprising configuration parameters of one or more bandwidth parts (BWP) of a cell. The cell may be a PCell or a SCell. The one or more messages may comprise: RRC connection reconfiguration message (e.g., RRCReconfiguration); RRC connection reestablishment message (e.g., RRCRestablishment); and/or RRC connection setup message (e.g., RRCSetup). The one or more BWPs may have different numerologies. A gNB may transmit one or more control information for cross-BWP scheduling to a UE. One BWP may overlap with another BWP in frequency domain.

In an example, a gNB may transmit one or more messages comprising configuration parameters of one or more DL and/or UL BWPs for a cell, with at least one BWP as the active DL or UL BWP, and zero or one BWP as the default DL or UL BWP. For the PCell, the active DL BWP may be the DL BWP on which the UE may monitor one or more PDCCH, and/or receive PDSCH. The active UL BWP is the UL BWP on which the UE may transmit uplink signal. For a secondary cell (SCell) if configured, the active DL BWP may be the DL BWP on which the UE may monitor one or more PDCCH and receive PDSCH when the SCell is activated by receiving a MAC activation/deactivation CE. The active UL BWP is the UL BWP on which the UE may transmit PUCCH (if configured) and/or PUSCH when the SCell is activated by receiving a MAC activation/deactivation CE. Configuration of multiple BWPs may be used to save UE's power consumption. When configured with an active BWP and a default BWP, a UE may switch to the default BWP if there is no activity on the active BWP. For example, a default BWP may be configured with narrow bandwidth, an active BWP may be configured with wide bandwidth. If there is no signal transmitting or receiving, the UE may switch the BWP to the default BWP, which may reduce power consumption.

In an example, for each DL BWP or UL BWP in a set of DL BWPs or UL BWPs, respectively, the wireless device may be configured the following parameters for the serving cell: a subcarrier spacing provided by a higher layer parameter (e.g., subcarrierSpacing); a cyclic prefix provided by a higher layer parameter (e.g., cyclicPrefix); a first PRB and a number of contiguous PRBs indicated by a higher layer parameter (e.g., locationAndBandwidth) that is interpreted as RIV, and the first PRB is a PRB offset relative to the PRB indicated by higher layer parameters (e.g., offsetToCarrier and subcarrierSpacing); an index in the set of DL BWPs or UL BWPs by respective a higher layer parameter (e.g., bwp-Id); a set of BWP-common and a set of BWP-dedicated parameters by higher layer parameters (e.g., bwp-Common and bwp-Dedicated).

In an example, switching BWP may be triggered by a DCI or a timer. When a UE receives a DCI indicating DL BWP switching from an active BWP to a new BWP, the UE may monitor PDCCH and/or receive PDSCH on the new BWP. When the UE receives a DCI indicating UL BWP switching from an active BWP to a new BWP, the UE may transmit PUCCH (if configured) and/or PUSCH on the new BWP. A gNB may transmit one or more messages comprising a BWP inactivity timer to a UE. The UE starts the timer when it switches its active DL BWP to a DL BWP other than the default DL BWP. The UE may restart the timer to the initial value when it successfully decodes a DCI to schedule PDSCH(s) in its active DL BWP. The UE may switch its active DL BWP to the default DL BWP when the BWP timer expires.

In an example, a BWP may be configured with: a subcarrier spacing, a cyclic prefix, a number of contiguous PRBs, an offset of the first PRB in the number of contiguous PRBs relative to the first PRB, or Q control resource sets if the BWP is a DL BWP.

In an example, on a SCell, there may be no initial active BWP since the initial access is performed on the PCell. For example, the initially activated DL BWP and/or UL BWP, when the SCell is activated, may be configured or reconfigured by RRC signaling. In an example, the default BWP of the SCell may also be configured or reconfigured by RRC signaling.

In an example, gNB may configure UE-specific default DL BWP other than initial active BWP after RRC connection, e.g., for the purpose of load balancing. The default BWP may support other connected mode operations (besides operations supported by initial active BWP), e.g., fall back and/or connected mode paging. In this case, the default BWP may comprise common search space, e.g., at least a search space needed for monitoring a pre-emption indication.

In an example, a DL BWP other than the initial active DL BWP may be configured to a UE as the default DL BWP. The reconfiguring the default DL BWP may be due to load balancing and/or different numerologies employed for active DL BWP and initial active DL BWP.

In an example, for a paired spectrum, DL and UL BWPs may be independently activated while, for an unpaired spectrum DL and UL BWPS are jointly activated. In case of bandwidth adaptation, where the bandwidth of the active downlink BWP may be changed, there may, in case of an unpaired spectrum, be a joint activation of a new downlink BWP and new uplink BWP. For example, a new DL/UL BWP pair where the bandwidth of the uplink BWPs may be the same (e.g., no change of uplink BWP).

In an example embodiment, making an association between DL BWP and UL BWP may allow that one activation/deactivation command may switch both DL and UL BWPs at once. Otherwise, separate BWP switching commands may be necessary.

In an example, PUCCH resources may be configured in a configured UL BWP, in a default UL BWP and/or in both. For instance, if the PUCCH resources are configured in the default UL BWP, UE may retune to the default UL BWP for transmitting an SR. for example, the PUCCH resources are configured per BWP or a BWP other than the default BWP, the UE may transmit an SR in the current active BWP without retuning.

In an example, there may be at most one active DL BWP and at most one active UL BWP at a given time for a serving cell. A BWP of a cell may be configured with a specific numerology/TTI. In an example, a logical channel and/or logical channel group that triggers SR transmission while the wireless device operates in one active BWP, the corresponding SR may remain triggered in response to BWP switching.

In an example, when a new BWP is activated, a configured downlink assignment may be initialized (if not active) or re-initialized (if already active) using PDCCH. In an example, via one or more RRC messages/signaling, a wireless device may be configured with at least one UL BWP, at least one DL BWP, and one or more configured grants for a cell. The one or more configured grants may be semi-persistent scheduling (SPS), Type 1 grant-free (GF) transmission/scheduling, and/or Type 2 GF transmission/scheduling. In an example, one or more configured grants may be configured per UL BWP. For example, one or more radio resources associated with one or more configured grants may not be defined/assigned/allocated across two or more UL BWPs.

In an example, an BWP may be in active during a period of time when a BWP inactivity timer is running. For example, a base station may transmit a control message to a wireless device to configure a first timer value of an BWP inactivity timer. The first timer value may determine how long a BWP inactivity timer runs, e.g., a period of time that a BWP inactivity timer runs. For example, the BWP inactivity timer may be implemented as a count-down timer from a first timer value down to a value (e.g., zero). In an example embodiment, the BWP inactivity timer may be implemented as a count-up timer from a value (e.g., zero) up to a first timer value down. In an example embodiment, the BWP inactivity timer may be implemented as a down-counter from a first timer value down to a value (e.g., zero). In an example embodiment, the BWP inactivity timer may be implemented as a count-up counter from a value (e.g., zero) up to a first timer value down. For example, a wireless device may restart a BWP inactivity timer (e.g., UL BWP and/or DL BWP inactivity timers) when the wireless device receives (and/or decodes) a DCI to schedule PDSCH(s) in its active BWP (e.g., its active UL BWP, its active DL BWP, and/or UL/DL BWP pair).

Figure 28:
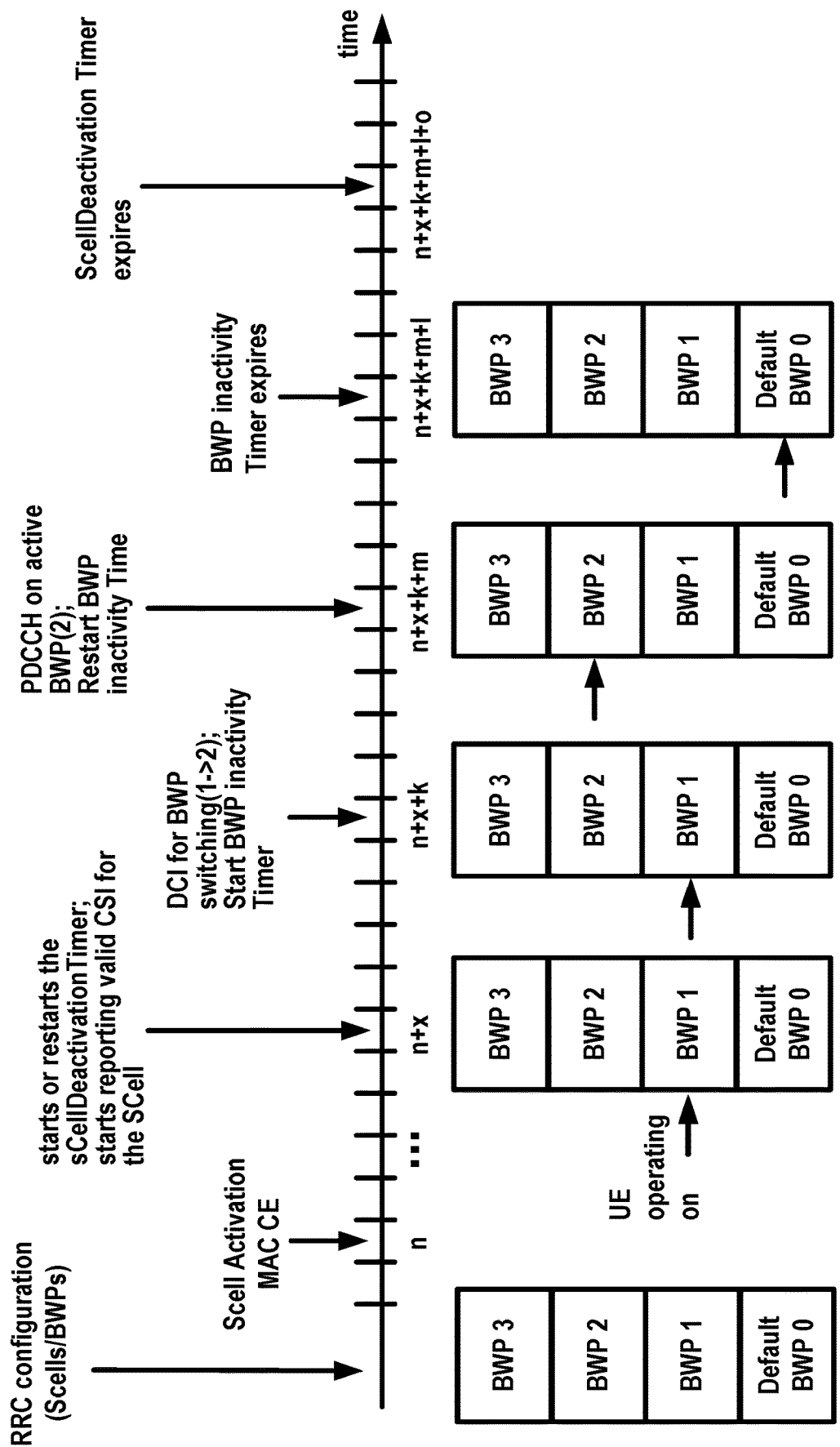
FIG. 28 is an example diagram for BWP operation in a secondary cell as per an aspect of an embodiment of the present disclosure.

FIG. 28 shows example of BWP switching mechanism. A UE may receive RRC message comprising parameters of a SCell and one or more BWP configuration associated with the SCell. Among the one or more BWPs, at least one BWP may be configured as the first active BWP (e.g., BWP 1 in FIG. 28), one BWP as the default BWP (e.g., BWP 0 in FIG. 28). The UE may receive a MAC CE to activate the SCell at the $n^{th}$ slot. The UE may start the sCellDeactivationTimer, and start CSI related actions for the SCell, and/or start CSI related actions for the first active BWP of the SCell at the $(n+x)^{th}$ slot. The UE may start the BWP inactivity timer at the $(n+x+k)^{th}$ slot in response to receiving a DCI indicating switching BWP from BWP 1 to BWP 2. When receiving a PDCCH indicating DL scheduling on BWP 2, for example, at the $(n+x+k+m)^{th}$ slot, the UE may restart the BWP inactivity timer. The UE may switch back to the default BWP (e.g., BWP 0) as an active BWP when the BWP inactivity timer expires, at the $(n+x+k+m+l)^{th}$ slot. The UE may deactivate the SCell when the sCellDeactivationTimer expires.

In an example, a BWP inactivity timer may be applied in a PCell. A base station may transmit one or more RRC messages comprising a BWP inactivity timer to a wireless device. The wireless device may start the BWP inactivity timer if the wireless devices switches its active DL BWP to a DL BWP other than the default DL BWP on the PCell. The wireless device may restart the BWP inactivity timer if it successfully decodes a DCI to schedule PDSCH(s) in its active DL BWP. The wireless device may switch its active DL BWP to the default DL BWP if the BWP inactivity timer expires.

In an example, employing the BWP inactivity timer may reduce UE's power consumption when the UE is configured with multiple BWPs on a cell (a PCell or a SCell). The UE may switch to a default BWP on the PCell or SCell when there is no activity on an active BWP (e.g., when the BWP inactivity timer expires).

In an example, a gNB may transmit one or more RRC message comprising one or more CSI configuration parameters comprising at least: one or more CSI-RS resource settings; one or more CSI reporting settings, and one CSI measurement setting.

In an example, a CSI-RS resource setting may comprise one or more CSI-RS resource sets. In an example, there may be one CSI-RS resource set for periodic CSI-RS, or semi-persistent (SP) CSI-RS. In an example, a CSI-RS resource set may comprise at least one of: one CSI-RS type (e.g., periodic, aperiodic, or semi-persistent); one or more CSI-RS resources comprising at least one of: CSI-RS resource configuration identity (or index); number of CSI-RS ports; CSI-RS configuration (symbol and RE locations in a subframe); CSI-RS subframe configuration (subframe location, offset, and/or periodicity in radio frame); CSI-RS power parameter; CSI-RS sequence parameter; CDM type parameter; frequency density; transmission comb; and/or QCL parameters.

In an example, one or more CSI-RS resources may be transmitted periodically, using aperiodic transmission, using a multi-shot transmission, and/or using a SP transmission. In a periodic transmission, the configured CSI-RS resource may be transmitted using a configured periodicity in time domain. In an aperiodic transmission, the configured CSI-RS resource may be transmitted in a dedicated time slot or subframe. In a multi-shot or SP transmission, the configured CSI-RS resource may be transmitted within a configured period. In an example, a gNB may transmit one or more SP CSI-RSs with a periodicity. The gNB may stop transmission of the one or more SP CSI-RSs if the CSI-RS is configured with a transmission duration. The gNB may stop transmission of the one or SP CSI-RSs in response to transmitting a MAC CE or DCI for deactivating (or stopping the transmission of) the one or more SP CSI-RSs.

In an example, a CSI reporting setting may comprise at least one of: one report configuration identifier; one report type; one or more reported CSI parameter(s); one or more CSI type (e.g., type I or type II); one or more codebook configuration parameters; one or more parameters indicating time-domain behavior; frequency granularity for CQI and PMI; and/or measurement restriction configurations. The report type may indicate a time domain behavior of the report (aperiodic, SP, or periodic). The CSI reporting setting may further comprise at least one of: one periodicity parameter; one duration parameter; and/or one offset (e.g., in unit of slots), if the report type is a periodic or SP report. The periodicity parameter may indicate a periodicity of a CSI report. The duration parameter may indicate a duration of CSI report transmission. The offset parameter may indicate value of timing offset of CSI report.

In an example, a CSI measurement setting may comprise one or more links comprising one or more link parameters. The link parameter may comprise at least one of: one CSI reporting setting indication, CSI-RS resource setting indication, and one or more measurement parameters.

FIG. 29 shows example of various CSI report triggering mechanisms. In an example, a gNB may trigger a CSI reporting by transmitting an RRC message, or a MAC CE, or a DCI, as shown in FIG. 29. In an example, a UE may perform periodic CSI reporting (e.g., P-CSI reporting in FIG. 29) based on an RRC message and one or more periodic CSI-RSs. In an example, a UE may not be allowed (or required) to perform periodic CSI reporting based on one or more aperiodic CSI-RSs and/or one or more SP CSI-RSs. In an example, a UE may perform SP CSI reporting (e.g., SP-CSI reporting in FIG. 29) based on a MAC CE and/or a DCI and based on one or more periodic or SP CSI-RSs. In an example, a UE may not be allowed (or required) to perform SP CSI reporting based on one or more aperiodic CSI-RSs. In an example, a UE may perform aperiodic CSI reporting (e.g., Ap-CSI reporting in FIG. 29) based on a DCI and based on one or more periodic, SP, or aperiodic CSI-RSs. In an example, a wireless device may perform a SP CSI reporting on a PUCCH in response to the SP CSI reporting being activated (or triggered) by a MAC CE. The wireless device may perform a SP CSI reporting on a PUSCH in response to the SP CSI reporting being activated (or triggered). In an example, a base station may instruct (e.g., by transmitting the MAC CE) a wireless device to perform SP CSI reporting on PUCCH when a compact CSI (e.g., small amount of report contents) is required by the base station, or DCI transmission is not convenient for the base station, and/or the CSI is not urgently required by the base station. In an example, a base station may instruct (e.g., by transmitting the DCI) a wireless device to perform SP CSI reporting on PUSCH when a large-sized CSI (e.g., big amount of report contents) is required by the base station, or a DCI transmission is convenient for the base station, and/or the CSI is urgently required by the base station.

Figure 30:
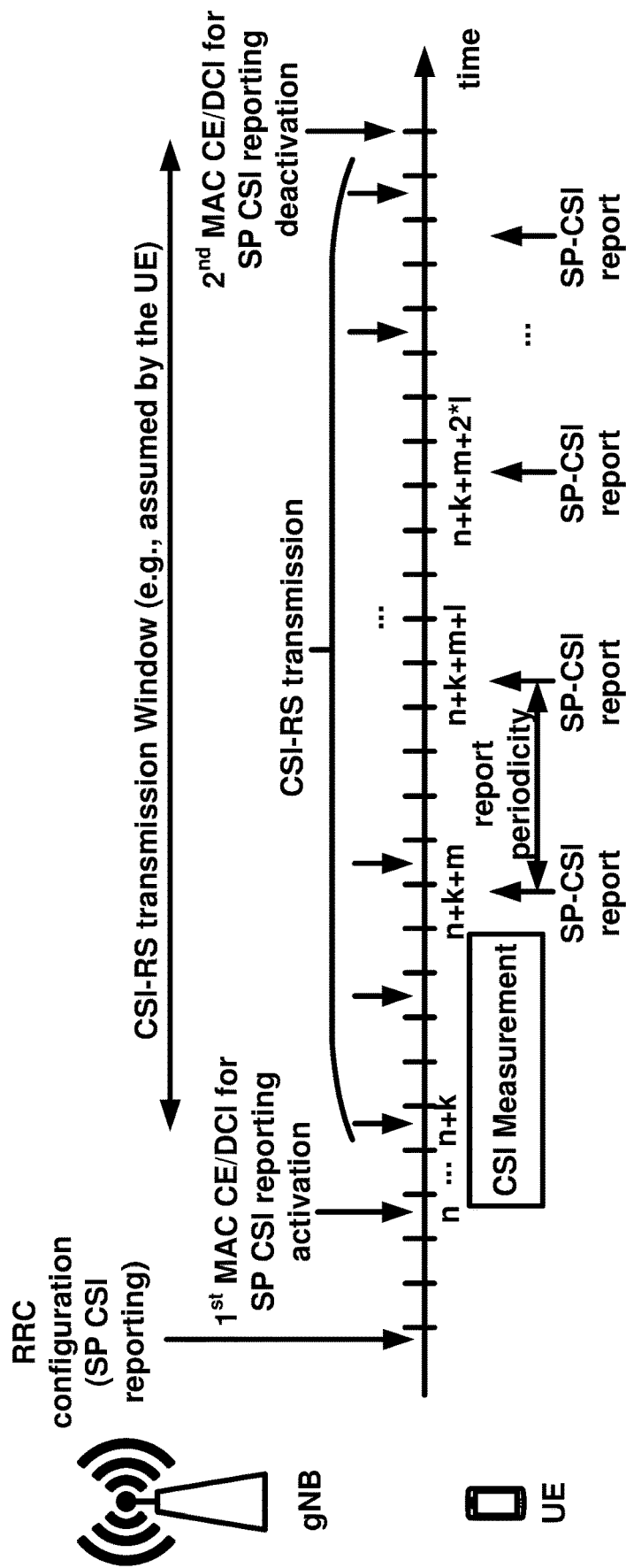
FIG. 30 is an example diagram for semi-persistent CSI reporting mechanism as per an aspect of an embodiment of the present disclosure.

FIG. 30 shows an example of SP CSI reporting in a cell. In an example, a base station (e.g., gNB in FIG. 30) may transmit to a wireless device (e.g., UE in FIG. 30) one or more RRC messages comprising configuration parameters of one or more SP CSI reporting configurations. The base station may transmit to the wireless device, at slot (or subframe) n, a $1^{st}$ MAC CE or DCI indicating an activation of a SP CSI reporting configuration of the one or more SP CSI reporting configurations. The base station may start transmitting one or more SP CSI-RSs at slot (or subframe) n+k. In an example, k may be zero or an integer greater than zero, configured by an RRC message, or be predefined as a fixed value.

As shown in FIG. 30, after or in response to receiving the $1^{st}$ MAC CE or the $1^{st}$ DCI, the wireless device may perform CSI measurements on one or more CSI-RSs according to the activated SP CSI reporting configuration. In an example, after or in response to receiving the $1^{st}$ MAC CE or the $1^{st}$ DCI, the wireless device may transmit one or more SP CSI reports (e.g., based on the CSI measurements) at slot/subframe n+k+m, n+k+m+l, n+k+m+2*l, etc., with a periodicity of/subframes (or slots). The periodicity may be configured in an RRC message. In an example, the UE may receive a $2^{nd}$ MAC/DCI indicating a deactivation of the SP CSI reporting configuration. After receiving the $2^{nd}$ MAC/DCI, or in response to the $2^{nd}$ MAC/DCI, the UE may stop transmitting the one or more SP CSI reports. In an example, k may be zero (configured, or predefined). In an example, m (e.g., when k=0) may be a time offset between the wireless device receives the $1^{st}$ MAC CE/DCI for activation of the SP CSI reporting and the wireless device transmits a first SP CSI report of the one or more SP CSI reports. In an example, m may be configured by an RRC message, or be predefined as a fixed value. A value of m may depend on the capability of a UE and/or the network.

As shown in FIG. 30, a wireless device may assume a CSI-RS transmission period (e.g., CSI-RS transmission Window in FIG. 30), in response to a $1^{st}$ MAC CE/DCI for activation of a SP CSI reporting configuration and based on one or more configuration parameters of the activated SP CSI reporting configuration. The base station may transmit one or more CSI-RSs at least in the CSI-RS transmission period, based on the activated SP CSI reporting configuration. In an example, the wireless device may perform CSI measurements on the one or more CSI-RSs transmitted in the CSI-RS transmission period.

In existing 3GPP technology specifications, when a UE activates the SCell, the UE may apply normal SCell operations including: SRS transmissions on the SCell; CQI/PMI/RI/PTI reporting for the SCell; PDCCH monitoring on the SCell; and/or PDCCH monitoring for the SCell. If the SCell is deactivated, a UE may perform the following actions: not transmit SRS on the S Cell; not report CQI/PMI/RI/PTI for the SCell; not transmit on UL-SCH on the SCell; not transmit on RACH on the SCell; not monitor the PDCCH on the SCell; not monitor the PDCCH for the SCell. When SCell is deactivated, the ongoing Random Access procedure on the SCell, if any, may be aborted.

In a NR system, a gNB may transmit PDCCH or PDSCH via one or more beams on a PCell, or one or more SCells. For example, a gNB may transmit a first PDCCH or PDSCH on a PCell operating on a low carrier frequency (e.g., 2 GHz), and a second PDCCH or PDSCH via multiple beams on a SCell operating on a high carrier frequency (e.g., 6 GHz, 30 GHz, or 70 GHz). In this case, the gNB may provide wide coverage by the PCell, and high data rate by the SCell when necessary. In an example, a UE in the wide coverage of the PCell may frequently switch beam pair link with the SCell when moving around in the PCell, although there may be no beam pair link change with the PCell. The UE may perform beam management on the SCell to improve beam pair link quality with the SCell. The beam used on the PCell may be different from the beam on the SCell. Existing technologies may reuse a beam pair link of a PCell in a SCell when communicating with a UE on the SCell. A UE implementing existing technologies may not be able to determine when a beam report is transmitted for a SCell. Existing technologies may require a UE perform beam management for the S Cell even when the SCell is deactivated. Existing technologies may increase power consumption, data transmission delay caused by untimely beam pairing, channel quality report error. Example embodiments may improve power consumption when performing beam management for a SCell, reduce data transmission delay and reduce channel quality report error.

In an example, a base station and/or a UE may perform beam management. The beam management may comprise at least one of: the UE measuring one or more RS resources; the UE reporting L1-RSRP (Reference Signal Receiving Power) associated with the one or more RS resources; the base station transmitting a DCI indicating a beam which may correspond to the one or more RS resources with L1-RSRP report from the UE.

Figure 31:
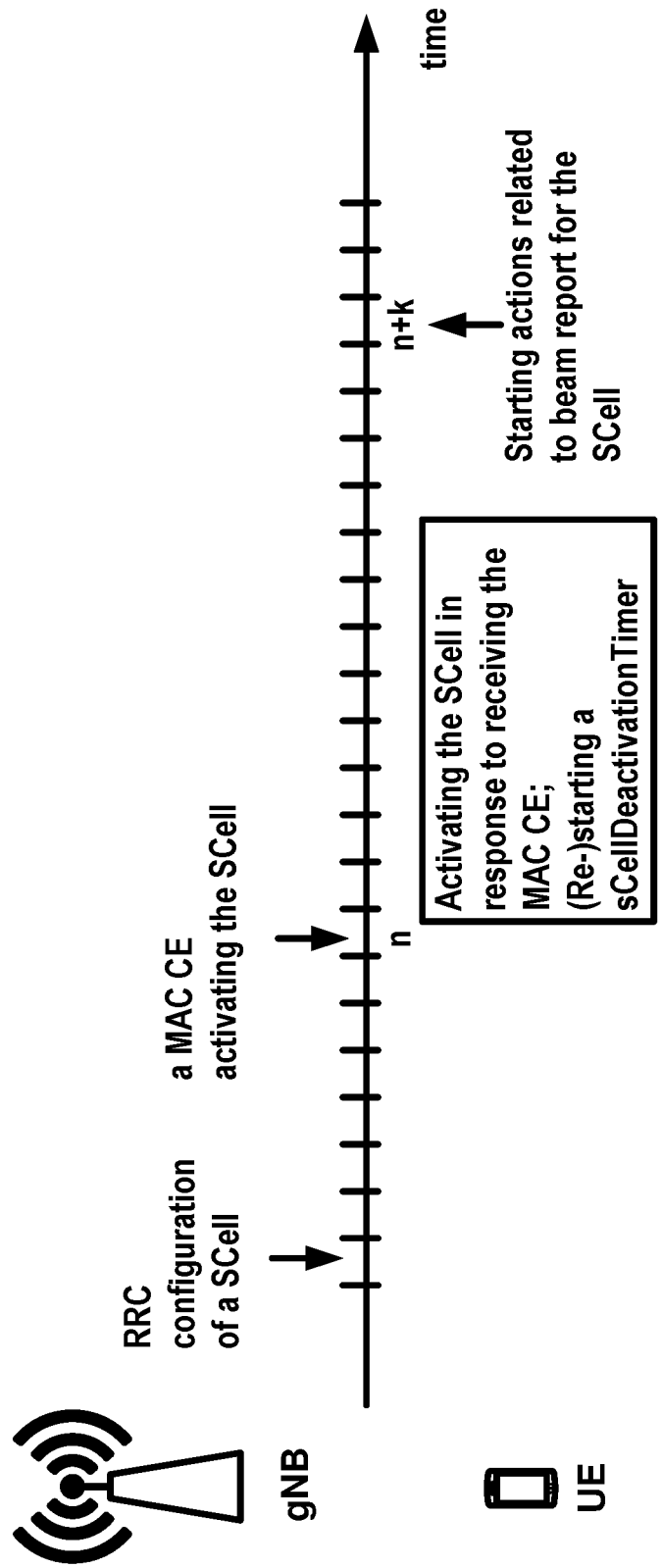
FIG. 31 is an example diagram for beam management of an activated SCell as per an aspect of an embodiment of the present disclosure.

FIG. 31 shows an example embodiment of a beam management of a SCell. In an example, a wireless device (e.g., UE in FIG. 31) may receive, from a base station (e.g., gNB in FIG. 31), at least one RRC message comprising configuration parameters of a plurality of cells comprising a primary cell and at least one secondary cell (e.g., SCell in FIG. 31), wherein, the configuration parameters may comprise at least one of: a reference signal (RS) resource setting; and/or a CSI reporting setting for L1-RSRP reporting. A L1-RSRP may indicate the receiving quality of a RS transmitted from a beam. The RS resource setting may comprise a set of RS resources, each RS resource associated with a RS resource configuration identifier and radio resource configuration (e.g., number of ports; time and frequency resource allocation; frequency density; etc.). In an example, the RS may be a CSI-RS, and/or a SS/PBCH block. In an example, the CSI report setting for L1-RSRP reporting may comprise parameters indicating at least one of: an indicator indicating whether a group-based beam reporting is supported; a number indicating the number of reported RS; a value indicating frequency granularity for CSI report; parameters indicating periodicity; slot offset of CSI report; and/or a PUCCH resource for the L1-RSRP reporting. In an example, a RS resource may be transmitted with a beam direction. Different RS resources may transmit with different beam direction.

In an example, the at least RRC message may further comprise a report configuration type (e.g., indicating the time domain behavior of the report—either aperiodic, semi-persistent, or periodic), if a gNB and/or a UE supports aperiodic, SP, or periodic L1-RSRP reporting.

In an example, as shown in FIG. 31, the gNB may transmit to the UE, a media access control (MAC) command indicating activation of at least a first SCell (e.g., the SCell in FIG. 31) in the at least one secondary cell. The UE may receive the MAC CE, and attempt to activate the at least first SCell, by measuring one or more RS resources of the at least first SCell.

In an example, the UE may not successfully activate the at least first SCell, for example, failing detecting the one or more RS resource of the at least first SCell. Implementing existing technologies, the gNB may not be aware of the UE's failure of activating the at least first SCell, if the UE doesn't signal the gNB about beam quality. Implementing the existing technologies may cause transmission error if the gNB transmit data on the unsuccessfully activated at least first SCell. A UE by implementing example embodiments may feedback one or more information of beam management reports to the gNB indicating whether the activation is successful, before the gNB transmits data on the at least first SCell.

In an example, in response to receiving the MAC CE, a UE may measure RSRP of one or more RS associated with the at least first SCell. The RSRP value may be defined by a 7-bit value in a range of [−140, −44] dbm with 1 dB step size. In an example, the UE may determine the RSRP report by some criterial. In an example, the RSRP report may be the best RSRP measurement among the set of RS resources configured by the RRC message. In an example, the RSRP report may be based on an averaged value over the set of RS resources. In an example, the RSRP report may be based on an averaged value over one or more RS resources having RSRP greater than a threshold. In an example, the RSRP report may be based on an averaged value over a number of one or more RS resources having best RSRP measurement, wherein the number may be a configured valued by an RRC message, or a fixed value.

In an example, the UE may transmit the RSRP report on a PUCCH. The PUCCH may be indicated by the RRC message, and/or transmitted on a PCell, pScell, or a PUCCH SCell. In an example, the UE may transmit the RSRP report on a PUSCH. The PUSCH may be indicated by the RRC message, or a MAC CE, or a DCI.

In an example, the RSRP report may comprise at least one of: a RSRP value; and/or a RS resource indicator. The RS resource indicator may indicate a RS resource having the best L1-RSRP measurement among the set of RS resource configured by the RRC message. In an example, the RS resource indicator may indicate a RS resource have a L1-RSRP measurement greater than a threshold. The threshold may be a predefined value, or a value configured by an RRC message. The RSRP value may be a L1-RSRP measurement having a 7-bit value with a range of [−140, −44] dbm, based on the RS resource associated with the RS resource indicator.

In an example, if the number indicating the number of reported RS in the RRC message indicates more than one RS are reported with L1-RSRP, a UE may transmit the RSRP report for more than one RS. In an example, the RSRP report may comprise at least one of: a first RSRP value; and/or a second RSRP value. The first RSRP value may correspond to a first RS having the best L1-RSRP measurement result. The first RSRP value may a L1-RSRP having a 4-bit value. The second RSRP value may be a difference of L1-RSRP value between the first RS and a at least second RS.

In an example, the at least second RS may have the second best RSRP value among the set of RS resources configured by the RRC message.

In an example, the at least second RS may be the RSs, except the first RS in the set of RSs configured by the RRC message. In this case, the second RSRP value may be the difference of RSRP value of the first RS and averaged RSRP value of the at least second RS.

In an example, the at least second RS may be the RSs, except the first RS, each RS having a RSRP greater than a threshold. In this case, the second RSRP value may be the difference of RSRP value of the first RS and averaged RSRP value of the at least second RS.

In an example, the at least second RS may be the RSs, except of the first RS, wherein, the number of the RSs may be a configured value, or a predefined value, and the RSs may have best RSRPs (except the first RS) among the set of RSs. In this case, the second RSRP value may be the difference of RSRP value of the first RS and averaged RSRP value of the at least second RS.

In an example, the at least second RS may be indicated by an RRC message.

As shown in FIG. 31, the UE may receive the MAC CE for activation of a first S Cell at subframe (or slot) n, the UE may start or restart a SCellDeactivationTimer in the same subframe (or slot) or a different subframe (or slot). In response to receiving the MAC CE, the UE may start a beam report related action for the activated S Cell at subframe (or slot) n+k. The beam report may comprise at least one or more L1-RSRP value based on one or more RS resources. The value "k" may be configured by an RRC message. In an example, the value "k" may be a predefined value. In an example, in response to receiving the beam report, a gNB may transmit one or more signal to the UE indicating a transmission beam. The transmission beam may be the beam associated with the RSRP report. The one or more signal may be a DCI via PDCCH, or a control information via PDSCH.

In existing technologies, a UE may transmit CQI/PMI/RI/CRI to a gNB indicating whether activation of a SCell is successful. In an example, when the SCell configured with multiple beams, the UE may not have correct CQI/PMI/RI/CRI measurements before the UE tunes its receiving beam to a transmission beam of the gNB. Only when the UE tunes to the gNB's transmission beam, the UE may receive some control information transmitted from the transmission beam, and the UE may start to measure CQI/PMI/RI/CRI. Therefore, there is a need to transmit the one or more L1-RSRP to indicate whether the activation of the SCell is successful, when the SCell is configured with multiple beams. In an example, as shown in FIG. 31, the UE, after receiving the MAC CE activating the SCell, may transmit one or more L1-RSRP report for the SCell, in a beam management procedure, wherein the one or more L1-RSRP may indicate the signal quality (e.g., received power) of one or more beams associated with one or more RS resource. A UE may generate one or more CQI/PMI/RI/CRI report in a CSI procedure. L1-RSRP may indicate a coarse channel quality of a RS transmitted from a beam, while, CQI/PMI/RI/CRI report may indicate a quantity of spatial property of channel from a gNB to the UE. A gNB may adjust a beam direction or change to another beam based on a L1-RSRP report. A gNB may determine a transmission format (e.g., MCS, resource allocation of PDCCH/PDSCH, MIMO transmission format, etc.) based on a CQI/PMI/RI/CRI. Example embodiment may improve data transmission latency for a SCell when the SCell is configured with multiple beams. Example embodiment may improve power consumption of channel state information reporting.

Figure 32:
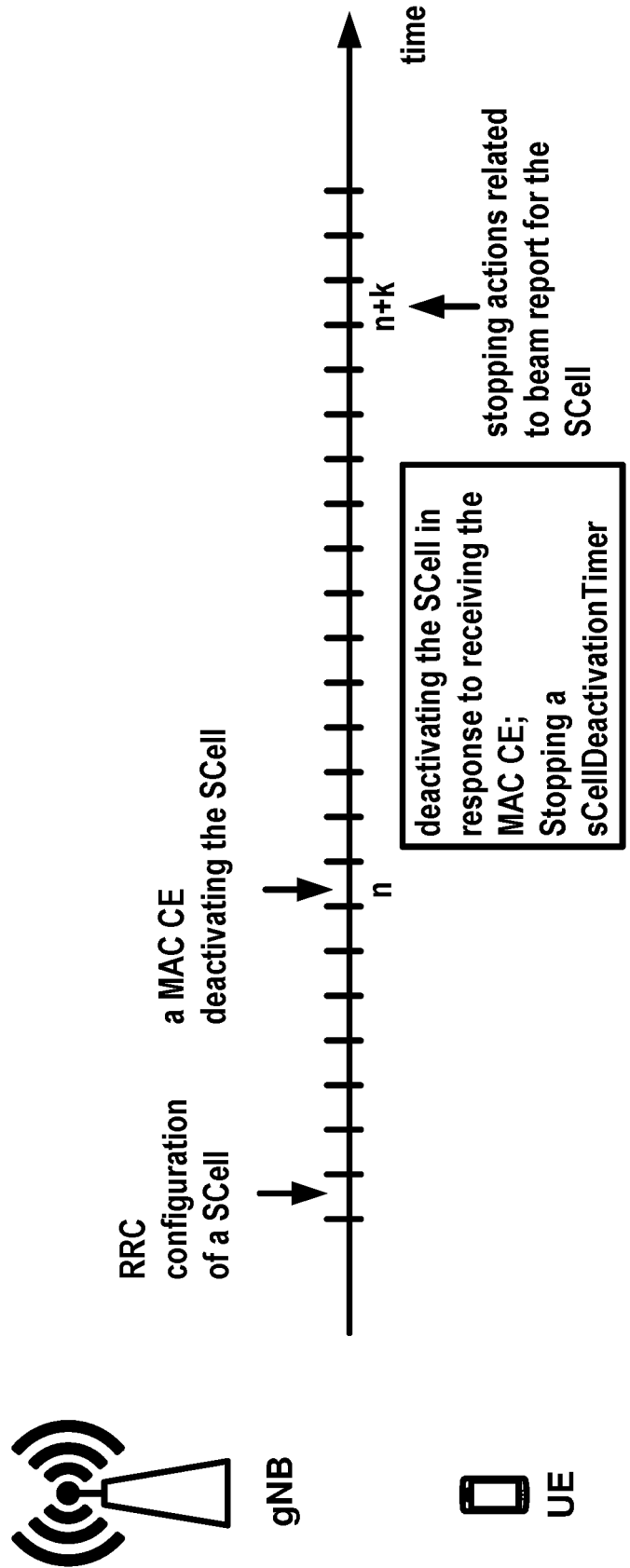
FIG. 32 is an example diagram for beam management of a deactivated SCell as per an aspect of an embodiment of the present disclosure.

FIG. 32 shows an example embodiment of a beam management of a SCell. In an example, a base station (e.g., gNB in FIG. 32) may transmit to a wireless device (e.g., UE in FIG. 32), a MAC CE indicating deactivation of at least a first SCell (e.g., SCell in FIG. 32) in the at least one secondary cells. In an example, the UE may deactivate at least a first SCell by a SCellDeactivationTimer expiring. In response to deactivation of the at least first S Cell, the UE may stop transmission of one or more beam report for the at least first SCell, wherein, the one or more beam report may comprise at least a L1-RSRP associated with at least one RS.

As shown in FIG. 32, the UE may receive a MAC CE for deactivation of a SCell at subframe (or slot) n, the UE may stop a beam report for the deactivated SCell at subframe (or slot) n+k. The value "k" may be configured by an RRC message. In an example, the value "k" may be a predefined value. Example embodiment may improve power consumption of channel state information reporting when a SCell is deactivated. Example embodiment may improve uplink interference when performing beam management for a deactivated SCell.

In an example, a wireless device may receive from a base station, at least one message comprising configuration parameters of a plurality of cells comprising a primary cell and at least one secondary cell, wherein, the configuration parameters comprise at least radio resource configuration of one or more reference signals. The wireless device may receive a media access control (MAC) command indicating activation of at least a first SCell in the at least one secondary cell. The wireless device may transmit one or more beam report for the at least first SCell in response to receiving the MAC command, wherein, the one or more beam report comprising one or more reference signal received power (RSRP) of at least one of the one or more reference signals for the at least first SCell. In an example, the one or more reference signals comprise at least one of: CSI-RS; and/or SS/PBCH blocks.

Figure 33:
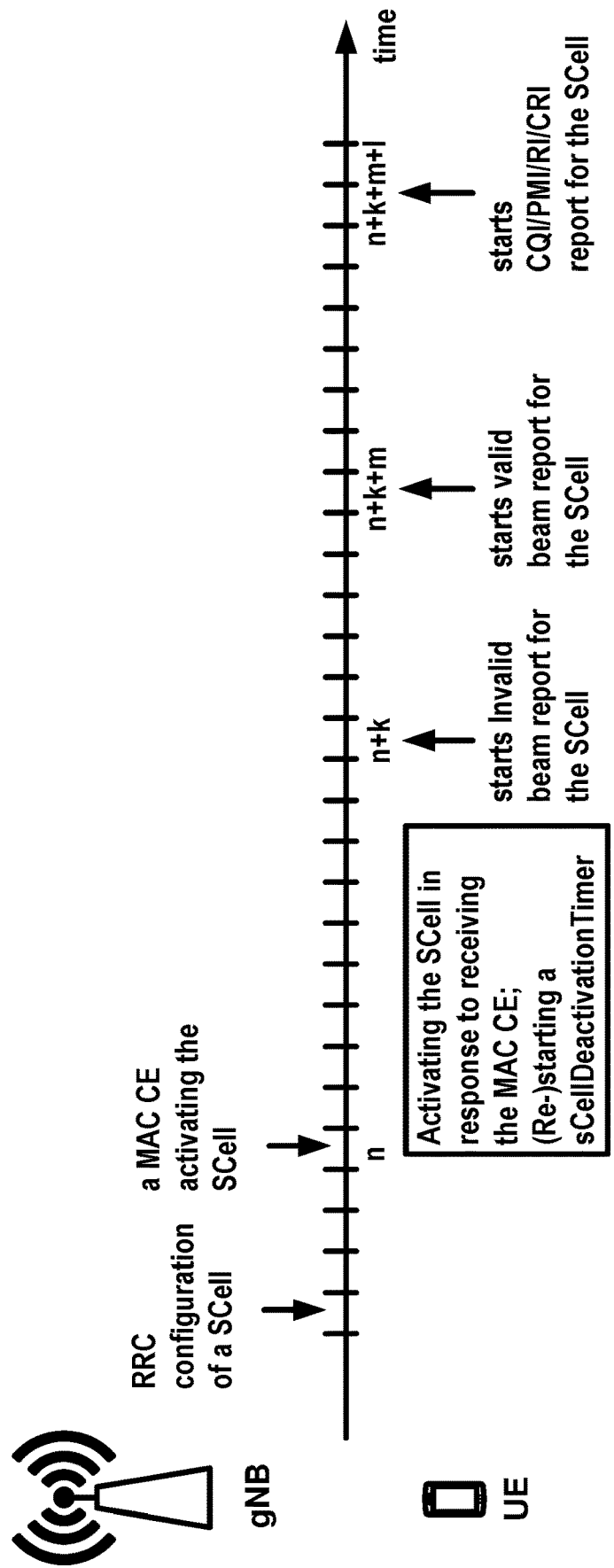
FIG. 33 is an example diagram for beam management and channel state information report of an activated SCell as per an aspect of an embodiment of the present disclosure.

FIG. 33 shows an example embodiment of beam management and channel state information report. In an example, a wireless device (e.g., UE in FIG. 33) may receive, from a base station (e.g., gNB in FIG. 33), at least one RRC message comprising configuration parameters of a plurality of cells comprising a primary cell and at least one secondary cell (e.g., SCell in FIG. 33), wherein, the configuration parameters may comprise at least one of: a reference signal (RS) resource setting; and/or a CSI reporting setting for L1-RSRP reporting. A L1-RSRP may indicate the receiving quality of a RS transmitted from a beam. The RS resource setting may comprise a set of RS resources, each RS resource associated with a RS resource configuration identifier and radio resource configuration (e.g., number of ports; time and frequency resource allocation; frequency density; etc.). In an example, the RS may be a CSI-RS, and/or a SS/PBCH block. In an example, the CSI report setting for L1-RSRP reporting may comprise parameters indicating at least one of: an indicator indicating whether a group-based beam reporting is supported; a number indicating the number of reported RS; a value indicating frequency granularity for CSI report; parameters indicating periodicity; slot offset of CSI report; and/or a PUCCH resource for the L1-RSRP reporting. In an example, a RS resource may be transmitted with a beam direction. Different RS resources may transmit with different beam direction.

In an example, the at least RRC message may further comprise a report configuration type (e.g., indicating the time domain behavior of the report—either aperiodic, semi-persistent, or periodic), if a gNB and/or a UE supports aperiodic, SP, or periodic L1-RSRP reporting.

As shown in FIG. 33, the UE may receive a MAC CE for activation of a first SCell at subframe (or slot) n, the UE may start or restart a SCellDeactivationTimer in the same subframe (or slot) or a different subframe (or slot). In an example, in response to receiving the MAC CE, the UE may start an invalid beam report for the activated SCell at subframe (or slot) n+k. The invalid beam report may comprise at least one or more L1-RSRP value based on one or more RS resources, lower than a predefined threshold, or a configured threshold. The value k (e.g., an integer >=0) may be configured by an RRC message, depending on at least capability of the UE, and/or the gNB. In an example, the value k (e.g., an integer >=0) may be a predefined value.

As shown in FIG. 33, The UE may start a valid beam report for the activated SCell at subframe (or slot) n+k+m. The value m (e.g., an integer >=0) may be configured by an RRC message, e.g., depending on at least capability of the UE, and/or the gNB. In an example, the value m (e.g., an integer >=0) may be a predefined value. The valid beam report may be a L1-RSRP value measured on one or more RS resources, greater than the predefined threshold, or the configured threshold. In response to the UE transmitting the valid beam report, the UE may finish setting up a beam pair link by tuning receiving beam to a transmission beam from the gNB.

In an example, the UE may start measuring CQI/PMI/RI/CRI on the beam pair link. As shown in FIG. 33, the UE may start transmitting one or more CQI/PMI/RI/CRI via a PUCCH at subframe (or slot) n+k+m+l. The value l (e.g., an integer >=0) may be configured by an RRC message, e.g., depending on at least capability of the UE, and/or the gNB. In an example, the value l (e.g., an integer >=0) may be a predefined value. Example embodiments may provide mechanisms to improve power consumption when perform channel state information for an activated SCell.

In an example, a UE may skip transmitting invalid beam report for the activated S Cell, if the UE is capable of quick tuning its transceiver parameters. Example embodiments may improve power consumption and data transmission latency when performing SCell activation.

Figure 34:
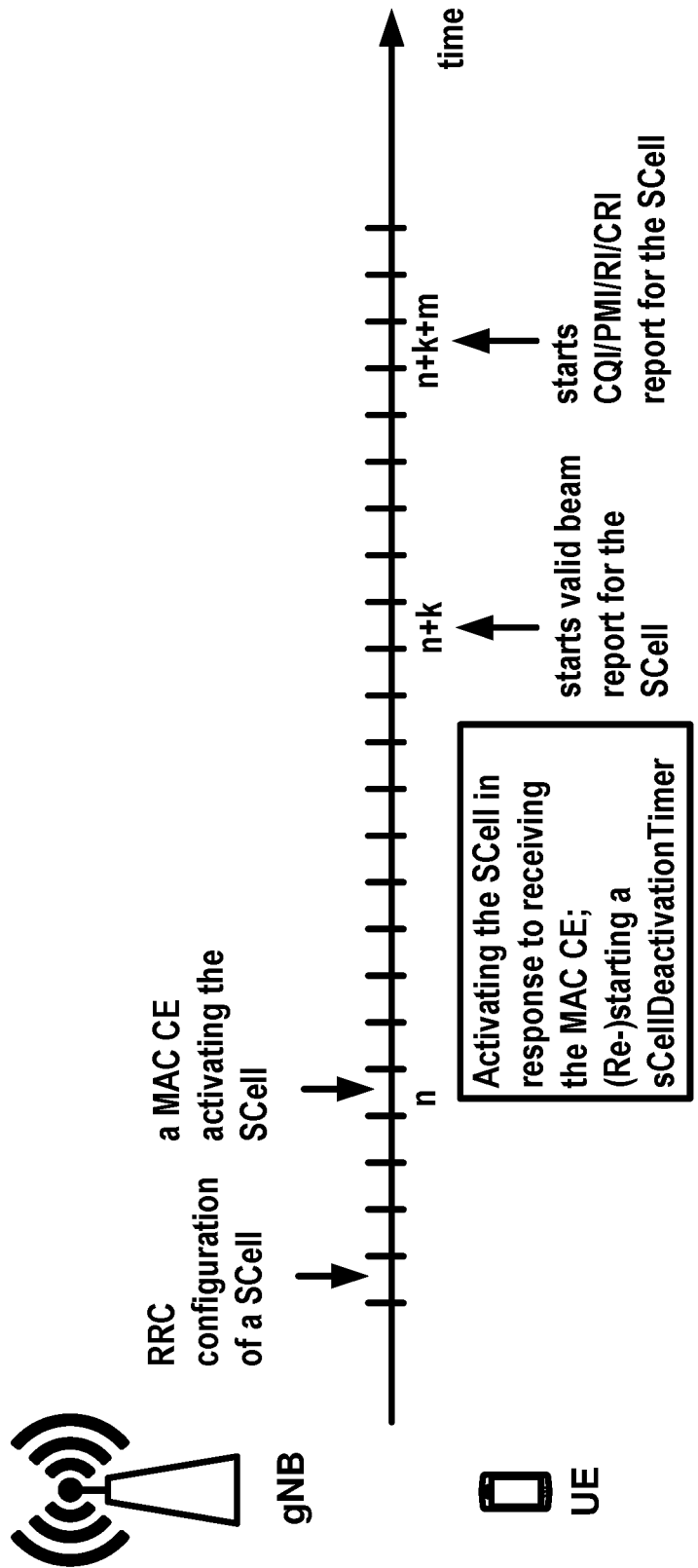
FIG. 34 is an example diagram for beam management and channel state information report of an activated SCell as per an aspect of an embodiment of the present disclosure.

FIG. 34 shows an example embodiment of beam management and channel state information reporting for a SCell. In an example, a wireless device (e.g., UE in FIG. 34) may receive, from a base station (e.g., gNB in FIG. 34), at least one RRC message comprising configuration parameters of a plurality of cells comprising a primary cell and at least one secondary cell (e.g., SCell in FIG. 34), wherein, the configuration parameters may comprise at least one of: a reference signal (RS) resource setting; and/or a CSI reporting setting for L1-RSRP reporting. A L1-RSRP may indicate the receiving quality of a RS transmitted from a beam. The RS resource setting may comprise a set of RS resources, each RS resource associated with a RS resource configuration identifier and radio resource configuration (e.g., number of ports; time and frequency resource allocation; frequency density; etc.). In an example, the RS may be a CSI-RS, and/or a SS/PBCH block. In an example, the CSI report setting for L1-RSRP reporting may comprise parameters indicating at least one of: an indicator indicating whether a group-based beam reporting is supported; a number indicating the number of reported RS; a value indicating frequency granularity for CSI report; parameters indicating periodicity; slot offset of CSI report; and/or a PUCCH resource for the L1-RSRP reporting. In an example, a RS resource may be transmitted with a beam direction. Different RS resources may transmit with different beam direction.

In an example, the at least RRC message may further comprise a report configuration type (e.g., indicating the time domain behavior of the report—either aperiodic, semi-persistent, or periodic), if a gNB and/or a UE supports aperiodic, SP, or periodic L1-RSRP reporting. As shown in FIG. 34, the UE may receive a MAC CE for activation of a first SCell at subframe (or slot) n, the UE may start or restart a SCellDeactivationTimer in the same subframe (or slot) or a different subframe (or slot).

As shown in FIG. 34, the UE may start transmitting valid beam report at subframe n+k. The value k (e.g., an integer >=0) may be configured by an RRC message, depending on at least capability of the UE, and/or the gNB. In an example, the value k (e.g., an integer >=0) may be a predefined value. In response to the UE transmitting the valid beam report, the UE may finish setting up a beam pair link by tuning receiving beam to a transmission beam from the gNB. In an example, the UE may start measuring CQI/PMI/RI/CRI on the beam pair link. The UE may start transmitting one or more CQI/PMI/RI/CRI via a PUCCH at subframe (or slot) n+k+m. The value m (e.g., an integer >=0) may be configured by an RRC message, e.g., depending on at least capability of the UE, and/or the gNB. In an example, the value m (e.g., an integer >=0) may be a predefined value.

In an example, when activating a SCell, a gNB may expect to get confirmation of successful activation of the SCell by receiving valid CQI report from a UE within a time period. For example, if the gNB does not receive a valid CQI report with the time period, the gNB may realize that the activation of the SCell may be not successful, and the gNB may try to activate another S Cell, or repeat the SCell activation process. It's necessary to define the time period a UE may transmit a valid CQI.

Figure 35:
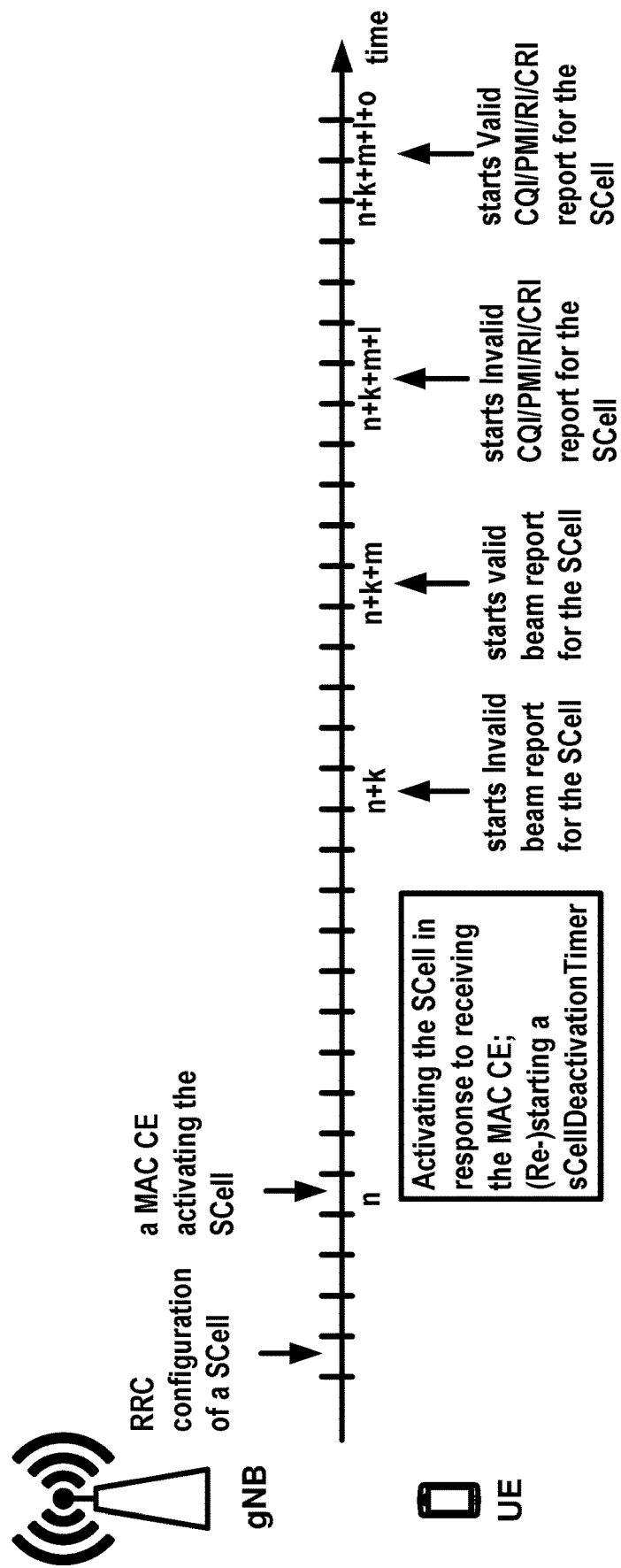
FIG. 35 is an example diagram for beam management and channel state information report of an activated SCell as per an aspect of an embodiment of the present disclosure.

FIG. 35 shows an example embodiment of beam management and channel state information report for a SCell. In an example, a wireless device (e.g., UE in FIG. 35) may receive, from a base station (e.g., gNB in FIG. 35), at least one RRC message comprising configuration parameters of a plurality of cells comprising a primary cell and at least one secondary cell (e.g., SCell in FIG. 35), wherein, the configuration parameters may comprise at least one of: a reference signal (RS) resource setting; and/or a CSI reporting setting for L1-RSRP reporting. A L1-RSRP may indicate the receiving quality of a RS transmitted from a beam. The RS resource setting may comprise a set of RS resources, each RS resource associated with a RS resource configuration identifier and radio resource configuration (e.g., number of ports; time and frequency resource allocation; frequency density; etc.). In an example, the RS may be a CSI-RS, and/or a SS/PBCH block. In an example, the CSI report setting for L1-RSRP reporting may comprise parameters indicating at least one of: an indicator indicating whether a group-based beam reporting is supported; a number indicating the number of reported RS; a value indicating frequency granularity for CSI report; parameters indicating periodicity; slot offset of CSI report; and/or a PUCCH resource for the L1-RSRP reporting. In an example, a RS resource may be transmitted with a beam direction. Different RS resources may transmit with different beam direction.

In an example, the at least RRC message may further comprise a report configuration type (e.g., indicating the time domain behavior of the report—either aperiodic, semi-persistent, or periodic), if a gNB and/or a UE supports aperiodic, SP, or periodic L1-RSRP reporting. As shown in FIG. 35, the UE may receive a MAC CE for activation of a first SCell at subframe (or slot) n, the UE may start or restart a SCellDeactivationTimer in the same subframe (or slot) or a different subframe (or slot). In an example, in response to receiving the MAC CE, the UE may start an invalid beam report for the activated SCell at subframe (or slot) n+k. The invalid beam report may comprise at least one or more L1-RSRP value based on one or more RS resources, lower than a predefined threshold, or a configured threshold. The value k (e.g., an integer >=0) may be configured by an RRC message, depending on at least capability of the UE, and/or the gNB. In an example, the value k (e.g., an integer >=0) may be a predefined value.

As shown in FIG. 35, The UE may start a valid beam report for the activated SCell at subframe (or slot) n+k+m. The value m (e.g., an integer >=0) may be configured by an RRC message, e.g., depending on at least capability of the UE, and/or the gNB. In an example, the value m (e.g., an integer >=0) may be a predefined value. The valid beam report may be a L1-RSRP value measured on one or more RS resources, greater than the predefined threshold, or the configured threshold. In response to the UE transmitting the valid beam report, the UE may finish setting up a beam pair link by tuning receiving beam to a transmission beam from the gNB.

As shown in FIG. 35, the UE may start transmitting invalid CQI report for the SCell at subframe n+k+m+1, in response to transmitting valid beam report at subframe n+k+m. The value m (e.g., an integer >=0) and/or l (e.g., an integer >=0) may be configured by an RRC message. In an example, the value m and/or l may be a predefined value. The UE may start transmission of a valid CQI report for the S Cell at subframe n+k+m+l+o. The value o (e.g., an integer >=0) may be configured by an RRC message, depending on at least capability of the UE, and/or the gNB. In an example, the value o (e.g., an integer >=0) may be a predefined value.

In an example, the valid CSI report may be an CSI value correspond to a value other than CQI index=0 (out of range) in a CQI table. In an example, the invalid CSI report may be an CQI value correspond to CQI index=0 (out of range) in the CQI table.

In an example, a UE may skip transmitting invalid beam report and/or invalid CQI report for the activated S Cell. The UE may skip transmitting invalid beam report and/or invalid CQI report, if the UE is capable of quick tuning its transceiver parameters.

Figure 36:
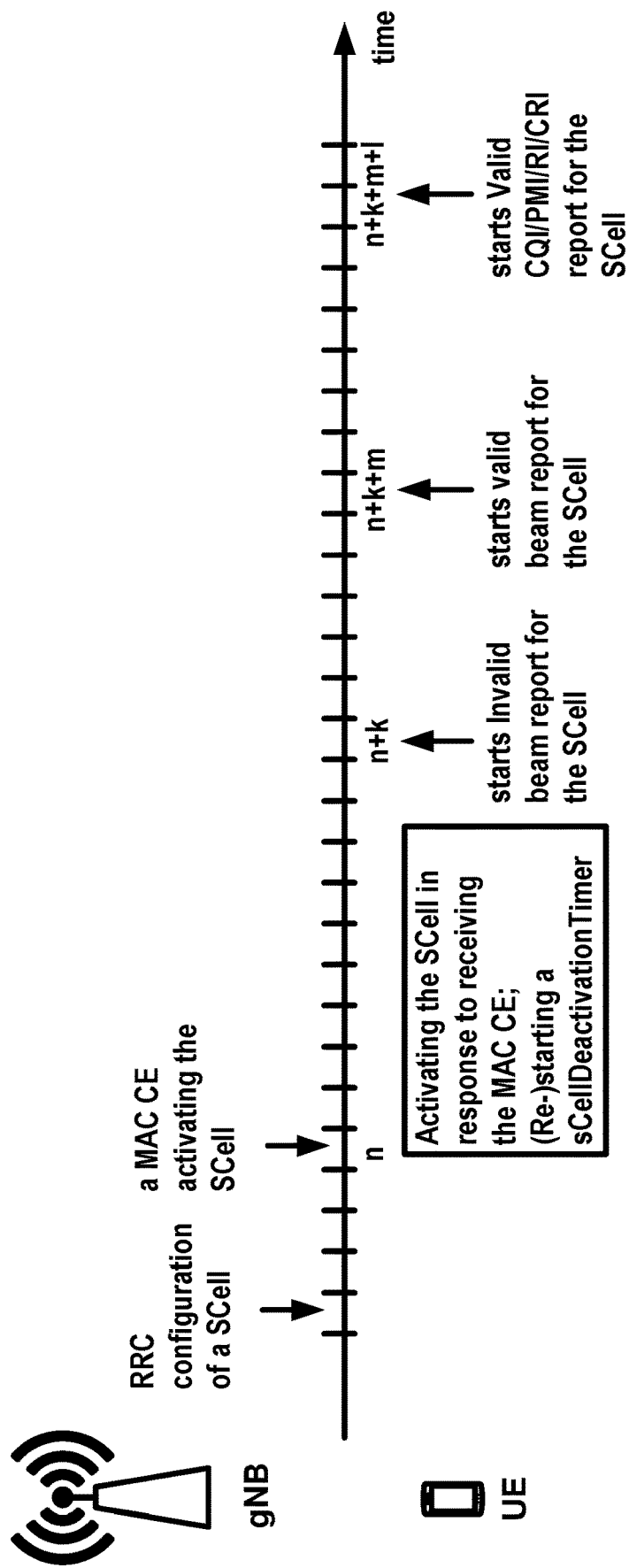
FIG. 36 is an example diagram for beam management and channel state information report of an activated SCell as per an aspect of an embodiment of the present disclosure.

FIG. 36 shows an example embodiment of beam management and channel state information report for a SCell. In an example, a wireless device (e.g., UE in FIG. 36) may receive, from a base station (e.g., gNB in FIG. 36), at least one RRC message comprising configuration parameters of a plurality of cells comprising a primary cell and at least one secondary cell (e.g., SCell in FIG. 36), wherein, the configuration parameters may comprise at least one of: a reference signal (RS) resource setting; and/or a CSI reporting setting for L1-RSRP reporting. A L1-RSRP may indicate the receiving quality of a RS transmitted from a beam. The RS resource setting may comprise a set of RS resources, each RS resource associated with a RS resource configuration identifier and radio resource configuration (e.g., number of ports; time and frequency resource allocation; frequency density; etc.). In an example, the RS may be a CSI-RS, and/or a SS/PBCH block. In an example, the CSI report setting for L1-RSRP reporting may comprise parameters indicating at least one of: an indicator indicating whether a group-based beam reporting is supported; a number indicating the number of reported RS; a value indicating frequency granularity for CSI report; parameters indicating periodicity; slot offset of CSI report; and/or a PUCCH resource for the L1-RSRP reporting. In an example, a RS resource may be transmitted with a beam direction. Different RS resources may transmit with different beam direction.

In an example, the at least RRC message may further comprise a report configuration type (e.g., indicating the time domain behavior of the report—either aperiodic, semi-persistent, or periodic), if a gNB and/or a UE supports aperiodic, SP, or periodic L1-RSRP reporting. As shown in FIG. 35, the UE may receive a MAC CE for activation of a first SCell at subframe (or slot) n, the UE may start or restart a SCellDeactivationTimer in the same subframe (or slot) or a different subframe (or slot). In an example, in response to receiving the MAC CE, the UE may start an invalid beam report for the activated SCell at subframe (or slot) n+k. The invalid beam report may comprise at least one or more L1-RSRP value based on one or more RS resources, lower than a predefined threshold, or a configured threshold. The value k (e.g., an integer >=0) may be configured by an RRC message, depending on at least capability of the UE, and/or the gNB. In an example, the value k (e.g., an integer >=0) may be a predefined value.

As shown in FIG. 36, The UE may start a valid beam report for the activated SCell at subframe (or slot) n+k+m. The value m (e.g., an integer >=0) may be configured by an RRC message, e.g., depending on at least capability of the UE, and/or the gNB. In an example, the value m (e.g., an integer >=0) may be a predefined value. The valid beam report may be a L1-RSRP value measured on one or more RS resources, greater than the predefined threshold, or the configured threshold. In response to the UE transmitting the valid beam report, the UE may finish setting up a beam pair link by tuning receiving beam to a transmission beam from the gNB.

As shown in FIG. 36, the UE may start transmitting valid CQI report for the SCell at subframe n+k+m+l, in response to transmitting valid beam report at subframe n+k+m.

Figure 37:
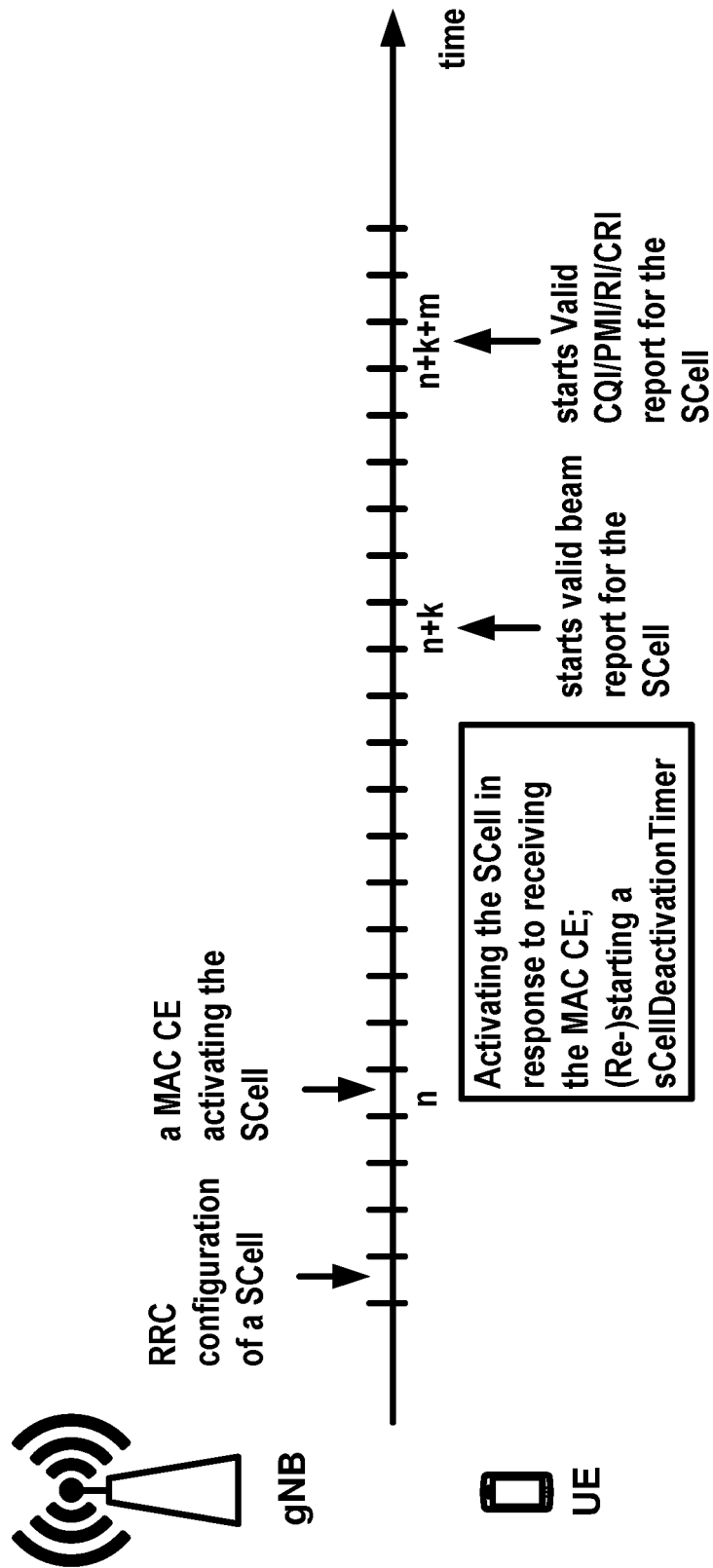
FIG. 37 is an example diagram for beam management and channel state information report of an activated SCell as per an aspect of an embodiment of the present disclosure.

FIG. 37 shows an example embodiment of beam management and channel state information report for a SCell. In an example, a wireless device (e.g., UE in FIG. 37) may receive, from a base station (e.g., gNB in FIG. 37), at least one RRC message comprising configuration parameters of a plurality of cells comprising a primary cell and at least one secondary cell (e.g., SCell in FIG. 37), wherein, the configuration parameters may comprise at least one of: a reference signal (RS) resource setting; and/or a CSI reporting setting for L1-RSRP reporting. A L1-RSRP may indicate the receiving quality of a RS transmitted from a beam. The RS resource setting may comprise a set of RS resources, each RS resource associated with a RS resource configuration identifier and radio resource configuration (e.g., number of ports; time and frequency resource allocation; frequency density; etc.). In an example, the RS may be a CSI-RS, and/or a SS/PBCH block. In an example, the CSI report setting for L1-RSRP reporting may comprise parameters indicating at least one of: an indicator indicating whether a group-based beam reporting is supported; a number indicating the number of reported RS; a value indicating frequency granularity for CSI report; parameters indicating periodicity; slot offset of CSI report; and/or a PUCCH resource for the L1-RSRP reporting. In an example, a RS resource may be transmitted with a beam direction. Different RS resources may transmit with different beam direction.

In an example, the at least RRC message may further comprise a report configuration type (e.g., indicating the time domain behavior of the report—either aperiodic, semi-persistent, or periodic), if a gNB and/or a UE supports aperiodic, SP, or periodic L1-RSRP reporting. As shown in FIG. 34, the UE may receive a MAC CE for activation of a first SCell at subframe (or slot) n, the UE may start or restart a SCellDeactivationTimer in the same subframe (or slot) or a different subframe (or slot).

As shown in FIG. 37, the UE may start transmitting valid beam report at subframe n+k. The value k (e.g., an integer >=0) may be configured by an RRC message, depending on at least capability of the UE, and/or the gNB. In an example, the value k (e.g., an integer >=0) may be a predefined value. In response to the UE transmitting the valid beam report, the UE may finish setting up a beam pair link by tuning receiving beam to a transmission beam from the gNB.

As shown in FIG. 37, the UE may start transmitting valid CQI report for the SCell at subframe n+k+m, in response to transmitting valid beam report at subframe n+k. In an example, m may be zero when the UE is capable of quick tuning its transceiver parameter and measuring L1-RSRP and CQI.

Example embodiments may improve power consumption of channel state information report for a SCell when the SCell is activated, for example, by defining timing of beam management and CQI/PMI/RI/CRI report for a SCell. Example embodiment may reduce data transmission latency on the SCell.

In an example, a wireless device may receive, from a base station, at least one message comprising configuration parameters of a plurality of cells comprising a primary cell and at least one secondary cell, wherein, the configuration parameters comprise at least radio resource configuration of one or more reference signals (e.g., SS blocks, and/or CSI-RS). In an example, the wireless device may receive a media access control (MAC) command indicating activation of at least a first SCell in the at least one secondary cell. The wireless may transmit one or more beam report for the at least first SCell, in response to receiving the MAC command. In an example, the one or more beam report may comprise one or more reference signal received power (RSRP) of at least one of the one or more reference signals for the at least first cell. The wireless device may transmit one or more CSI report for the at least first cell, in response to transmitting a valid beam report, wherein, the valid beam report comprises at least one or more RSRP with value greater than a threshold. The threshold may be a configured value, or be a predefined value. In an example, the one or more CSI report may comprise at least one of: CQI; RI; PMI; or CRI. In an example, the wireless device may transmit one or more invalid CSI report for the at least first SCell, at a first subframe (or slot) which is n subframes after the wireless device transmit the valid beam report. n may be an integer (>=0). In an example, the wireless device may transmit one or more valid CSI report for the at least first SCell, at a third subframe (or slot) which is m subframes after the wireless device transmit the valid beam report. In an example, m may be an integer (>=0). In an example, m may be greater than, or equal to, n. In an example, the valid CSI report may be an CQI value correspond to a value other than CQI index=0 (out of range) in a CQI table. In an example, the invalid CSI report may be an CSI value correspond to CQI index=0 (out of range) in the CQI table.

According to various embodiments, a device such as, for example, a wireless device, off-network wireless device, a base station, a core network device, and/or the like, may comprise one or more processors and memory. The memory may store instructions that, when executed by the one or more processors, cause the device to perform a series of actions. Embodiments of example actions are illustrated in the accompanying figures and specification. Features from various embodiments may be combined to create yet further embodiments.

FIG. 38 is a flow diagram of an aspect of an embodiment of the present disclosure. At 3810, a wireless device may receive one or more messages from a base station. The one or more messages may comprise configuration parameters of a layer 1 reference signal received power reporting for a secondary cell. The configuration parameters may indicate resource configurations of a plurality of reference signals on the secondary cell. At 3820, a medium access control control element may be received. The medium access control control element may indicate activation of the secondary cell. At 3830, a layer 1 reference signal received power report for the layer 1 reference signal received power reporting for the secondary cell may be transmitted in response to the medium access control control element. The layer 1 reference signal received power report may comprise first fields indicating at least one reference signal of the plurality of reference signals. The layer 1 reference signal received power report may comprise second fields indicating at least a layer 1 reference signal received power value of the at least one reference signals.

According to an example embodiment, a second medium access control control element indicating deactivation of the secondary cell may be received. The transmitting the layer 1 reference signal received power report for the secondary cell may be stopped in response to the second medium access control control element. According to an example embodiment, a second power value of the at least the layer 1 reference signal received power value may be a 4-bit value indicating a power value relative to a first power value of the at least the layer 1 reference signal received power value.

According to an example embodiment, a first power value of the at least the layer 1 reference signal received power value may be a 7-bit value. According to an example embodiment, the 7-bit value may indicate a power value between −140 dbm and −44 dbm.

According to an example embodiment, a channel quality indicator report for the secondary cell may be transmitted in response to the medium access control control element. According to an example embodiment, the channel quality indicator report may comprise a channel quality indicator. The channel quality indicator report may comprise a pre-coding matrix indicator. The channel quality indicator report may comprise a channel state information reference signal resource indicator. The channel quality indicator report may comprise a synchronization signal/physical broadcast channel block resource indicator. The channel quality indicator report may comprise a layer indicator.

According to an example embodiment, the wireless device may transmit the layer 1 reference signal received power report from a first slot a number of slots after a second slot when the wireless device receives the medium access control control element. According to an example embodiment, the number of slots may be a configured value or a predefined value. According to an example embodiment, the wireless device may transmit the layer 1 reference signal received power report with a report periodicity. According to an example embodiment, the report periodicity may indicate the one or more messages. According to an example embodiment, the at least the layer 1 reference signal received power value may be equal to or greater than a threshold. According to an example embodiment, the threshold may be indicated in a radio resource control message. According to an example embodiment, a channel quality indicator report for the secondary cell may be transmitted in response to a power value of the at least the layer 1 reference signal received power value being equal to or greater than a threshold.

According to an example embodiment, a plurality of reference signals may comprise a first plurality of channel state information reference signals. The plurality of reference signals may comprise a second plurality of synchronization signal blocks. According to an example embodiment, the first plurality of channel state information reference signals may comprise one or more periodic channel state information reference signals. According to an example embodiment, a transmission periodicity of the one or more periodic channel state information reference signals may be indicated in the one or more messages. According to an example embodiment, the configuration parameters may comprise resource configurations of an uplink control channel for the layer 1 reference signal received power reporting for the secondary cell. According to an example embodiment, the wireless device may transmit the layer 1 reference signal received power report via the uplink control channel. According to an example embodiment, the uplink control channel may be configured on a primary cell, or a physical uplink control channel secondary cell.

FIG. 39 is a flow diagram of an aspect of an embodiment of the present disclosure. At 3910, a wireless device may receive one or more messages from a base station. The one or more messages may comprise first configuration parameters of a layer 1 reference signal received power report for a secondary cell. The one or more messages may comprise second configuration parameters of a channel quality indicator report for the secondary cell. At 3920, a medium access control control element may be received at a first slot. The medium access control control element may indicate activation of the secondary cell. At 3930, the layer 1 reference signal received power report may be transmitted, at a second slot occurring a number of slots after the first slot, the layer 1 reference signal received power report, in response to the medium access control control element. At 3940, a channel quality indictor report for the secondary cell may be transmitted at a third slot in response to a reference signal received power value of the layer 1 reference signal received power report being greater than a threshold.

According to an example embodiment, the wireless device may transmit the layer 1 reference signal received power report via radio resource of an uplink control channel According to an example embodiment, the threshold may be configured in a radio resource control message. According to an example embodiment, the number of slots may be configured in a radio resource control message. According to an example embodiment, the number of slots may be a predefined value. According to an example embodiment, the third slot may occur a second number of slots after the second slot. According to an example embodiment, the channel quality indictor report may comprise an invalid value of channel quality indicator. The invalid value may be below a second threshold. According to an example embodiment, the channel quality indicator report may comprise a valid value of channel quality indicator. The valid value may be greater than a second threshold. According to an example embodiment, a downlink control channel may be monitored for downlink assignment or uplink grant after transmitting the channel quality indicator report. According to an example embodiment, a second MAC CE indicating deactivation of the secondary cell may be received. The transmitting the layer 1 reference signal received power report and/or the channel quality indicator report may be stopped in response to the second MAC CE. According to an example embodiment, the one or more messages may comprise configuration parameters of a plurality of cells comprising a primary cell and the secondary cell. According to an example embodiment, the wireless device may transmit the layer 1 reference signal received power report based on the first configuration parameters. According to an example embodiment, the wireless device may transmit the channel quality indicator report based on the second configuration parameters.

According to an example embodiment, the first configuration parameters may comprise radio resources of one or more reference signals comprising channel state information reference signals and/or synchronization signal blocks. The first configuration parameters may comprise a number of reported reference signals in the layer 1 reference signal received power report. The first configuration parameters may comprise a report periodicity of the layer 1 reference signal received power report. The first configuration parameters may comprise radio resources of an uplink control channel for the layer 1 reference signal received power report. According to an example embodiment, the wireless device may transmit the layer 1 reference signal received power report with the report periodicity of the layer 1 reference signal received power report. According to an example embodiment, the wireless device may transmit the channel quality indicator report with the report periodicity of the channel quality indicator report. According to an example embodiment, the wireless device may transmit the layer 1 reference signal received power report via radio resources of the uplink control channel for the layer 1 reference signal received power report.

According to an example embodiment, the second configuration parameters may comprise radio resource configuration of one or more reference signals comprising channel state information reference signals and/or synchronization signal blocks. The second configuration parameters may comprise a channel station information report type. The second configuration parameters may comprise parameters of codebook configurations. The second configuration parameters may comprise frequency granularity parameters. The second configuration parameters may comprise a report periodicity of the channel quality indicator report. The second configuration parameters may comprise measurement restriction configuration parameters. The second configuration parameters may comprise radio resource configuration of uplink control channel for the channel quality indicator report. According to an example embodiment, the layer 1 reference signal received power report may comprise one or more reference signal resource index indicating one or more reference signals of a plurality of reference signals. The layer 1 reference signal received power report may comprise one or more layer 1 reference signal received power values for the one or more reference signals. the layer 1 reference signal received power report may comprise a first value of the one or more layer 1 reference signal received power values may be a biggest layer 1 reference signal received power value among layer 1-reference signal received power values of the plurality of reference signals.

In this disclosure, "a" and "an" and similar phrases are to be interpreted as "at least one" or "one or more." Similarly, any term that ends with the suffix "(s)" is to be interpreted as "at least one" or "one or more." In this disclosure, the term "may" is to be interpreted as "may, for example." In other words, the term "may" is indicative that the phrase following the term "may" is an example of one of a multitude of suitable possibilities that may, or may not, be employed to one or more of the various embodiments. If A and B are sets and every element of A is also an element of B, A is called a subset of B. In this specification, only non-empty sets and subsets are considered. For example, possible subsets of B={cell1, cell2} are: {cell1}, {cell2}, and {cell1, cell2}. The phrase "based on" is indicative that the phrase following the term "based on" is an example of one of a multitude of suitable possibilities that may, or may not, be employed to one or more of the various embodiments. The phrase "in response to" is indicative that the phrase following the phrase "in response to" is an example of one of a multitude of suitable possibilities that may, or may not, be employed to one or more of the various embodiments. The terms "including" and "comprising" should be interpreted as meaning "including, but not limited to."

In this disclosure and the claims, differentiating terms like "first," "second," "third," identify separate elements without implying an ordering of the elements or functionality of the elements. Differentiating terms may be replaced with other differentiating terms when describing an embodiment.

In this disclosure, various embodiments are disclosed. Limitations, features, and/or elements from the disclosed example embodiments may be combined to create further embodiments within the scope of the disclosure.

In this disclosure, parameters (Information elements: IEs) may comprise one or more objects, and each of those objects may comprise one or more other objects. For example, if parameter (IE) N comprises parameter (IE) M, and parameter (IE) M comprises parameter (IE) K, and parameter (IE) K comprises parameter (information element) J, then, for example, N comprises K, and N comprises J. In an example embodiment, when one or more messages comprise a plurality of parameters, it implies that a parameter in the plurality of parameters is in at least one of the one or more messages, but does not have to be in each of the one or more messages.

Furthermore, many features presented above are described as being optional through the use of "may" or the use of parentheses. For the sake of brevity and legibility, the present disclosure does not explicitly recite each and every permutation that may be obtained by choosing from the set of optional features. However, the present disclosure is to be interpreted as explicitly disclosing all such permutations. For example, a system described as having three optional features may be embodied in seven different ways, namely with just one of the three possible features, with any two of the three possible features or with all three of the three possible features.

Many of the elements described in the disclosed embodiments may be implemented as modules. A module is defined here as an isolatable element that performs a defined function and has a defined interface to other elements. The modules described in this disclosure may be implemented in hardware, software in combination with hardware, firmware, wetware (i.e. hardware with a biological element) or a combination thereof, all of which are behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies are often used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the scope. In fact, after reading the above description, it will be apparent to one skilled in the relevant art(s) how to implement alternative embodiments. Thus, the present embodiments should not be limited by any of the above described exemplary embodiments.

In addition, it should be understood that any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112. Claims that do not expressly include the phrase "means for" or "step for" are not to be interpreted under 35 U.S.C. 112.

What is claimed is:

1. A method comprising:
receiving, by a wireless device from a base station, configuration information for a secondary cell (SCell), the configuration information including information on resource configuration of reference signals for a channel state information (CSI) reporting and information on report configuration for the CSI reporting;
receiving, by the wireless device from the base station, a SCell activation/deactivation medium access control (MAC) control element (CE) indicating whether to activate the SCell or to deactivate the SCell; and
in response to the SCell activation/deactivation MAC CE indicating to activate the SCell, transmitting, by the wireless device to the base station, a report including a layer 1 reference signal received power (RSRP) (L1-RSRP) value for the SCell and a reference signal (RS) resource indicator for the SCell,
wherein the RS resource indicator indicates a RS resource among a plurality of RS resources.

2. The method of claim 1, further comprising:
in response to the SCell activation/deactivation MAC CE indicating to deactivate the SCell, deactivating the SCell and stopping transmitting, by the wireless device, the report for the SCell.

3. The method of claim 1, wherein, in a case that a number of reported reference signal in the report configuration for the CSI reporting is configured to be larger than one, a first power value indicating the largest measured value of reported L1-RSRP is quantized to 7-bit value between −140 dbm and −44 dbm and at least one second power value of the reported L1-RSRP is quantized to a 4-bit value, indicating a power value relative to the first power value.

4. The method of claim 1, wherein reference signals comprise at least one of:
a first plurality of channel state information reference signals (CSI-RSs); and
a second plurality of synchronization signal blocks (SSBs).

5. The method of claim 1, wherein the transmitting comprises:
transmitting, by the wireless device to the base station, the report including the L1-RSRP value for the SCell and the RS resource indicator for the SCell with one of a periodic reporting, an aperiodic reporting or a semi-persistent reporting.

6. A method comprising:
transmitting, by a base station to a wireless device, configuration information for a secondary cell (SCell), the configuration information including information on resource configuration of reference signals for a channel state information (CSI) reporting and information on report configuration for the CSI reporting;
transmitting, by the base station to the wireless device, a SCell activation/deactivation medium access control (MAC) control element (CE) indicating whether to activate the SCell or to deactivate the SCell; and
in response to the SCell activation/deactivation MAC CE indicating to activate the SCell, receiving, by the base station from the wireless device, a report including a layer 1 reference signal received power (RSRP) (L1-RSRP) value for the SCell and a reference signal (RS) resource indicator for the SCell,
wherein the RS resource indicator indicates a RS resource among a plurality of RS resources.

7. The method of claim 6, further comprising:
transmitting, by the base station to the wireless device, configuration information including information on resource configuration of reference signals for a CSI reporting and information on report configuration for the CSI reporting.

8. A wireless device comprising:
one or more processors; and
memory storing instructions that, when executed by the one or more processors, cause the wireless device to:
receive, from a base station, configuration information for a secondary cell (SCell), the configuration information including information on resource configuration of reference signals for a channel state information (CSI) reporting and information on report configuration for the CSI reporting,
receive, from the base station, a SCell activation/deactivation medium access control (MAC) control element (CE) indicating whether to activate the SCell or to deactivate the SCell; and
in response to the SCell activation/deactivation MAC CE indicating to activate the SCell, transmit, to the base station, a report including a layer 1 reference signal received power (RSRP) (L1-RSRP) value for the SCell and a reference signal (RS) resource indicator for the SCell,
wherein the RS resource indicator indicates a RS resource among a plurality of RS resources.

9. The wireless device of claim 8, wherein the instructions, when executed by the one or more processors, further cause the wireless device to:
in response to the SCell activation/deactivation MAC CE indicating to deactivate the SCell, deactivate the SCell.

10. The wireless device of claim 8, wherein, in a case that a number of reported reference signal in the report configuration for the CSI reporting is configured to be larger than one, a first power value indicating the largest measured value of reported L1-RSRP is quantized to 7-bit value between −140 dbm and −44 dbm and at least one second power value of the reported L1-RSRP is quantized to a 4-bit value, indicating a power value relative to the first power value.

11. The wireless device of claim 8, wherein reference signals comprise at least one of:
a first plurality of channel state information reference signals (CSI-RS); and
a second plurality of synchronization signal blocks (SSB).

12. The wireless device of claim 8, wherein the instructions, when executed by the one or more processors, further cause the wireless device to:
transmit, to the base station, the report including the L1-RSRP value for the SCell and the RS resource indicator for the SCell with one of a periodic reporting, an aperiodic reporting or a semi-persistent reporting.

13. A base station comprising:
one or more processors; and
memory storing instructions that, when executed by the one or more processors, cause the base station to:
- transmit, to a wireless device, configuration information for a secondary cell (SCell), the configuration information including information on resource configuration of reference signals for a channel state information (CSI) reporting and information on report configuration for the CSI reporting,
- transmit, to the wireless device, a SCell activation/deactivation medium access control (MAC) control element (CE) indicating whether to activate the SCell or to deactivate the SCell, and
- in response to the SCell activation/deactivation MAC CE indicating to activate the SCell, receive, from the wireless device, a report including a layer 1 reference signal received power (RSRP) (L1-RSRP) value for the SCell and a reference signal (RS) resource indicator for the SCell, wherein the RS resource indicator indicates a RS resource among a plurality of RS resources.

* * * * *